US009967728B2

(12) United States Patent
Logue et al.

(10) Patent No.: US 9,967,728 B2
(45) Date of Patent: May 8, 2018

(54) DEVICE PAIRING

(71) Applicant: Google Inc., Mountain View, CA (US)

(72) Inventors: Jay D. Logue, San Jose, CA (US);
Liang-Yun Wang, San Jose, CA (US);
Andrew William Stebbins, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days. days.

(21) Appl. No.: 15/183,647

(22) Filed: Jun. 15, 2016

(65) Prior Publication Data

US 2016/0374133 A1 Dec. 22, 2016

Related U.S. Application Data

(63) Continuation of application No. 15/182,482, filed on Jun. 14, 2016.
(Continued)

(51) Int. Cl.
*H04B 7/00* (2006.01)
*H04W 8/00* (2009.01)
(Continued)

(52) U.S. Cl.
CPC ............. *H04W 8/005* (2013.01); *G08B 3/10* (2013.01); *G08B 21/182* (2013.01); *G08B 25/001* (2013.01); *G08B 25/10* (2013.01); *G08B 29/18* (2013.01); *H04L 12/2803* (2013.01); *H04L 12/2809* (2013.01); *H04L 61/1511* (2013.01); *H04W 4/06* (2013.01); *H04W 4/80* (2018.02); *H04W 52/0229* (2013.01);
(Continued)

(58) Field of Classification Search
CPC .... G08B 21/182; G08B 25/001; G08B 25/10; G08B 29/18; G08B 3/10; H04L 12/2803; H04L 12/2809; H04L 2012/2841; H04L 61/1511; H04W 4/008; H04W 4/06; H04W 52/0229; H04W 76/02; H04W 76/023
See application file for complete search history.

(56) References Cited

U.S. PATENT DOCUMENTS 8,847,772 B2  9/2014 Marks et al.
9,635,536 B2  4/2017 Narang et al.
(Continued)

FOREIGN PATENT DOCUMENTS

WO  2015-009924 A1  1/2015

OTHER PUBLICATIONS

Nieminen, et al. IPv6 over Bluetooth Low Energy (IETF Internet-Draft). Jun. 2015.
(Continued)

*Primary Examiner* — Xin Jia
(74) *Attorney, Agent, or Firm* — Colby Nipper

(57) ABSTRACT

Methods and systems for joining a wireless connection advertisement. The joining device connects to a commissioning device through a first wireless connection protocol. The first wireless connection protocol comprises a relatively low power connection. The commissioning device is configured to manage access to a fabric. The joining device also receives credentials, via the first wireless connection protocol, for connecting to a first wireless network having a second wireless connection protocol. Furthermore, the joining device attempts to join the first wireless network using the received network credentials.

22 Claims, 24 Drawing Sheets

Related U.S. Application Data

(60) Provisional application No. 62/180,529, filed on Jun. 16, 2015, provisional application No. 62/180,531, filed on Jun. 16, 2015.

(51) Int. Cl.
    *H04W 80/06*     (2009.01)
    *H04L 29/12*     (2006.01)
    *G08B 29/18*     (2006.01)
    *H04L 12/28*     (2006.01)
    *G08B 3/10*     (2006.01)
    *G08B 21/18*     (2006.01)
    *G08B 25/00*     (2006.01)
    *G08B 25/10*     (2006.01)
    *H04W 4/06*     (2009.01)
    *H04W 52/02*     (2009.01)
    *H04W 84/12*     (2009.01)
    *H04W 84/18*     (2009.01)

(52) U.S. Cl.
CPC ........... *H04W 76/10* (2018.02); *H04W 76/14* (2018.02); *H04W 76/38* (2018.02); *H04W 80/06* (2013.01); *H04L 2012/2841* (2013.01); *H04W 84/12* (2013.01); *H04W 84/18* (2013.01); *Y02D 70/00* (2018.01); *Y02D 70/142* (2018.01); *Y02D 70/144* (2018.01); *Y02D 70/162* (2018.01); *Y02D 70/164* (2018.01); *Y02D 70/166* (2018.01); *Y02D 70/22* (2018.01); *Y02D 70/26* (2018.01)

(56) References Cited

U.S. PATENT DOCUMENTS

| | | | |
|---|---|---|---|
| 9,854,425 | B2 | 12/2017 | Narang et al. |
| 2004/0214617 | A1 | 10/2004 | Kanazawa et al. |
| 2012/0227085 | A1 | 9/2012 | Batttersby et al. |
| 2013/0278397 | A1 | 10/2013 | Liu et al. |
| 2014/0088794 | A1 | 3/2014 | Yashiro et al. |
| 2014/0118464 | A1 | 5/2014 | George et al. |
| 2014/0192988 | A1* | 7/2014 | Solum ................. H04R 25/552 381/23.1 |
| 2014/0249681 | A1 | 9/2014 | Yamaguchi et al. |
| 2014/0254577 | A1 | 9/2014 | Wright et al. |
| 2014/0335902 | A1 | 11/2014 | Guba et al. |
| 2014/0342670 | A1 | 11/2014 | Kang et al. |
| 2014/0351832 | A1* | 11/2014 | Cho ...................... H04L 67/141 719/328 |
| 2015/0022367 | A1 | 1/2015 | Matsuoka et al. |
| 2015/0100167 | A1 | 4/2015 | Sloo et al. |
| 2015/0170503 | A1* | 6/2015 | Wedig ................... G08B 7/066 340/691.5 |
| 2015/0302543 | A1* | 10/2015 | Weaver ............ H04N 21/23892 382/100 |
| 2015/0304843 | A1 | 10/2015 | Hillyard |
| 2015/0312858 | A1* | 10/2015 | Kerai ................. H04W 52/0212 370/311 |
| 2015/0358780 | A1* | 12/2015 | Saari .................... H04W 4/008 370/252 |
| 2016/0007287 | A1 | 1/2016 | Sen |
| 2016/0371961 | A1 | 12/2016 | Narang et al. |
| 2016/0371967 | A1 | 12/2016 | Narang et al. |
| 2016/0373917 | A1 | 12/2016 | Logue et al. |
| 2016/0374120 | A1 | 12/2016 | Logue et al. |
| 2017/0086016 | A1 | 3/2017 | Kwon et al. |
| 2017/0086098 | A1* | 3/2017 | Kwon .................. H04W 28/22 |
| 2017/0151928 | A1 | 6/2017 | Kang et al. |
| 2017/0161786 | A1 | 6/2017 | Terazaki et al. |

OTHER PUBLICATIONS

Wikipedia contributors. Bluetooth Low Energy. Wikipedia: The Free Encyclopedia. Wikimedia Foundation, Inc. Accessed Jul. 10, 2015.
DA14580 Datasheet. Revision 3.0, Dialog Semiconductor, plc. Jan. 29, 2015.
Issue 58381: Android 4.3: Bluetooth LE pretty unstable. Android Open Source Project Issue Tracker. Google Inc. Accessed Jul. 22, 2015.
Core Bluetooth Programming Guide. Apple Inc. Updated Sep. 18, 2013. Accessed Jul. 14, 2015.
BlueZ Supported Profiles. Bluez Project. Accessed Aug. 4, 2015.
Logical Link Control and Adaptation (L2CAP) Architecture. Bluetooth SIG, Inc. Accessed Jul. 13, 2015.
Technical Considerations Bluetooth Technology. Bluetooth Sig, Inc. Accessed Jul. 13, 2015.
16-bit UUID for Members. Bluetooth SIG, Inc. Accessed Jul. 22, 2015.
Bluetooth Specification Version 4.2. Bluetooth SIG, Inc. Published Dec. 2, 2014.
"Corrected Notice of Allowance", U.S. Appl. No. 15/183,659, dated Mar. 10, 2017, 2 pages.
"Notice of Allowance", U.S. Appl. No. 15/183,659, dated Jan. 19, 2017, 9 pages.
"Non-Final Office Action", U.S. Appl. No. 15/182,476, dated Apr. 21, 2017, 16 pages.
"Pre-Interview Communication", U.S. Appl. No. 15/182,489, dated May 11, 2017, 3 pages.
"Restriction Requirement", U.S. Appl. No. 15/182,482, dated Apr. 19, 2017, 6 pages.
International Search Report & Written Opinion for PCT Application No. PCT/US2016/037676 dated Sep. 20, 2016; 12 pgs.
"First Action Interview Office Action", U.S. Appl. No. 15/183,659, dated Dec. 20, 2016, 3 pages.
"Pre-interview First Office Action", U.S. Appl. No. 15/183,659, dated Oct. 12, 2016, 4 pages.
"Final Office Action", U.S. Appl. No. 15/182,476, dated Sep. 14, 2017, 17 pages.
"Non-Final Office Action", U.S. Appl. No. 15/182,482, dated Jul. 20, 2017, 15 pages.
"Notice of Allowance", U.S. Appl. No. 15/182,489, dated Aug. 9, 2017, 8 pages.
"Final Office Action", U.S. Appl. No. 15/182,482, dated Dec. 5, 2017, 14 pages.
"Notice of Allowance", U.S. Appl. No. 15/182,476, dated Dec. 22, 2017, 7 pages.
"Preliminary Report on Patentability", PCT Application No. PCT/US2016/037676, dated Dec. 28, 2017, 8 pages.

\* cited by examiner

DEVICE PAIRING

CROSS-REFERENCE TO RELATED APPLICATIONS

This application is a continuation of U.S. patent application Ser. No. 15/182,482, entitled "DEVICE PAIRING", filed Jun. 14, 2016, which claims priority from and the benefit of U.S. Provisional Application Ser. No. 62/180,529, filed Jun. 16, 2015, entitled "DEVICE PAIRING" and Provisional Application Ser. No. 62/180,531, filed Jun. 16, 2015, entitled "REMOTE ALARM HUSHING," which are both incorporated by reference herein in their entireties.

BACKGROUND OF THE DISCLOSURE

This disclosure relates to systems, devices, methods, and related computer program products for smart buildings including the smart home. More particularly, this patent specification relates to smart device communications using relatively low energy communication types.

Some homes today are equipped with smart home networks to provide automated control of devices, appliances and systems, such as heating, ventilation, and air conditioning ("HVAC") systems, lighting systems, alarm systems, and home theater and entertainment systems. Smart home fabrics may include one or more networks of devices interconnected to automation functions within the home. For example, a person may input a desired temperature and a schedule indicating when the person is away from home.

In some scenarios, one or more devices may have power constraints, network limitations, or constraints on available communication types. Thus, some devices with power constraints or other limitations (e.g., available communication types) may be constrained to use relatively low power networks or communication types. However, these relatively low power connections may have constraints (e.g., unidirectional communication) that interfere with complete connectivity between the devices. Furthermore, other devices that are to connect to the one or more devices may only have hardware (e.g., radios) to communicate using a select (e.g., 802.15) communication type thereby limiting connection options between the devices.

Furthermore, in some scenarios, when a new device is to be added to a network and/or fabric, it may be difficult to reliably, securely, and simply connect the new device to network or fabric. Specifically, establishing a secure connection between devices before adding the new device to the network or fabric may employ much undesirable interaction from a user completing the network/fabric connection.

BRIEF SUMMARY OF THE DISCLOSURE

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure provide methods and systems for enabling devices to communicate relatively high amounts of information over a BlueTooth Low Energy (BLE) connection or other relatively low power communication method. Furthermore, these devices may connect to each other over BLE to then exchange additional network names, fabric names, and corresponding credentials. For example, BLE may be used to pass a WiFi SSID and password to a device joining the networks.

BRIEF DESCRIPTION OF THE DRAWINGS

Various aspects of this disclosure may be better understood upon reading the following detailed description and upon reference to the drawings in which.

DETAILED DESCRIPTION OF THE DISCLOSURE

Figure 1:
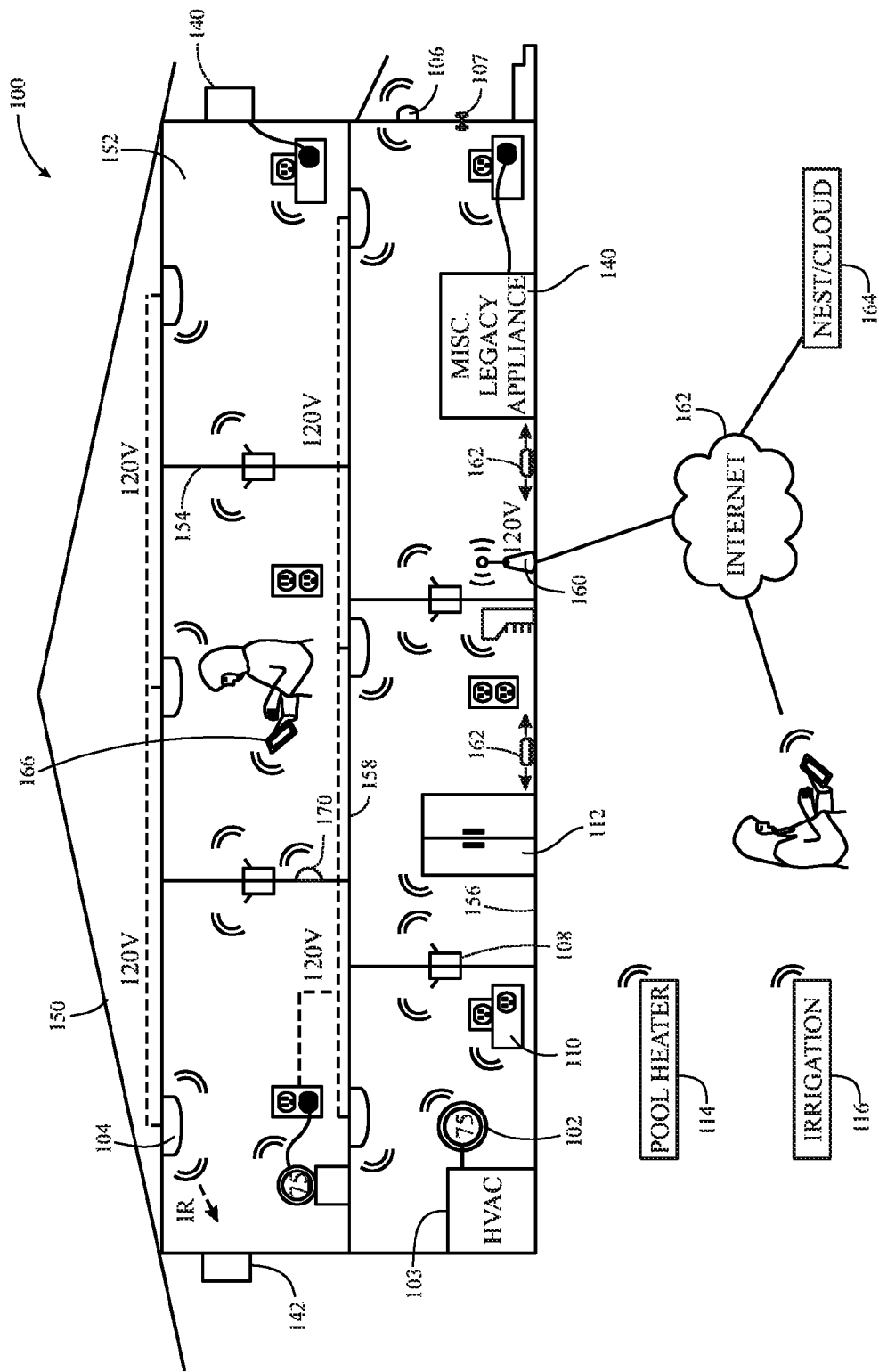
FIG. 1 illustrates an embodiment of a smart-home environment within which one or more of the devices, methods, systems, services, and/or computer program products described herein may be used, according to an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Embodiments of the present disclosure relate generally to adding devices to network and/or fabrics consisting of several networks. In some embodiments, network and/or fabric identifiers and credentials may be sent over to added devices from a remote device before the devices join the networks and/or fabrics via a relatively low power connection (e.g., BLE). In some embodiments, when a network other than the relatively low power connection is connected to by the added devices, additional network and/or fabric identifiers and credentials are sent via the newly-connected-to network and the relatively low power connection is closed. In certain embodiments, devices on the network/fabric may aid the remote device in adding the devices by sending over the credentials to the added devices as assisting devices.

It should be appreciated that "smart home environments" may refer to smart environments or smart networks for any building type, such as single-family houses, duplexes, townhomes, multi-unit apartment buildings, hotels, retail stores, office buildings, industrial buildings, and any building that may include one or more smart devices.

It is to be further appreciated that while the terms user, customer, installer, homeowner, occupant, guest, tenant, landlord, repair person, user, and similar terms may be used to refer to a person or persons interacting with a smart device within the network via a user interface, these references are by no means to be considered as limiting the scope of the present teachings with respect to the person or persons who are performing such actions. Thus, for example, the terms user, customer, purchaser, installer, subscriber, and homeowner may often refer to the same person in the case of a single-family residential dwelling, because the head of the household is often the person who makes the purchasing decision, buys the unit, and installs and configures the units, and is also one of the users of the units. However, in other scenarios, such as a landlord-tenant environment, the customer may be the landlord with respect to purchasing the unit, the installer may be a local apartment supervisor, a first user may be the tenant, and a second user may again be the landlord with respect to remote control functionality. While the identity of the person performing the action may be germane to a particular advantage provided by one or more of the embodiments—for example, the password-protected network commissioning functionality described herein may be particularly advantageous where the landlord holds the sole password and can control network additions—such identity should not be construed in the descriptions that follow as necessarily limiting the scope of the present teachings to those particular individuals having those particular identities.

I. Smart Network

With the foregoing in mind, FIG. 1 illustrates an example of a smart-home environment 100, also referred to as a smart network, within which one or more of the devices, methods, systems, services, and/or computer program products described further herein can be applicable. The depicted smart-home environment 100 includes a structure 150, which can include, e.g., a house, office building, garage, or mobile home. In some embodiments, the devices can also be integrated into a smart-home environment 100 that does not include an entire structure 150, such as an apartment, condominium, or office space. Further, the smart home environment can control and/or be coupled to devices outside of the actual structure 150. Indeed, several devices in the smart home environment need not physically be within the structure 150 at all. For example, a device controlling a pool heater or irrigation system can be located outside of the structure 150.

The depicted structure 150 includes multiple rooms 152, separated at least partly from each other via walls 154. The walls 154 can include interior walls or exterior walls. Each room can further include a floor 156 and a ceiling 158. Devices can be mounted on, integrated with and/or supported by a wall 154, floor 156 or ceiling 158.

In some embodiments, the smart-home environment 100 of FIG. 1 includes various devices, including intelligent, multi-sensing, network-connected devices that may integrate seamlessly with each other, with a central server, with a cloud-computing system, or some combination of these to provide any of a variety of useful smart-home objectives. The smart-home environment 100 may include one or more intelligent, multi-sensing, network-connected thermostats 102 (hereinafter referred to as "smart thermostats 102"), one or more intelligent, network-connected, multi-sensing hazard detection units 104 (hereinafter referred to as "smart hazard detectors 104"), one or more intelligent, multi-sensing, network-connected doorbell devices 106 (hereinafter referred to as "smart doorbells 106"), one or more intelligent, network-connected door locks 107 (hereinafter referred to as "smart door locks 107"), or other device that may interconnect using wired or wireless interfaces.

According to embodiments, the smart thermostat 102 detects ambient climate characteristics (e.g., temperature and/or humidity) and controls a HVAC system 103 accordingly. The smart hazard detector 104 may detect the presence of a hazardous substance or a substance indicative of a hazardous substance (e.g., smoke, fire, or carbon monoxide). The smart doorbell 106 may detect a person's approach to or departure from a location (e.g., an outer door), control doorbell functionality, announce a person's approach or departure via audio or visual means, or control settings on a security system (e.g., to activate or deactivate the security system when occupants go and come). The smart door locks 107 may detect and toggle between a locked and unlocked condition for doors in the home, detect a person's approach to or departure from a respective door, detect whether a door is open or closed, or other suitable controls associated with a smart door lock.

In some embodiments, the smart-home environment 100 of FIG. 1 further includes one or more intelligent, multi-sensing, network-connected wall switches 108 (hereinafter referred to as "smart wall switches 108"), along with one or more intelligent, multi-sensing, network-connected wall plug interfaces 110 (hereinafter referred to as "smart wall plugs 110"). The smart wall switches 108 may detect ambient lighting conditions, detect room-occupancy states, and control a power and/or dim state of one or more lights. In some instances, smart wall switches 108 may also control a power state or speed of a fan, such as a ceiling fan. The smart wall plugs 110 may detect occupancy of a room or enclosure and control supply of power to one or more wall plugs (e.g., such that power is not supplied to the plug if nobody is at home).

Further, in some embodiments, the smart-home environment 100 of FIG. 1 includes multiple intelligent, multi-sensing, network-connected appliances 112 (hereinafter referred to as "smart appliances 112"), such as refrigerators, stoves and/or ovens, televisions, washers, dryers, lights, stereos, intercom systems, garage-door openers, floor fans, ceiling fans, wall air conditioners, pool heaters, irrigation systems, security systems, window sensors, security systems, and so forth. According to embodiments, the network-connected appliances 112 may be made compatible with the smart-home environment by cooperating with the respective manufacturers of the appliances. For example, the appliances can be space heaters, window AC units, motorized duct vents, etc. When plugged in, an appliance can announce itself to the smart-home network, such as by indicating what type of appliance it is, and it can automatically integrate with the controls of the smart-home. Such communication by the appliance to the smart home can be facilitated by any wired or wireless communication protocols known by those having ordinary skill in the art. The smart home also can include a variety of non-communicating legacy appliances 140, such as old conventional washer/dryers, refrigerators, and the like which can be controlled, albeit coarsely (ON/OFF), by virtue of the smart wall plugs 110. The smart-home environment 100 can further include a variety of partially communicating legacy appliances 142, such as infrared ("IR") controlled wall air conditioners or other IR-controlled devices, which can be controlled by IR signals provided by the smart hazard detectors 104 or the smart wall switches 108.

According to embodiments, the smart thermostats 102, the smart hazard detectors 104, the smart doorbells 106, the smart door lock 107, the smart wall switches 108, the smart wall plugs 110, and other devices of the smart-home environment 100 may be modular and may be incorporated into older and new houses. For example, in some embodiments, the devices are designed around a modular platform consisting of two basic components: a head unit and a back plate, also referred to as a docking station. Multiple configurations of the docking station are provided so as to be compatible with any home, such as older and newer homes. However, all of the docking stations include a standard head-connection arrangement, such that any head unit can be removably attached to any docking station. Thus, in some embodiments, the docking stations are interfaces that serve as physical connections to the structure and the voltage wiring of the homes, and the interchangeable head units contain all of the sensors, processors, user interfaces, the batteries, and other functional components of the devices.

Many different commercial and functional possibilities for provisioning, maintenance, and upgrade are possible. For example, after years of using any particular head unit, a user may be able to buy a new version of the head unit and simply plug it into the old docking station. There are also many different versions for the head units, such as low-cost versions with few features, and then a progression of increasingly-capable versions, up to and including sophisticated head units with a large number of features. Thus, it should be appreciated that the various versions of the head units may be interchangeable, with any of them working when placed into any docking station. This can advantageously encourage sharing and re-deployment of old head units—for example, when an important high-capability head unit, such as a hazard detector, is replaced by a new version of the head unit, then the old head unit can be re-deployed to a backroom or basement, etc. According to embodiments, when first plugged into a docking station, the head unit can ask the user (by 2D LCD display, 2D/3D holographic projection, voice interaction, etc.) a few simple questions such as, "Where am I" and the user can indicate "living room," "kitchen," and so forth.

The smart-home environment 100 may also include communication with devices outside of the physical home but within a proximate geographical range of the home. For example, the smart-home environment 100 may include a pool heater monitor 114 that communicates a current pool temperature to other devices within the smart-home environment 100 or receives commands for controlling the pool temperature. Similarly, the smart-home environment 100 may include an irrigation monitor 116 that communicates information regarding irrigation systems within the smart-home environment 100 and/or receives control information for controlling such irrigation systems. According to embodiments, an algorithm is provided for considering the geographic location of the smart-home environment 100, such as based on the zip code or geographic coordinates of the home. The geographic information then may be used to obtain data helpful for determining optimal times for watering. Such data may include sun location information, temperature, dew point, soil type of the land on which the home is located, etc.

By virtue of network connectivity, one or more of the smart-home devices of FIG. 1 can also enable a user to interact with the device even if the user is not proximate to the device. For example, a user can communicate with a device using a computer (e.g., a desktop computer, laptop computer, or tablet) or other portable electronic device (e.g., a smartphone) 166. A webpage or app can be configured to receive communications from the user and control the device based on the communications and/or to present information about the device's operation to the user. For example, the user can view a current setpoint temperature for a device and adjust it using a computer. The user can be in the structure during this remote communication or outside the structure.

As discussed, users can control the smart thermostat and other smart devices in the smart-home environment 100 using a network-connected computer or portable electronic device 166. In some embodiments, the device 166 may be connected to the smart network directly or through additional networks (e.g., WiFi) that are connected to the smart network using one or more devices (e.g., an edge router). In some examples, some or all of the occupants (e.g., individuals who live in the home) can register their device 166 with the smart-home environment 100. Such registration can be made at a central server to authenticate the occupant and/or the device as being associated with the home and to give permission to the occupant to use the device to control the smart devices in the home. An occupant may use their registered device 166 to remotely control the smart devices of the home, such as when the occupant is at work or on vacation. The occupant may also use their registered device to control the smart devices when the occupant is actually located inside the home, such as when the occupant is sitting on a couch inside the home. It should be appreciated that instead of or in addition to registering devices 166, the smart-home environment 100 may make inferences about which individuals live in the home and are therefore occupants and which devices 166 are associated with those individuals. As such, the smart-home environment "learns" who is an occupant and permits the devices 166 associated with those individuals to control the smart devices of the home.

In some instances, guests desire to control the smart devices. For example, the smart-home environment may receive communication from an unregistered mobile device of an individual inside of the home, where said individual is not recognized as an occupant of the home. For example, a smart-home environment may receive communication from a mobile device of an individual who is known to be or who is registered as a guest or determined to be on a common network (e.g., SSID WiFi network) as the smart devices.

In some embodiments, in addition to containing processing and sensing capabilities, each of the devices 102, 104, 106, 107, 108, 110, 112, 114, 116, 162, 170 and other smart devices (collectively referred to as "the smart devices") may be capable of data communications and information sharing with any other of the smart devices, as well as to any central server or cloud-computing system or any other device that is network-connected anywhere in the world. The required data communications can be carried out using any of a variety of custom or standard wireless protocols (Wi-Fi, ZigBee, 6LoWPAN, etc.) and/or any of a variety of custom or standard wired protocols (CAT6 Ethernet, HomePlug, etc.).

According to embodiments, all or some of the smart devices can serve as wireless or wired repeaters. For example, a first one of the smart devices can communicate with a second one of the smart device via a wireless router 160. The smart devices can further communicate with each other via a connection to a network, such as the Internet 162. Through the Internet 162, the smart devices can communicate with a central server or a cloud-computing system 164. The central server or cloud-computing system 164 can be associated with a manufacturer, support entity, or service provider associated with the device. For some embodiments, a user may be able to contact customer support using a device itself rather than needing to use other communication means such as a telephone or Internet-connected computer. Further, software updates can be automatically sent from the central server or cloud-computing system 164 to the smart devices (e.g., when available, when purchased, or at routine intervals).

As discussed below, the smart devices may be combined to create a mesh network. In some embodiments, this mesh network may include spokesman and low-power nodes in the smart-home environment 100, where some of the smart devices are "spokesman" nodes and others are "low-powered" nodes. Some of the smart devices in the smart-home environment 100 are battery powered, while others have a regular and reliable power source, such as by connecting to wiring (e.g., to 120V line voltage wires) behind the walls 154 of the smart-home environment. The smart devices that have a regular and reliable power source are referred to as "spokesman" nodes. These nodes are equipped with the capability of using any wireless protocol or manner to facilitate bidirectional communication with any of a variety of other devices in the smart-home environment 100 as well as with the central server or cloud-computing system 164. On the other hand, the devices that are battery powered are referred to as "low-power" nodes. These nodes tend to be smaller than spokesman nodes and may communicate using wireless protocols that requires very little power, such as ZigBee, 6LoWPAN, etc. Furthermore, some low-power nodes may also have a relatively low amount of memory to reduce power consumption. Thus, in some embodiments, these low-power nodes utilize streamlined messages and data formats of data (e.g., certificates). Further, some, but not all, low-power nodes are incapable of bidirectional communication. These low-power nodes send messages, but they are unable to "listen". Thus, other devices in the smart-home environment 100, such as the spokesman nodes, cannot send information to these low-power nodes. Additionally or alternatively, these low-power nodes may intermittently enter into low-power states that causes the low-power devices to operate using relatively lower power than a normal state of operation. Furthermore, in some of these embodiments, the low-power devices may not receive messages during the low-power states. In such embodiments, other nodes may hold messages intended for the relatively-low power nodes during these low-power states to broadcast to the respective low-power node when the low-power node exits the low-power state.

As described herein, the smart devices serve as low-power and spokesman nodes to create a mesh network in the smart-home environment 100. Individual low-power nodes in the smart-home environment regularly send out messages regarding what they are sensing, and the other low-powered nodes in the smart-home environment—in addition to sending out their own messages—repeat the messages, thereby causing the messages to travel from node to node (i.e., device to device) throughout the smart-home environment 100. The spokesman nodes in the smart-home environment 100 are able to "drop down" to low-powered communication protocols to receive these messages, translate the messages to other communication protocols, and send the translated messages to other spokesman nodes and/or the central server or cloud-computing system 164. Thus, the low-powered nodes using low-power communication protocols are able to send messages across the entire smart-home environment 100 as well as over the Internet 162 to the central server or cloud-computing system 164. According to embodiments, the mesh network enables the central server or cloud-computing system 164 to regularly receive data from all of the smart devices in the home, make inferences based on the data, and send commands back to one of the smart devices to accomplish some of the smart-home objectives described herein.

As described, the spokesman nodes and some of the low-powered nodes are capable of "listening". Accordingly, users, other devices, and the central server or cloud-computing system 164 can communicate controls to the low-powered nodes. For example, a user can use the portable electronic device (e.g., a smartphone) 166 to send commands over the Internet to the central server or cloud-computing system 164, which then relays the commands to the spokesman nodes in the smart-home environment 100. The spokesman nodes drop down to a low-power protocol to communicate the commands to the low-power nodes throughout the smart-home environment, as well as to other spokesman nodes that did not receive the commands directly from the central server or cloud-computing system 164.

An example of a low-power node is a smart nightlight 170. In addition to housing a light source, the smart nightlight 170 houses an occupancy sensor, such as an ultrasonic or passive IR sensor, and an ambient light sensor, such as a photoresistor or a single-pixel sensor that measures light in the room. In some embodiments, the smart nightlight 170 is configured to activate the light source when its ambient light sensor detects that the room is dark and when its occupancy sensor detects that someone is in the room. In other embodiments, the smart nightlight 170 is simply configured to activate the light source when its ambient light sensor detects that the room is dark. Further, according to some embodiments, the smart nightlight 170 includes a low-power wireless communication chip (e.g., ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly, using the mesh network, from node to node (i.e., smart device to smart device) within the smart-home environment 100 as well as over the Internet 162 to the central server or cloud-computing system 164.

Other examples of low-powered nodes include battery-operated versions of the smart hazard detectors 104. These smart hazard detectors 104 are often located in an area without access to constant and reliable power and, as discussed in detail below, may include any number and type of sensors, such as smoke/fire/heat sensors, carbon monoxide/dioxide sensors, occupancy/motion sensors, ambient light sensors, temperature sensors, humidity sensors, and the like. Furthermore, smart hazard detectors 104 can send messages that correspond to each of the respective sensors to the other devices and the central server or cloud-computing system 164, such as by using the mesh network as described above.

Examples of spokesman nodes include smart doorbells 106, smart thermostats 102, smart wall switches 108, and smart wall plugs 110. These devices 102, 106, 108, and 110 are often located near and connected to a reliable power source, and therefore can include more power-consuming components, such as one or more communication chips capable of bidirectional communication in any variety of protocols.

In some embodiments, these low-powered and spokesman nodes (e.g., devices 102, 104, 106, 107, 108, 110, 112, and 170) may function as "tripwires" for an alarm system in the smart-home environment. For example, in the event a perpetrator circumvents detection by alarm sensors located at windows, doors, and other entry points of the smart-home environment 100, the alarm could be triggered upon receiving an occupancy, motion, heat, sound, etc. message from one or more of the low-powered and spokesman nodes in the mesh network. For example, upon receiving a message from a smart nightlight 170 indicating the presence of a person, the central server or cloud-computing system 164 or some other device could trigger an alarm, provided the alarm is armed at the time of detection. Thus, the alarm system could be enhanced by various low-powered and spokesman nodes located throughout the smart-home environment 100. In this example, a user could enhance the security of the smart-home environment 100 by buying and installing extra smart nightlights 170.

In some embodiments, the mesh network can be used to automatically turn on and off lights as a person transitions from room to room. For example, the low-powered and spokesman nodes (e.g., devices 102, 104, 106, 107, 108, 110, 112, and 170) detect the person's movement through the smart-home environment and communicate corresponding messages through the mesh network. Using the messages that indicate which rooms are occupied, the central server or cloud-computing system 164 or some other device activates and deactivates the smart wall switches 108 to automatically provide light as the person moves from room to room in the smart-home environment 100. Further, users may provide pre-configuration information that indicates which smart wall plugs 110 provide power to lamps and other light sources, such as the smart nightlight 170. Alternatively, this mapping of light sources to wall plugs 110 can be done automatically (e.g., the smart wall plugs 110 detect when a light source is plugged into it, and it sends a corresponding message to the central server or cloud-computing system 164). Using this mapping information in combination with messages that indicate which rooms are occupied, the central server or cloud-computing system 164 or some other device activates and deactivates the smart wall plugs 110 that provide power to lamps and other light sources so as to track the person's movement and provide light as the person moves from room to room.

In some embodiments, the mesh network of low-powered and spokesman nodes can be used to provide exit lighting in the event of an emergency or an emergency drill. In some instances, to facilitate this, users provide pre-configuration information that indicates exit routes in the smart-home environment 100. For example, for each room in the house, the user may provide a map of the best exit route depending on availability of the route. In some situations the route may be blocked by a hazard, and an alternate route may be illuminated and indicated, if available. It should be appreciated that instead of a user providing this information, the central server or cloud-computing system 164 or some other device could automatically determine the routes using uploaded maps, diagrams, architectural drawings of the smart-home house, as well as using a map generated based on positional information obtained from the nodes of the mesh network (e.g., positional information from the devices is used to construct a map of the house). In operation, when an alarm is activated (e.g., when one or more of the smart hazard detector 104 detects smoke and activates an alarm), the central server or cloud-computing system 164 or some other device uses occupancy information obtained from the low-powered and spokesman nodes to determine which rooms are occupied and then turns on lights (e.g., nightlights 170, wall switches 108, wall plugs 110 that power lamps, etc.) along the exit routes from the occupied rooms so as to provide emergency exit lighting.

Also included and illustrated in the smart-home environment 100 of FIG. 1 are service robots 162 each configured to carry out, in an autonomous manner, any of a variety of household tasks. For some embodiments, the service robots 162 can be respectively configured to perform floor sweeping, floor washing, etc. in a manner similar to that of known commercially available devices such as the ROOMBA™ and SCOOBA™ products sold by iRobot, Inc. of Bedford, Mass. Tasks such as floor sweeping and floor washing can be considered as "away" or "while-away" tasks for purposes of the instant description, as it is generally more desirable for these tasks to be performed when the occupants are not present. For other embodiments, one or more of the service robots 162 are configured to perform tasks such as playing music for an occupant, serving as a localized thermostat for an occupant, serving as a localized air monitor/purifier for an occupant, serving as a localized baby monitor, serving as a localized hazard detector for an occupant, and so forth, it being generally more desirable for such tasks to be carried out in the immediate presence of the human occupant. For purposes of the instant description, such tasks can be considered as "human-facing" or "human-centric" tasks.

When serving as a localized thermostat for an occupant, a particular one of the service robots 162 can be considered to be facilitating what can be called a "personal comfort-area network" for the occupant, with the objective being to keep the occupant's immediate space at a comfortable temperature wherever that occupant may be located in the home. This can be contrasted with conventional wall-mounted room thermostats, which have the more attenuated objective of keeping a statically-defined structural space at a comfortable temperature. According to one embodiment, the localized-thermostat service robot 162 is configured to move itself into the immediate presence (e.g., within five feet) of a particular occupant who has settled into a particular location in the home (e.g. in the dining room to eat their breakfast and read the news). The localized-thermostat service robot 162 includes a temperature sensor, a processor, and wireless communication components configured such that control communications with the HVAC system, either directly or through a wall-mounted wirelessly communicating thermostat coupled to the HVAC system, are maintained and such that the temperature in the immediate vicinity of the occupant is maintained at their desired level. If the occupant then moves and settles into another location (e.g. to the living room couch to watch television), the localized-thermostat service robot 162 proceeds to move and park itself next to the couch and keep that particular immediate space at a comfortable temperature.

Technologies by which the localized-thermostat service robot 162 (and/or the larger smart-home system of FIG. 1) can identify and locate the occupant whose personal-area space is to be kept at a comfortable temperature can include, but are not limited to, RFID sensing (e.g., person having an RFID bracelet, RFID necklace, cellular phone RFID, or RFID key fob), synthetic vision techniques (e.g., video cameras and face recognition processors), audio techniques (e.g., voice, sound pattern, vibration pattern recognition), ultrasound sensing/imaging techniques, and infrared or near-field communication (NFC) techniques (e.g., person wearing an infrared or NFC-capable smartphone), along with rules-based inference engines or artificial intelligence techniques that draw useful conclusions from the sensed information (e.g., if there is only a single occupant present in the home, then that is the person whose immediate space should be kept at a comfortable temperature, and the selection of the desired comfortable temperature should correspond to that occupant's particular stored profile).

When serving as a localized air monitor/purifier for an occupant, a particular service robot 162 can be considered to be facilitating what can be called a "personal health-area network" for the occupant, with the objective being to keep the air quality in the occupant's immediate space at healthy levels. Alternatively or in conjunction therewith, other health-related functions can be provided, such as monitoring the temperature or heart rate of the occupant (e.g., using finely remote sensors, near-field communication with on-person monitors, etc.). When serving as a localized hazard detector for an occupant, a particular service robot 162 can be considered to be facilitating what can be called a "personal safety-area network" for the occupant, with the objective being to ensure there is no excessive carbon monoxide, smoke, fire, etc., in the immediate space of the occupant. Methods analogous to those described above for personal comfort-area networks in terms of occupant identifying and tracking are likewise applicable for personal health-area network and personal safety-area network embodiments.

According to some embodiments, the above-referenced facilitation of personal comfort-area networks, personal health-area networks, personal safety-area networks, and/or other such human-facing functionalities of the service robots 162, are further enhanced by logical integration with other smart sensors in the home according to rules-based inferencing techniques or artificial intelligence techniques for achieving better performance of those human-facing functionalities and/or for achieving those goals in energy-conserving or other resource-conserving ways. Thus, for one embodiment relating to personal health-area networks, the air monitor/purifier service robot 162 can be configured to detect whether a household pet is moving toward the currently settled location of the occupant (e.g., using on-board sensors and/or by data communications with other smart-home sensors along with rules-based inferencing/artificial intelligence techniques), and if so, the air purifying rate is immediately increased in preparation for the arrival of more airborne pet dander. For another embodiment relating to personal safety-area networks, the hazard detector service robot 162 can be advised by other smart-home sensors that the temperature and humidity levels are rising in the kitchen, which is nearby to the occupant's current dining room location, and responsive to this advisory the hazard detector service robot 162 will temporarily raise a hazard detection threshold, such as a smoke detection threshold, under an inference that any small increases in ambient smoke levels will most likely be due to cooking activity and not due to a genuinely hazardous condition.

The above-described "human-facing" and "away" functionalities can be provided, without limitation, by multiple distinct service robots 162 having respective dedicated ones of such functionalities, by a single service robot 162 having an integration of two or more different ones of such functionalities, and/or any combinations thereof (including the ability for a single service robot 162 to have both "away" and "human facing" functionalities) without departing from the scope of the present teachings. Electrical power can be provided by virtue of rechargeable batteries or other rechargeable methods, with FIG. 1 illustrating an exemplary out-of-the-way docking station 164 to which the service robots 162 will automatically dock and recharge its batteries (if needed) during periods of inactivity. Preferably, each service robot 162 includes wireless communication components that facilitate data communications with one or more of the other wirelessly communicating smart-home sensors of FIG. 1 and/or with one or more other service robots 162 (e.g., using Wi-Fi, ZigBee, Z-Wave, 6LoWPAN, etc.), and one or more of the smart-home devices of FIG. 1 can be in communication with a remote server over the Internet. Alternatively or in conjunction therewith, each service robot 162 can be configured to communicate directly with a remote server by virtue of cellular telephone communications, satellite communications, 3G/4G network data communications, or other direct communication method.

Provided according to some embodiments are systems and methods relating to the integration of the service robot(s) 162 with home security sensors and related functionalities of the smart home system. The embodiments are particularly applicable and advantageous when applied for those service robots 162 that perform "away" functionalities or that otherwise are desirable to be active when the home is unoccupied (hereinafter "away-service robots"). Included in the embodiments are methods and systems for ensuring that home security systems, intrusion detection systems, and/or occupancy-sensitive environmental control systems (for example, occupancy-sensitive automated setback thermostats that enter into a lower-energy-using condition when the home is unoccupied) are not erroneously triggered by the away-service robots.

Provided according to some embodiments is a home automation and security system (e.g., as shown in FIG. 1) that is remotely monitored by a monitoring service by virtue of automated systems (e.g., cloud-based servers or other central servers, hereinafter "central server") that are in data communications with one or more network-connected elements of the home automation and security system. The away-service robots are configured to be in operative data communication with the central server, and are configured such that they remain in a non-away-service state (e.g., a dormant state at their docking station) unless permission is granted from the central server (e.g., by virtue of an "away-service-OK" message from the central server) to commence their away-service activities. An away-state determination made by the system, which can be arrived at (i) exclusively by local on-premises smart device(s) based on occupancy sensor data, (ii) exclusively by the central server based on received occupancy sensor data and/or based on received proximity-related information such as GPS coordinates from user smartphones or automobiles, or (iii) any combination of (i) and (ii) can then trigger the granting of away-service permission to the away-service robots by the central server. During the course of the away-service robot activity, during which the away-service robots may continuously detect and send their in-home location coordinates to the central server, the central server can readily filter signals from the occupancy sensing devices to distinguish between the away-service robot activity versus any unexpected intrusion activity, thereby avoiding a false intrusion alarm condition while also ensuring that the home is secure. Alternatively or in conjunction therewith, the central server may provide filtering data (such as an expected occupancy-sensing profile triggered by the away-service robots) to the occupancy sensing nodes or associated processing nodes of the smart home, such that the filtering is performed at the local level. Although somewhat less secure, it would also be within the scope of the present teachings for the central server to temporarily disable the occupancy sensing equipment for the duration of the away-service robot activity.

According to another embodiment, functionality similar to that of the central server in the above example can be performed by an on-site computing device such as a dedicated server computer, a "master" home automation console or panel, or as an adjunct function of one or more of the smart-home devices of FIG. 1. In such an embodiment, there would be no dependency on a remote service provider to provide the "away-service-OK" permission to the away-service robots and the false-alarm-avoidance filtering service or filter information for the sensed intrusion detection signals.

According to other embodiments, there are provided methods and systems for implementing away-service robot functionality while avoiding false home security alarms and false occupancy-sensitive environmental controls without the requirement of a single overall event orchestrator. For purposes of the simplicity in the present disclosure, the home security systems and/or occupancy-sensitive environmental controls that would be triggered by the motion, noise, vibrations, or other disturbances of the away-service robot activity are referenced simply as "activity sensing systems," and when so triggered will yield a "disturbance-detected" outcome representative of the false trigger (for example, an alarm message to a security service, or an "arrival" determination for an automated setback thermostat that causes the home to be heated or cooled to a more comfortable "occupied" setpoint temperature). According to one embodiment, the away-service robots are configured to emit a standard ultrasonic sound throughout the course of their away-service activity, the activity sensing systems are configured to detect that standard ultrasonic sound, and the activity sensing systems are further configured such that no disturbance-detected outcome will occur for as long as that standard ultrasonic sound is detected. For other embodiments, the away-service robots are configured to emit a standard notification signal throughout the course of their away-service activity, the activity sensing systems are configured to detect that standard notification signal, and the activity sensing systems are further configured such that no disturbance-detected outcome will occur for as long as that standard notification signal is detected, wherein the standard notification signal comprises one or more of: an optical notifying signal; an audible notifying signal; an infrared notifying signal; an infrasonic notifying signal; a wirelessly transmitted data notification signal (e.g., an IP broadcast, multicast, or unicast notification signal, or a notification message sent in an TCP/IP two-way communication session).

According to some embodiments, the notification signals sent by the away-service robots to the activity sensing systems are authenticated and encrypted such that the notifications cannot be learned and replicated by a potential burglar. Any of a variety of known encryption/authentication schemes can be used to ensure such data security including, but not limited to, methods involving third party data security services or certificate authorities. For some embodiments, a permission request-response model can be used, wherein any particular away-service robot requests permission from each activity sensing system in the home when it is ready to perform its away-service tasks, and does not initiate such activity until receiving a "yes" or "permission granted" message from each activity sensing system (or from a single activity sensing system serving as a "spokesman" for all of the activity sensing systems). One advantage of the described embodiments that do not require a central event orchestrator is that there can (optionally) be more of an arms-length relationship between the supplier(s) of the home security/environmental control equipment, on the one hand, and the supplier(s) of the away-service robot(s), on the other hand, as it is only required that there is the described standard one-way notification protocol or the described standard two-way request/permission protocol to be agreed upon by the respective suppliers.

According to some embodiments, the activity sensing systems are configured to detect sounds, vibrations, RF emissions, or other detectable environmental signals or "signatures" that are intrinsically associated with the away-service activity of each away-service robot, and are further configured such that no disturbance-detected outcome will occur for as long as that particular detectable signal or environmental "signature" is detected. By way of example, a particular kind of vacuum-cleaning away-service robot may emit a specific sound or RF signature. For one embodiment, the away-service environmental signatures for each of multiple known away-service robots are stored in the memory of the activity sensing systems based on empirically collected data, the environmental signatures being supplied with the activity sensing systems and periodically updated by a remote update server. For another embodiment, the activity sensing systems can be placed into a "training mode" for the particular home in which they are installed, wherein they "listen" and "learn" the particular environmental signatures of the away-service robots for that home during that training session, and thereafter will suppress disturbance-detected outcomes for intervals in which those environmental signatures are heard. Furthermore, as discussed below, sonic or visual sensing may be used to verify that a user is within predetermined range (e.g., range of sonic or visual detection) of the smart device detecting the sonic or visual stimulus.

For some embodiments, which are particularly useful when the activity sensing system is associated with occupancy-sensitive environmental control equipment rather than a home security system, the activity sensing system is configured to automatically learn the environmental signatures for the away-service robots by virtue of automatically performing correlations over time between detected environmental signatures and detected occupancy activity. By way of example, for one embodiment an intelligent automated nonoccupancy-triggered setback thermostat such as the Nest Learning Thermostat can be configured to constantly monitor for audible and RF activity as well as to perform infrared-based occupancy detection. In particular view of the fact that the environmental signature of the away-service robot will remain relatively constant from event to event, and in view of the fact that the away-service events will likely either (a) themselves be triggered by some sort of nonoccupancy condition as measured by the away-service robots themselves, or (b) occur at regular times of day, there will be patterns in the collected data by which the events themselves will become apparent and for which the environmental signatures can be readily learned. Generally speaking, for this automatic-learning embodiment in which the environmental signatures of the away-service robots are automatically learned without requiring user interaction, it is more preferable that a certain number of false triggers be tolerable over the course of the learning process. Accordingly, this automatic-learning embodiment is more preferable for application in occupancy-sensitive environmental control equipment (such as an automated setback thermostat) rather than home security systems for the reason that a few false occupancy determinations may cause a few instances of unnecessary heating or cooling, but will not otherwise have any serious consequences, whereas false home security alarms may have more serious consequences.

According to embodiments, technologies including the sensors of the smart devices located in the mesh network of the smart-home environment in combination with rules-based inference engines or artificial intelligence provided at the central server or cloud-computing system 164 are used to provide a personal "smart alarm clock" for individual occupants of the home. For example, user-occupants can communicate with the central server or cloud-computing system 164 via their mobile devices 166 to access an interface for the smart alarm clock. There, occupants can turn on their "smart alarm clock" and input a wake time for the next day and/or for additional days. In some embodiments, the occupant may have the option of setting a specific wake time for each day of the week, as well as the option of setting some or all of the inputted wake times to "repeat". Artificial intelligence will be used to consider the occupant's response to these alarms when they go off and make inferences about the user's preferred sleep patterns over time.

According to embodiments, the smart device in the smart-home environment 100 that happens to be closest to the occupant when the occupant falls asleep will be the device that transmits messages regarding when the occupant stopped moving, from which the central server or cloud-computing system 164 will make inferences about where and when the occupant prefers to sleep. This closest smart device will as be the device that sounds the alarm to wake the occupant. In this manner, the "smart alarm clock" will follow the occupant throughout the house, by tracking the individual occupants based on their "unique signature", which is determined based on data obtained from sensors located in the smart devices. For example, the sensors include ultrasonic sensors, passive IR sensors, and the like. The unique signature is based on a combination of walking gait, patterns of movement, voice, height, size, etc. It should be appreciated that facial recognition may also be used.

According to an embodiment, the wake times associated with the "smart alarm clock" are used by the smart thermostat 102 to control the HVAC in an efficient manner so as to pre-heat or cool the house to the occupant's desired "sleeping" and "awake" temperature settings. The preferred settings can be learned over time, such as by observing which temperature the occupant sets the thermostat to before going to sleep and which temperature the occupant sets the thermostat to upon waking up.

According to an embodiment, a device is positioned proximate to the occupant's bed, such as on an adjacent nightstand, and collects data as the occupant sleeps using noise sensors, motion sensors (e.g., ultrasonic, IR, and optical), etc. Data may be obtained by the other smart devices in the room as well. Such data may include the occupant's breathing patterns, heart rate, movement, etc. Inferences are made based on this data in combination with data that indicates when the occupant actually wakes up. For example, if—on a regular basis—the occupant's heart rate, breathing, and moving all increase by 5% to 10%, twenty to thirty minutes before the occupant wakes up each morning, then predictions can be made regarding when the occupant is going to wake. Other devices in the home can use these predictions to provide other smart-home objectives, such as adjusting the smart thermostat 102 so as to pre-heat or cool the home to the occupant's desired setting before the occupant wakes up. Further, these predictions can be used to set the "smart alarm clock" for the occupant, to turn on lights, etc.

According to embodiments, technologies including the sensors of the smart devices located throughout the smart-home environment in combination with rules-based inference engines or artificial intelligence provided at the central server or cloud-computing system 164 are used to detect or monitor the progress of Alzheimer's disease. For example, the unique signatures of the occupants are used to track the individual occupants' movement throughout the smart-home environment 100. This data can be aggregated and analyzed to identify patterns indicative of Alzheimer's. Oftentimes, individuals with Alzheimer's have distinctive patterns of migration in their homes. For example, a person will walk to the kitchen and stand there for a while, then to the living room and stand there for a while, and then back to the kitchen. This pattern will take about thirty minutes, and then the person will repeat the pattern. According to embodiments, the remote servers or cloud computing architectures 164 analyze the person's migration data collected by the mesh network of the smart-home environment to identify such patterns.

Figure 2:
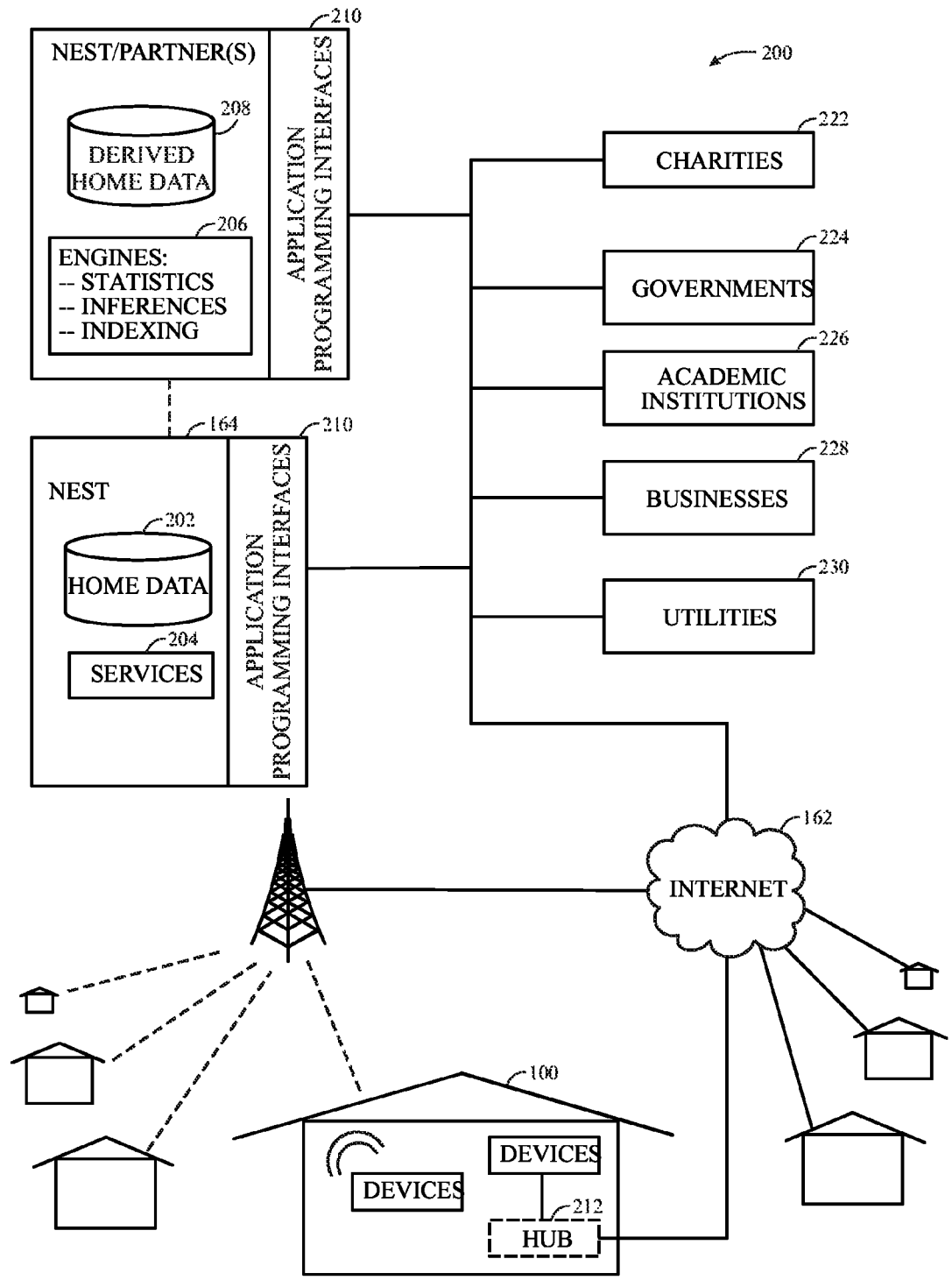
FIG. 2 illustrates a network-level view of an extensible devices and services platform with which the smart-home environment of FIG. 1 can be integrated, according to an embodiment.

FIG. 2 illustrates a network-level view of an extensible devices and services platform 200 with which multiple smart-home environments, such as the smart-home environment 100 of FIG. 1, can be integrated. The extensible devices and services platform 200 includes remote servers or cloud computing architectures 164. Each of the smart devices can communicate with the remote servers or cloud computing architectures 164. For example, a connection to the Internet 162 can be established either directly (for example, using 3G/4G connectivity to a wireless carrier), through a wireless mesh network (which can be a scheme ranging from a simple wireless router, for example, up to and including an intelligent, dedicated whole-home control node), or through any combination thereof. The smart network may couple to the Internet 162 using a hub 212.

Although in some examples provided herein, the devices and services platform 200 communicates with and collects data from the smart devices of smart-home environment 100 of FIG. 1, it should be appreciated that the devices and services platform 200 may communicate with and collect data from multiple smart-home environments across the world. For example, the central server or cloud-computing system 164 can collect home data 202 from the devices of one or more smart-home environments, where the devices can routinely transmit home data or can transmit home data in specific instances (e.g., when a device queries the home data 202). Thus, the devices and services platform 200 may routinely collect data from homes across the world. As described, the collected home data 202 includes, for example, power consumption data, occupancy data, HVAC settings and usage data, carbon monoxide levels data, carbon dioxide levels data, volatile organic compounds levels data, sleeping schedule data, cooking schedule data, inside and outside temperature humidity data, television viewership data, inside and outside noise level data, etc.

The central server or cloud-computing architecture 164 can further provide one or more services 204. The services 204 can include, e.g., software updates, customer support, sensor data collection/logging, weather information, account information, remote access, remote or distributed control, or use suggestions (e.g., based on collected home data 202 to improve performance, reduce utility cost, etc.). Data associated with the services 204 can be stored at the central server or cloud-computing system 164 and the central server or the cloud-computing system 164 can retrieve and transmit the data at an appropriate time (e.g., at regular intervals, upon receiving a request from a user, etc.).

As illustrated in FIG. 2, an embodiment of the extensible devices and services platform 200 includes a processing engine 206, which can be concentrated at a single server or distributed among several different computing entities without limitation. The processing engine 206 can include engines configured to receive data from devices of smart-home environments (e.g., via the Internet or a hubbed network), to index the data, to analyze the data and/or to generate statistics based on the analysis or as part of the analysis. The analyzed data can be stored as derived home data 208.

Results of the analysis or statistics can thereafter be transmitted back to the device that provided home data used to derive the results, to other devices, to a server providing a webpage to a user of the device, or to other non-device entities. For example, use statistics, use statistics relative to use of other devices, use patterns, and/or statistics summarizing sensor readings can be generated by the processing engine 206 and transmitted. The results or statistics can be provided via the Internet 162. In this manner, the processing engine 206 can be configured and programmed to derive a variety of useful information from the home data 202. A single server can include one or more engines.

The derived data can be highly beneficial at a variety of different granularities for a variety of useful purposes, ranging from explicit programmed control of the devices on a per-home, per-neighborhood, or per-region basis (for example, demand-response programs for electrical utilities), to the generation of inferential abstractions that can assist on a per-home basis (for example, an inference can be drawn that the homeowner has left for vacation and so security detection equipment can be put on heightened sensitivity), to the generation of statistics and associated inferential abstractions that can be used for government or charitable purposes. For example, processing engine 206 can generate statistics about device usage across a population of devices and send the statistics to device users, service providers or other entities (e.g., that have requested or may have provided monetary compensation for the statistics).

According to some embodiments, the home data 202, the derived home data 208, and/or another data can be used to create "automated neighborhood safety networks." For example, in the event the central server or cloud-computing architecture 164 receives data indicating that a particular home has been broken into, is experiencing a fire, or some other type of emergency event, an alarm is sent to other smart homes in the "neighborhood." In some instances, the central server or cloud-computing architecture 164 automatically identifies smart homes within a radius of the home experiencing the emergency and sends an alarm to the identified homes. In such instances, the other homes in the "neighborhood" do not have to sign up for or register to be a part of a safety network, but instead are notified of an emergency based on their proximity to the location of the emergency. This creates robust and evolving neighborhood security watch networks, such that if one person's home is getting broken into, an alarm can be sent to nearby homes, such as by audio announcements via the smart devices located in those homes. Additionally or alternatively, if a neighbor's hazard detector detects smoke, neighboring houses may activate irrigation systems to reduce likelihood of a spread of fire. It should be appreciated that this safety network can be an opt-in service and that, in addition to or instead of the central server or cloud-computing architecture 164 selecting which homes to send alerts to, individuals can subscribe to participate in such networks and individuals can specify which homes they want to receive alerts from. This can include, for example, the homes of family members who live in different cities, such that individuals can receive alerts when their loved ones in other locations are experiencing an emergency.

According to some embodiments, sound, vibration, and/or motion sensing components of the smart devices are used to detect sound, vibration, and/or motion created by running water. Based on the detected sound, vibration, and/or motion, the central server or cloud-computing architecture 164 makes inferences about water usage in the home and provides related services. For example, the central server or cloud-computing architecture 164 can run programs/algorithms that recognize what water sounds like and when it is running in the home. According to one embodiment, to map the various water sources of the home, upon detecting running water, the central server or cloud-computing architecture 164 sends a message an occupant's mobile device asking if water is currently running or if water has been recently run in the home and, if so, which room and which water-consumption appliance (e.g., sink, shower, toilet, etc.) was the source of the water. This enables the central server or cloud-computing architecture 164 to determine the "signature" or "fingerprint" of each water source in the home. This is sometimes referred to herein as "audio fingerprinting water usage."

In one illustrative example, the central server or cloud-computing architecture 164 creates a signature for the toilet in the master bathroom, and whenever that toilet is flushed, the central server or cloud-computing architecture 164 will know that the water usage at that time is associated with that toilet. Thus, the central server or cloud-computing architecture 164 can track the water usage of that toilet as well as each water-consumption application in the home. This information can be correlated to water bills or smart water meters so as to provide users with a breakdown of their water usage.

According to some embodiments, sound, vibration, and/or motion sensing components of the smart devices are used to detect sound, vibration, and/or motion created by mice and other rodents as well as by termites, cockroaches, and other insects (collectively referred to as "pests"). Based on the detected sound, vibration, and/or motion, the central server or cloud-computing architecture 164 makes inferences about pest-detection in the home and provides related services. For example, the central server or cloud-computing architecture 164 can run programs/algorithms that recognize what certain pests sound like, how they move, and/or the vibration they create, individually and/or collectively. According to one embodiment, the central server or cloud-computing architecture 164 can determine the "signatures" of particular types of pests.

For example, in the event the central server or cloud-computing architecture 164 detects sounds that may be associated with pests, it notifies the occupants of such sounds and suggests hiring a pest control company. If it is confirmed that pests are indeed present, the occupants input to the central server or cloud-computing architecture 164 confirms that its detection was correct, along with details regarding the identified pests, such as name, type, description, location, quantity, etc. This enables the central server or cloud-computing architecture 164 to "tune" itself for better detection and create "signatures" or "fingerprints" for specific types of pests. For example, the central server or cloud-computing architecture 164 can use the tuning as well as the signatures and fingerprints to detect pests in other homes, such as nearby homes that may be experiencing problems with the same pests. Further, for example, in the event that two or more homes in a "neighborhood" are experiencing problems with the same or similar types of pests, the central server or cloud-computing architecture 164 can make inferences that nearby homes may also have such problems or may be susceptible to having such problems, and it can send warning messages to those homes to help facilitate early detection and prevention.

In some embodiments, to encourage innovation and research and to increase products and services available to users, the devices and services platform 200 expose a range of application programming interfaces (APIs) 210 to third parties, such as charities 222, governmental entities 224 (e.g., the Food and Drug Administration or the Environmental Protection Agency), academic institutions 226 (e.g., university researchers), businesses 228 (e.g., providing device warranties or service to related equipment, targeting advertisements based on home data), utility companies 230, and other third parties. The APIs 210 may be coupled to and permit third-party systems to communicate with the central server or the cloud-computing system 164, including the services 204, the processing engine 206, the home data 202, and the derived home data 208. For example, APIs 210 may allow applications executed by the third parties to initiate specific data processing tasks that are executed by the central server or the cloud-computing system 164, as well as to receive dynamic updates to the home data 202 and the derived home data 208.

For example, third parties can develop programs and/or applications, such as web or mobile apps that integrate with the central server or the cloud-computing system 164 to provide services and information to users. Such programs and application may be, for example, designed to help users reduce energy consumption, to preemptively service faulty equipment, to prepare for high service demands, to track past service performance, etc., or to perform any of a variety of beneficial functions or tasks now known or hereinafter developed.

According to some embodiments, third-party applications make inferences from the home data 202 and the derived home data 208, such inferences may include when are occupants home, when are they sleeping, when are they cooking, when are they in the den watching television, and when do they shower. The answers to these questions may help third-parties benefit consumers by providing them with interesting information, products and services as well as with providing them with targeted advertisements.

In one example, a shipping company creates an application that makes inferences regarding when people are at home. The application uses the inferences to schedule deliveries for times when people will most likely be at home. The application can also build delivery routes around these scheduled times. This reduces the number of instances where the shipping company has to make multiple attempts to deliver packages, and it reduces the number of times consumers have to pick up their packages from the shipping company.

Figure 3:
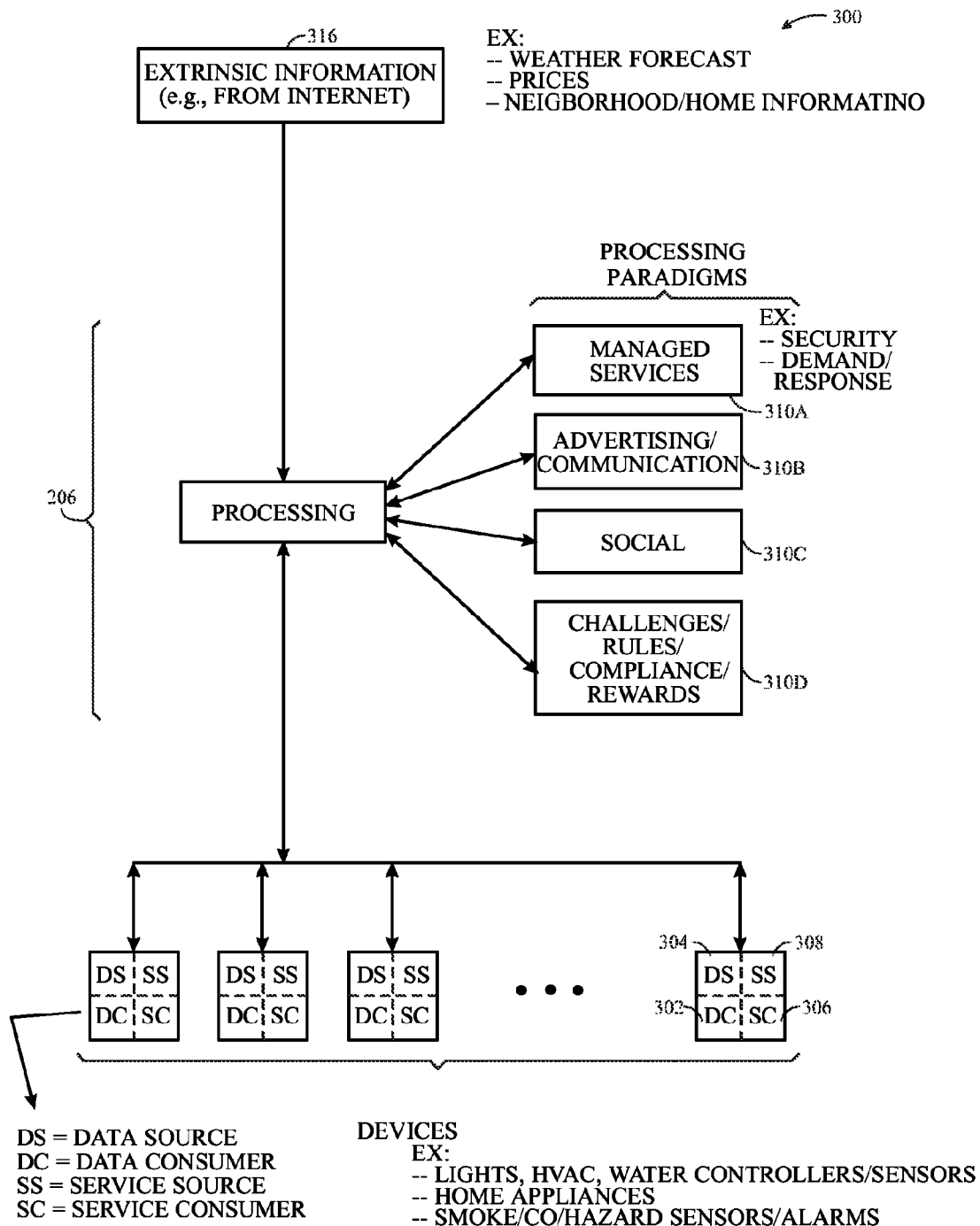
FIG. 3 illustrates a functional view of the extensible devices and services platform of FIG. 2, with reference to a processing engine as well as devices of the smart-home environment, according to an embodiment.

FIG. 3 illustrates a functional view 300 of the extensible devices and services platform 200 of FIG. 2, with particular reference to the processing engine 206 as well as devices, such as those of the smart-home environment 100 of FIG. 1. Even though devices situated in smart-home environments may have an endless variety of different individual capabilities and limitations, they can all be thought of as sharing common characteristics in that each of them is a data consumer 302 (DC), a data source 304 (DS), a services consumer 306 (SC), and a services source 308 (SS). Advantageously, in addition to providing the essential control information needed for the devices to achieve their local and immediate objectives, the extensible devices and services platform 200 can also be configured to harness the large amount of data that is flowing out of these devices. In addition to enhancing or optimizing the actual operation of the devices themselves with respect to their immediate functions, the extensible devices and services platform 200 can be directed to "repurposing" that data in a variety of automated, extensible, flexible, and/or scalable ways to achieve a variety of useful objectives. These objectives may be predefined or adaptively identified based on, e.g., usage patterns, device efficiency, and/or user input (e.g., requesting specific functionality).

For example, FIG. 3 shows processing engine 206 as including a number of paradigms 310. Processing engine 206 can include a managed services paradigm 310a that monitors and manages primary or secondary device functions. The device functions can include ensuring proper operation of a device given user inputs, estimating that (e.g., and responding to an instance in which) an intruder is or is attempting to be in a dwelling, detecting a failure of equipment coupled to the device (e.g., a light bulb having burned out), implementing or otherwise responding to energy demand response events, or alerting a user of a current or predicted future event or characteristic. Processing engine 206 can further include an advertising/communication paradigm 310b that estimates characteristics (e.g., demographic information), desires and/or products of interest of a user based on device usage. Services, promotions, products or upgrades can then be offered or automatically provided to the user. Processing engine 206 can further include a social paradigm 310c that uses information from a social network, provides information to a social network (for example, based on device usage), and/or processes data associated with user and/or device interactions with the social network platform. For example, a user's status as reported to their trusted contacts on the social network could be updated to indicate when they are home based on light detection, security system inactivation or device usage detectors. As another example, a user may be able to share device-usage statistics with other users. In yet another example, a user may share HVAC settings that result in low power bills and other users may download the HVAC settings to their smart thermostat 102 to reduce their power bills.

The processing engine 206 can include a challenges/rules/compliance/rewards paradigm 310d that informs a user of challenges, competitions, rules, compliance regulations and/or rewards and/or that uses operation data to determine whether a challenge has been met, a rule or regulation has been complied with and/or a reward has been earned. The challenges, rules or regulations can relate to efforts to conserve energy, to live safely (e.g., reducing exposure to toxins or carcinogens), to conserve money and/or equipment life, to improve health, to conduct safety drills, etc. For example, one challenge may involve participants turning down their thermostat by one degree for one week. Those that successfully complete the challenge are rewarded, such as by coupons, virtual currency, status, etc. Regarding compliance, an example involves a rental-property owner making a rule that no renters are permitted to access certain owner's rooms. The devices in the room having occupancy sensors could send updates to the owner when the room is accessed.

The processing engine 206 may integrate or otherwise utilize extrinsic information 316 from extrinsic sources to improve the functioning of one or more processing paradigms. Extrinsic information 316 can be used to interpret data received from a device, to determine a characteristic of the environment near the device (e.g., outside a structure that the device is enclosed in), to determine services or products available to the user, to identify a social network or social-network information, to determine contact information of entities (e.g., public-service entities such as an emergency-response team, the police or a hospital) near the device, etc., to identify statistical or environmental conditions, trends or other information associated with a home or neighborhood, and so forth.

An extraordinary range and variety of benefits may be brought about by, and fit within the scope of, the described extensible devices and services platform 200, ranging from the ordinary to the profound. Thus, in one "ordinary" example, each bedroom of the smart-home environment 100 can be provided with a smart wall switch 108, a smart wall plug 110, and/or smart hazard detectors 104, all or some of which include an occupancy sensor, wherein the occupancy sensor is also capable of inferring (e.g., by virtue of motion detection, facial recognition, audible sound patterns, etc.) whether the occupant is asleep or awake. If a fire event is sensed, the remote security/monitoring service or fire department is advised of how many occupants there are in each bedroom, and whether those occupants are still asleep (or immobile) or whether they have properly evacuated the bedroom. While this is, of course, a very advantageous capability accommodated by the described extensible devices and services platform, there can be substantially more "profound" examples that can truly illustrate the potential of a larger "intelligence" that can be made available. By way of perhaps a more "profound" example, the same bedroom occupancy data that is being used for fire safety can also be "repurposed" by the processing engine 206 in the context of a social paradigm of neighborhood child development and education. Thus, for example, the same bedroom occupancy and motion data discussed in the "ordinary" example can be collected and made available (properly anonymized) for processing in which the sleep patterns of schoolchildren in a particular ZIP code can be identified and tracked. Localized variations in the sleeping patterns of the schoolchildren may be identified and correlated, for example, to different nutrition programs in local schools.

II. Smart Devices

Figure 4:
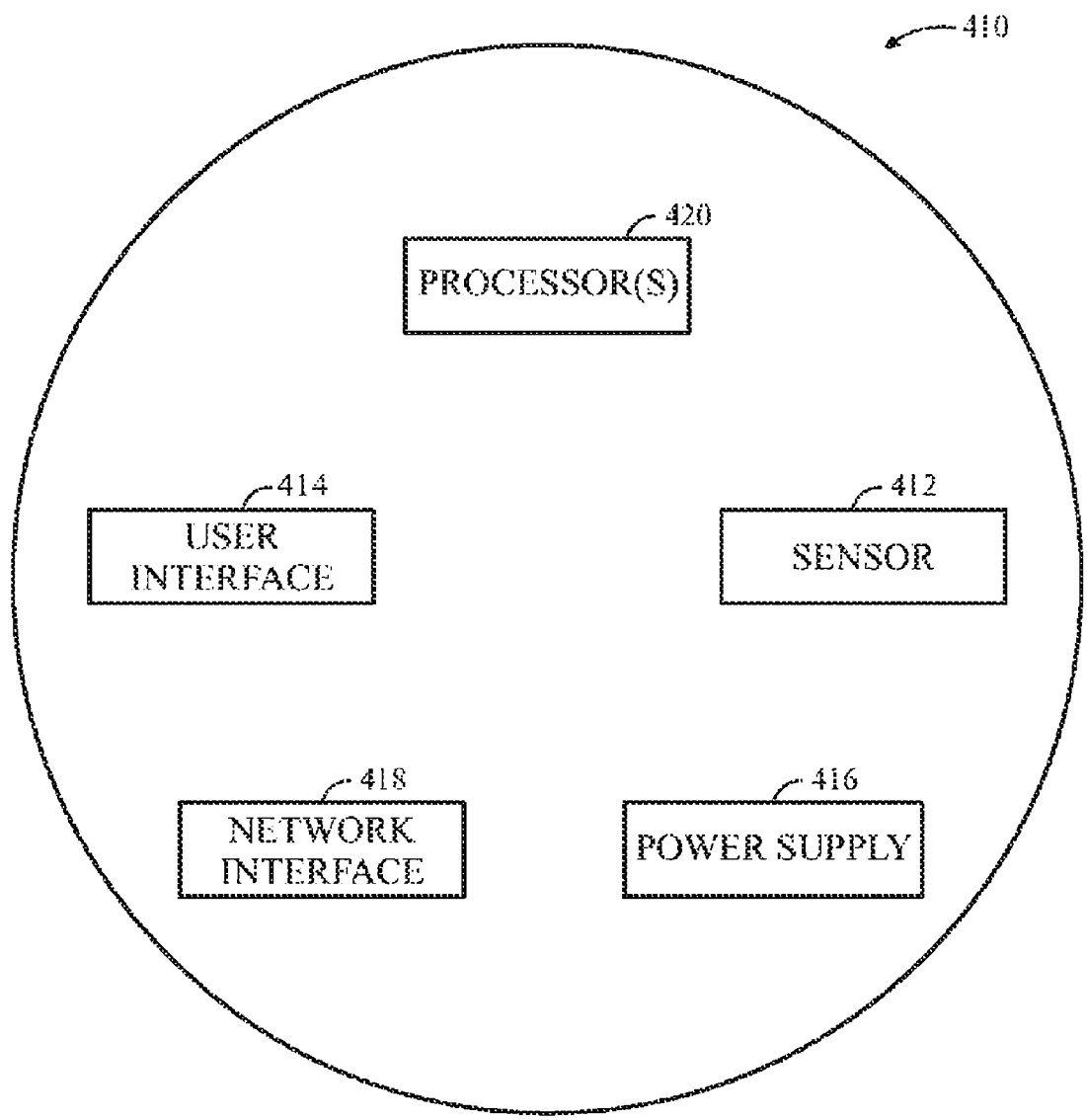
FIG. 4 illustrates block diagram view of a smart device that may securely communicate with other smart devices within the smart-home environment, according to an embodiment.

By way of introduction, FIG. 4 illustrates an example of a device 410 (e.g., thermostat and/or hazard detector) that may that may communicate with other like devices within a home environment. In some embodiments, the device 410 may include one or more sensors 412, a user interface component 414, a power supply 416 (e.g., including a line power connection and/or battery), a network interface 418, a processor 420, and the like. Particular sensors 412, user interface components 414, and power-supply configurations may be the same or similar within each device 410. However, it should be noted that in some embodiments, each device 410 may include particular sensors 412, user interface components 414, power-supply configurations, and the like based on a device type or model.

The sensors 412, in certain embodiments, may detect various properties such as acceleration, temperature, humidity, water, supplied power, proximity, external motion, device motion, sound signals, ultrasound signals, light signals, fire, smoke, carbon monoxide, global-positioning-satellite (GPS) signals, radio-frequency (RF), other electromagnetic signals, or fields, or the like. As such, the sensors 412 may include temperature sensor(s), humidity sensor(s), hazard-related sensor(s) or other environmental sensor(s), accelerometer(s), microphone(s), optical sensors up to and including camera(s) (e.g., charged coupled-device or video cameras), active or passive radiation sensors, GPS receiver(s), radiofrequency identification detector(s) and/or other suitable sensors. While FIG. 4 illustrates an embodiment with a single sensor, many embodiments may include multiple sensors. In some instances, the device 410 may includes one or more primary sensors and one or more secondary sensors. Here, the primary sensor(s) may sense data central to the core operation of the device (e.g., sensing a temperature in a thermostat or sensing smoke in a smoke detector), while the secondary sensor(s) may sense other types of data (e.g., motion, light or sound), which can be used for energy-efficiency objectives, security objectives, safety objectives, and/or smart-operation objectives.

One or more user interface components 414 in the device 410 may receive input from the user and/or present information to the user. The received input may be used to determine one or more settings. In certain embodiments, the user interface components may include a mechanical or virtual component that responds to the user's motion. For example, the user may mechanically move a sliding component (e.g., along a vertical or horizontal track) or rotate a rotatable ring (e.g., along a circular track), or move an object (e.g., finger) across/onto a touchpad of the device 410. Such motions may correspond to a setting adjustment, which can be determined based on an absolute position of a user interface component 414 or based on a displacement of a user interface components 414 (e.g., adjusting a set point temperature by 1 degree F. for every 10° rotation of a rotatable-ring component). Physically and virtually movable user interface components can allow a user to set a setting along a portion of an apparent continuum. Thus, the user may not be confined to choose between two discrete options (e.g., as would be the case if up and down buttons were used) but can quickly and intuitively define a setting along a range of possible setting values. For example, a magnitude of a movement of a user interface component may be associated with a magnitude of a setting adjustment, such that a user may dramatically alter a setting with a large movement or finely tune a setting with s small movement.

The user interface components 414 may also include one or more buttons (e.g., up and down buttons), a keypad, a number pad, a switch, a microphone, and/or a camera (e.g., to detect gestures). In some embodiments, the user interface component 414 may include a click-and-rotate annular ring component that may enable the user to interact with the component by rotating the ring (e.g., to adjust a setting) and/or by clicking the ring inwards (e.g., to select an adjusted setting or to select an option). In another embodiment, the user interface component 414 may include a camera that may detect gestures (e.g., to indicate that a power or alarm state of a device is to be changed). In some instances, the device 410 may have one primary input component, which may be used to set a plurality of types of settings. The user interface components 414 may also be configured to present information to a user via, e.g., a visual display (e.g., a thin-film-transistor display or organic light-emitting-diode display) and/or an audio speaker.

The power-supply component 416 may include a power connection and/or a local battery. For example, the power connection may connect the device 410 to a power source such as a line voltage source. In some instances, an AC power source can be used to repeatedly charge a (e.g., rechargeable) local battery, such that the battery may be used later to supply power to the device 410 when the AC power source is not available.

The network interface 418 may include a component that enables the device 410 to communicate between devices. The network interface may include multiple network connection interfaces. In other words, the network interface 418 may include radios and/or antennas that enable to the network interface 418 to couple the device 410 to multiple networks and/or different devices using different communication methods concurrently. For example, in some embodiments, the network interface 418 may include at least one 802.15.4 radio, at least one WiFi radio, at least one Bluetooth radio, and/or other radios that enable the device to connect to multiple devices and/or networks concurrently. In some embodiments, the network interface 418 may communicate using an efficient network layer as part of its Open Systems Interconnection (OSI) model. In one embodiment, the efficient network layer, which will be described in more detail below with reference to FIG. 5, may enable the device 410 to wirelessly communicate IPv6-type data or traffic using a RIPng routing mechanism and a DTLS security scheme. As such, the network interface 418 may include one or more wireless cards or some other transceiver connections.

The processor 420 may support one or more of a variety of different device functionalities. As such, the processor 420 may include one or more processors configured and programmed to carry out and/or cause to be carried out one or more of the functionalities described herein. In one embodiment, the processor 420 may include general-purpose processors carrying out computer code stored in local memory (e.g., flash memory, hard drive, and random access memory), special-purpose processors or application-specific integrated circuits, combinations thereof, and/or using other types of hardware/firmware/software processing platforms. Further, the processor 420 may be implemented as localized versions or counterparts of algorithms carried out or governed remotely by central servers or cloud-based systems, such as by virtue of running a Java virtual machine (JVM) that executes instructions provided from a cloud server using Asynchronous JavaScript and XML (AJAX) or similar protocols. By way of example, the processor 420 may detect when a location (e.g., a house or room) is occupied, up to and including whether it is occupied by a specific person or is occupied by a specific number of people (e.g., relative to one or more thresholds). In one embodiment, this detection can occur, e.g., by analyzing microphone signals, detecting user movements (e.g., in front of a device), detecting openings and closings of doors or garage doors, detecting wireless signals, detecting an IP address of a received signal, detecting operation of one or more devices within a time window, or the like. Moreover, the processor 420 may include image recognition technology to identify particular occupants or objects.

In certain embodiments, the processor 420 may also include a high-power processor and a low-power processor. The high-power processor may execute computational intensive operations such as operating the user interface component 414 and the like. The low-power processor, on the other hand, may manage less complex processes such as detecting a hazard or temperature from the sensor 412. In one embodiment, the low-power processor may wake or initialize the high-power processor for computationally intensive processes.

In some instances, the processor 420 may predict desirable settings and/or implement those settings. For example, based on the presence detection, the processor 420 may adjust device settings to, e.g., conserve power when nobody is home or in a particular room or to accord with user preferences (e.g., general at-home preferences or user-specific preferences). As another example, based on the detection of a particular person, animal or object (e.g., a child, pet or lost object), the processor 420 may initiate an audio or visual indicator of where the person, animal or object is or may initiate an alarm or security feature if an unrecognized person is detected under certain conditions (e.g., at night or when lights are off).

In some instances, devices may interact with each other such that events detected by a first device influences actions of a second device. For example, a first device can detect that a smoke has been detected in a garage (e.g., by detecting smoke in the garage, detecting a change in light in the garage, and/or detecting heat in the garage). The first device can transmit this information to a second device via the efficient network layer, such that the second device can perform actions appropriate to the transmitted information, (e.g., adjust a home temperature setting, a light setting, a music setting, and/or a security-alarm setting). As another example, a first device can detect a user approaching a front door (e.g., by detecting motion or sudden light pattern changes). The first device may, e.g., cause a general audio or visual signal to be presented (e.g., such as sounding of a doorbell) or cause a location-specific audio or visual signal to be presented (e.g., to announce the visitor's presence within a room that a user is occupying).

By way of example, the device 410 may include a thermostat such as a Nest® Learning Thermostat. Here, the thermostat may include sensors 412 such as temperature sensors, humidity sensors, and the like such that the thermostat may determine present climate conditions within a building where the thermostat is disposed. The power-supply component 16 for the thermostat may be a local battery such that the thermostat may be placed anywhere in the building without regard to being placed in close proximity to a continuous power source. Since the thermostat may be powered using a local battery, the thermostat may minimize its energy use such that the battery is rarely replaced.

In one embodiment, the thermostat may include a circular track that may have a rotatable ring disposed thereon as the user interface component 414. As such, a user may interact with or program the thermostat using the rotatable ring such that the thermostat controls the temperature of the building by controlling a heating, ventilation, and air-conditioning (HVAC) unit or the like. In some instances, the thermostat may determine when the building may be vacant based on its programming. For instance, if the thermostat is programmed to keep the HVAC unit powered off for an extended period of time, the thermostat may determine that the building will be vacant during this period of time. Here, the thermostat may be programmed to turn off light switches or other electronic devices when it determines that the building is vacant. As such, the thermostat may use the network interface 418 to communicate with a light switch device such that it may send a signal to the light switch device when the building is determined to be vacant. In this manner, the thermostat may efficiently manage the energy use of the building.

Figure 5:
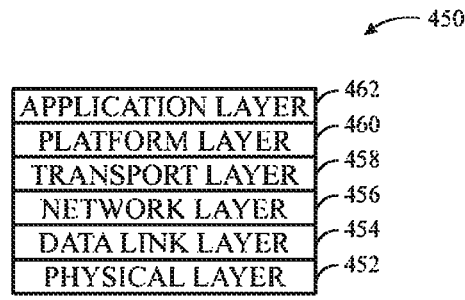
FIG. 5 illustrates a model view that illustrates functions of a communication system in layers including an application layer, a transport layer, and a network layer, according to an embodiment.

Generally, the smart network may be part of an Open Systems Interconnection (OSI) model 450 as depicted in FIG. 5. The OSI model 450 illustrates functions of a communication system with respect to abstraction layers. That is, the OSI model may specify a networking framework or how communications between devices may be implemented. In one embodiment, the OSI model 450 may include six layers: a physical layer 452, a data link layer 454, a network layer 456, a transport layer 458, a platform layer 460, and an application layer 462. Generally, each layer in the OSI model 450 may serve the layer above it and may be served by the layer below it.

Keeping this in mind, the physical layer 452 may provide hardware specifications for devices that may communicate with each other. As such, the physical layer 452 may establish how devices may connect to each other, assist in managing how communication resources may be shared between devices, and the like.

The data link layer 454 may specify how data may be transferred between devices. Generally, the data link layer 454 may provide a way in which data packets being transmitted may be encoded and decoded into bits as part of a transmission protocol.

The network layer 456 may specify how the data being transferred to a destination node is routed. The network layer 456 may also interface with a security protocol in the application layer 462 to ensure that the integrity of the data being transferred is maintained.

The transport layer 458 may specify a transparent transfer of the data from a source node to a destination node. The transport layer 458 may also control how the transparent transfer of the data remains reliable. As such, the transport layer 458 may be used to verify that data blocks intended to transfer to the destination node indeed reached the destination node. Example protocols that may be employed in the transport layer 458 may include Transmission Control Protocol (TCP) and User Datagram Protocol (UDP).

The platform layer 460 may establish connections between devices according to the protocol specified within the transport layer 458. The platform layer 460 may also translate the data blocks into a form that the application layer 462 may use. The application layer 462 may support a software application that may directly interface with the user. As such, the application layer 462 may implement protocols defined by the software application. For example, the software application may provide serves such as file transfers, electronic mail, and the like.

Figure 6:
FIG. 6 illustrates an exchange of information between devices, with at least one device being part of the smart-home environment, according to an embodiment.

The network layer 456 may route data between the devices 10 using a communication protocol based on Internet Protocol version 6 (IPv6). As such, each device 410 may include a 128-bit IPv6 address that may provide each device 410 with a unique address to use to identify itself over the Internet, a local network or a fabric overlaying a group of networks, or the like. In some embodiments, the network layer 456 may identify a protocol (e.g., RIPng) that determines how data is routed between the devices. As illustrated in FIG. 6, using one or more layers, information 470 (e.g., alarm states, security information, etc.) may be exchanged between devices 472 and 474.

III. Communication Between Devices over BLE

Bluetooth® Low Energy (BLE) is a wireless personal area network communication type that provides a relatively low-power connection between two devices. BLE includes a protocol stack, such as the protocol stack 475 illustrated in FIG. 7. The protocol stack 475 includes an application layer 476 that supports software applications that interface with a user. The protocol stack 475 also includes layers that are located within a host 477 and a controller 478. In some embodiment, the host 477 may be located on or more processors or chips while the controller 478 may be included on a discrete host controller chip. As illustrated, within the host 477, a General Access Profile (GAP) 479. The GAP 479 defines the generic procedures related to discovery of Bluetooth devices and link management aspects of connecting to Bluetooth devices. In addition, this profile includes common format requirements for parameters accessible on the user interface level. The GAP 479 also defines roles for devices including a broadcaster role, an observer role, a peripheral role, and a central role. A device operating in the broadcaster role can send advertising events. A device operating in the observer role is a device that receives advertising events from the broadcaster. A device that accepts an establishment of a BLE physical link using a connection establishment procedure is in a peripheral role also known as a slave role. A device acting in a central role initiates establishment of a physical connection. The central role may also be referred to as a master role.

The protocol stack 475 also includes a Generic Attribute (GATT) profile 480. The GATT profile 480 defines a generic service framework using an attribute protocol layer 481. This framework defines the procedures and formats of services and their characteristics. It defines the procedures for Service, Characteristic, and Descriptor discovery, reading, writing, notifying, and indicating, as well as configuring the broadcast of characteristics. The GATT profile provides a mechanism for sending and receiving short pieces of data known as "attributes" over a BLE connection. GATT is generally available on most or all implementations of BLE. Thus, although other profiles may be available, GATT may be widely available on smart network devices and/or personal electronic devices (e.g., cellular phone, iPad, etc.).

GATT is built on the notion of multiple characteristics. Each characteristic has a single, fixed-width value with a maximum size of 512 bytes with most implementations using 128 bytes. Generally, characteristics are assigned Universally Unique Identifiers (UUIDs) having a consistent size (e.g., 16-bit, 128-bit). Characteristics are grouped into sets known as GATT services that each has its own UUID. Moreover, the GATT profile 480 defines server and client roles. The client device is the device that is to receive data, and the server device is the device that has the data and is to transmit data.

The attribute protocol layer 481 defines a client/server architecture above a BLE logical transport channel. The attribute protocol layer 481 allows a device referred to as the GATT server to expose a set of attributes and their associated values to a peer device referred to as the GATT client. These attributes exposed by the GATT Server can be discovered, read, and written by a GATT Client, and can be indicated and notified by the GATT Server. All the transactions on attributes are atomic. The protocol stack 475 also includes a security manager protocol (SMP) 482. The SMP defines procedures and behavior to manage pairing, authentication, and encryption between devices.

The protocol stack 475 also includes a Logical Link Control And Adaption Protocol (L2CAP) 483. L2CAP is the reliable, multiplexed, packet-oriented transport on which all BLE profiles and application protocols ultimately depend. The L2CAP supports higher-level protocol multiplexing, packet segmentation and reassembly, and the conveying of quality of service information. Furthermore, L2CAP enables higher-level protocol/layers and applications to transmit and receive upper-layer data packets up to 64 kilobytes in length. L2CAP also permits per-channel flow control and retransmission. Furthermore, the L2CAP layer provides some error control that is designed to detect the occasional undetected errors in the baseband layer and request retransmission of the affected data.

If an L2CAP API were available on every Weave target platform, it would be the BLE interface of choice for Weave due to its reliability and conceptual similarity to IP-based streaming sockets. However, an L2CAP API is available on neither Android nor iOS, so the design of Weave over BLE is constrained to the GATT application layer.

The protocol stack 475 also includes a host controller interface (HCI) 484 for implementing a command, event, and data interface for allowing link layer access from upper layers such as GAP 479, L2CAP 483, and SMP 482.

Figure 7:
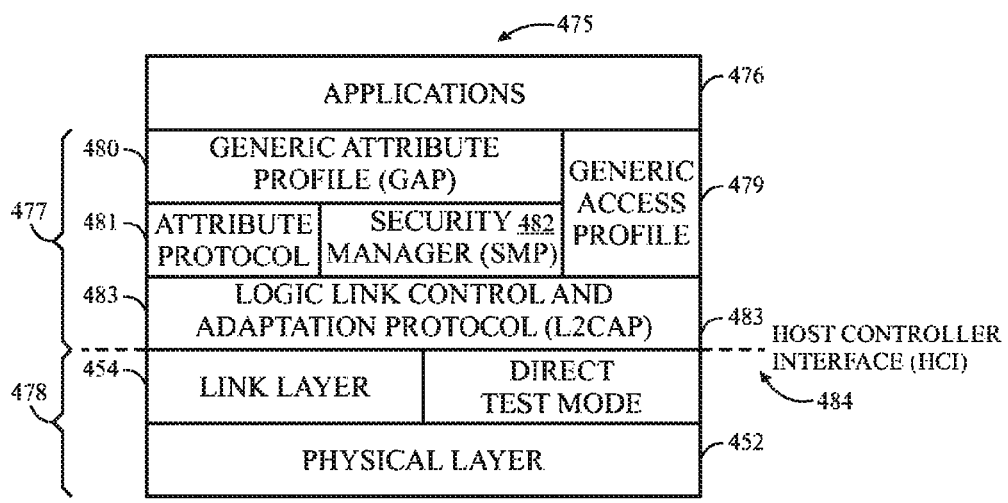
FIG. 7 illustrates a protocol stack of BLE communications, according to an embodiment.
Figure 8:
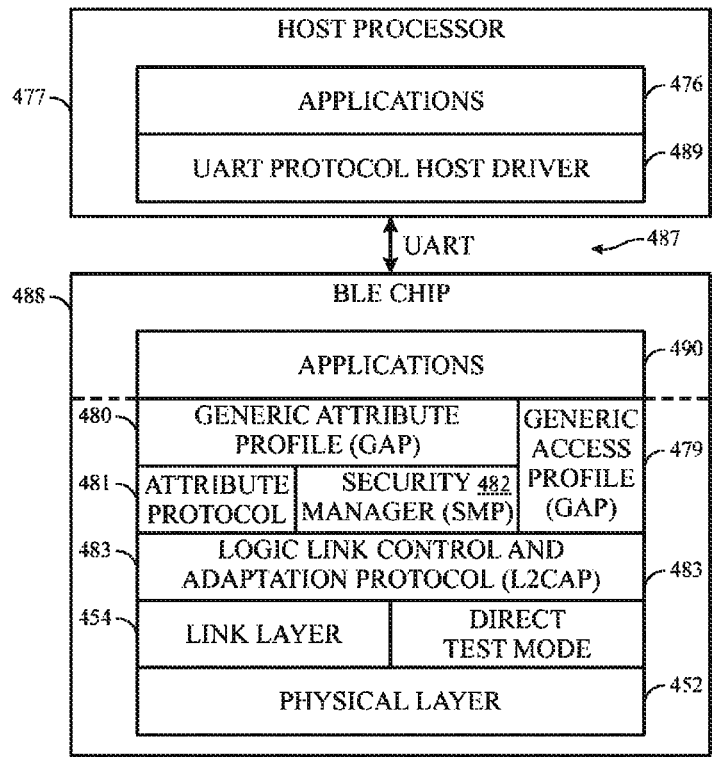
FIG. 8 illustrates an alternative protocol stack of BLE communications, according to an embodiment.

FIG. 8 illustrates an alternative arrangement of the protocol stack 486 of FIG. 7. Specifically, in FIG. 8, a protocol stack 486 does not include the HCI 484. Instead, the protocol stack 486 includes a Universal Asynchronous Receiver Transmitter (UART) 487 to provide a communication path between a host processor 477 and a BLE chip 488. Also, note that the BLE chip 488 implements all stack elements below and including the GAP 480. The protocol stack 485 also includes a UART protocol host driver 489 that drives communication on the UART 487 path. The protocol stack 485 also includes an application 490 running on the BLE chip 488 that passes GATT commands and events between the BLE chip 488 and the host processor 478.

Figure 9:
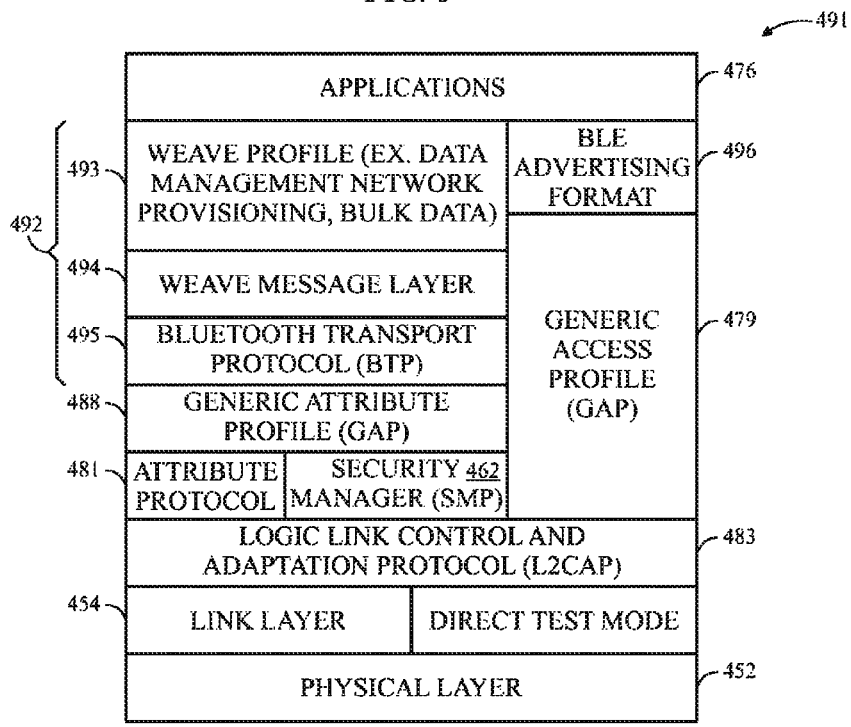
FIG. 9 illustrates a protocol stack of weave layers atop BLE layers, according to an embodiment.

FIG. 9 illustrates a nested protocol stack 491 that includes a weave platform 492 on top of the BLE platforms of FIG. 7 or 8. As illustrated, the weave platform 492 includes a weave profile layer 493, a weave message layer 494, a BTP layer 495, and an advertising format layer 496. The weave profile layer 493 includes different profiles used to perform functions with the weave networks. The weave message layer 494 translates the profile messages into weave messages for the profile messages. The BTP layer 495 enables translation of the weave messages into BLE messages as discussed below. The BLE advertising format layer 496 instructs how to advertise or translate advertising packets.

Reading/Writing in GATT Table

Figure 10:
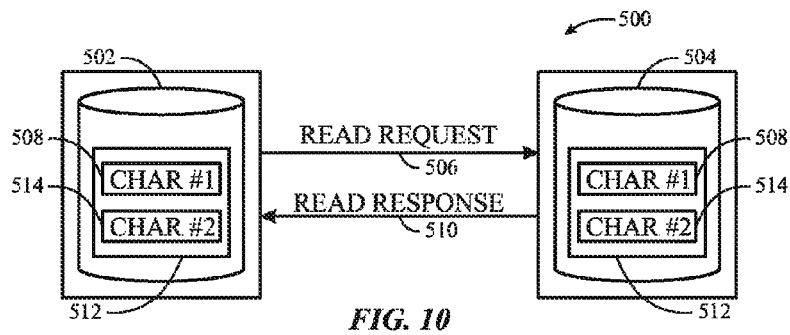
FIG. 10 illustrates a schematic view of an exchange of information between devices using a relatively low power network connection, according to an embodiment.

BLE GATT interactions can be characterized as having a client role and a server role as illustrated in FIG. 10. As illustrated, GATT interaction 500 includes both a client 502 and a server 504 role. The client 502 is the device that is to receive data, and the server is the device that has the data and is to transmit data. The client 502 may also be referred to as a BLE central device, and the server may be referred to as a BLE peripheral device. The client 502 may write values, read values, or subscribe by requesting to receive indications or notifications from the server when the value changes. The client device 502 reads data from a server device 504 by issuing a read request 506 to one or more of the server device's characteristics 508. The client can issue a write request 510 to update the one or more characteristics 508. The write request 510 may include a write request that generates a confirmation from the server either larger, equal to, or smaller than a maximum transfer unit (MTU).

Characteristics are organized into sets called services. For example, a Weave service UUID may be 0000FEAF-0000-1000-8000-00805F9B34FB with two characteristics C1 (UUID: 18EE2EF5-263D-4559-959F-4F9C429F9D11) and C2 (UUID: 18EE2EF5-263D-4559-959F-4F9C429F9D12). A GATT application profile defines one or more services, their characteristics, and the rules that govern how these characteristics are manipulated and interpreted.

Each characteristic has a single value whose data payload may be up to 512 bytes in length. However, this maximum size may be much smaller than the maximum message size capable over a Weave protocol. For this reason, a fragmentation and reassembly scheme for Weave messages is defined at the BLE application layer in the form of a BlueTooth Transfer Protocol (BTP).

Each service and characteristic on a GATT server is assigned a Universally Unique Identifier (UUID). For example, custom, randomly assigned UUIDs are 128 bits in length, and SIG-assigned UUIDs may be 32 or 16 bits in length.

As discussed below, a general service offers a GATT table that enables both devices to treat BLE as a bi-directional data communication. The GATT server 504 hosts the characteristics 508 and provides the GATT client 502 the ability to read, write, and/or subscribe to the characteristics 508. Moreover, since, in some embodiments, the general service is included in all BLE advertisements, the general service may be used to enable bi-directional communication between the devices in numerous use cases, such as device pairing, alarm hushing, or other uses suitable for communicating over BLE. In some embodiments, the GATT server 504 may implement one or more services 512 each including one or more characteristics 508 for the bi-directional communication between the devices. Furthermore, in some embodiments, each characteristic 508 may have a different type and/or permissions. For example, a first characteristic 508 may provide the client the ability to read and write while another characteristic 514 provides the client the ability only to read or see indications of the values therein.

Thus, GATT servers advertise GATT services and maintain the canonical values of those services' characteristics. GATT clients connect to GATT servers, and may write, read, or subscribe to the value of a server's characteristics. If a client has subscribed to the value of a particular characteristic, the server may change this characteristic's value and then send a GATT indication (with or without receipt request from the client) to notify the client that the value has been updated. In some cases, GATT read requests, write requests, subscribe requests, and indicate requests may be reliably transmitted with acknowledgments received from the server.

The read operation may be used to retrieve the full value of a characteristic from a server in response to a GATT notification or indication, where the indication may contain only a partial characteristic value that the client discards. In some embodiments, BTP does not follow this process, and instead, BTP uses indications to send full characteristic values from server to client. The characteristic size is adjusted per connection based on the value of MTU of the GATT. BTP reduces latency and maximizes bandwidth on the server-to-client data path by foregoing the read operation.

A single GATT characteristic read, write, subscribe, or indication may be considered reliable since GATT is supported by the Logical Link Control and Adaptation Protocol (L2CAP), which in turn is supported by the LE asynchronous connection (LE ACL) logical transport. These layers provide error detection, data retransmission, and flow control for individual GATT operations.

As previously discussed, the size of a maximum transfer unit (MTU) in different BLE implementations can range from a minimum of 23 bytes to the maximum of 512 bytes (with some characteristics capped at a length of 128 bytes related MTUs may be limited to the same values). These values are decided locally depending on the device's capabilities. In certain cases, the MTU size can be negotiated between peers. If neither the client 502 nor the server 504 knows the MTU, the server 504 may respond with an acceptable fragment size (e.g., 20 bytes) as a maximum value that is safe to assume due to the BLE specification. In this case, even if the server 504 receives indications with payload greater than this number of bytes, the server 504 will only read the first number (e.g., 20) of bytes of the payload. In some embodiments, the client 502 will always send 128-byte characteristic writes. In cases where all bytes of characteristic data cannot be transferred in one connection event, multiple connection events are used to transfer the bytes of the characteristic data. Moreover, in certain embodiments, a fragment size value (e.g., $2^{16}-1$, unsigned) may be reserved to indicate that the MTU will be dynamically determined from a size of the payload.

Figure 11:
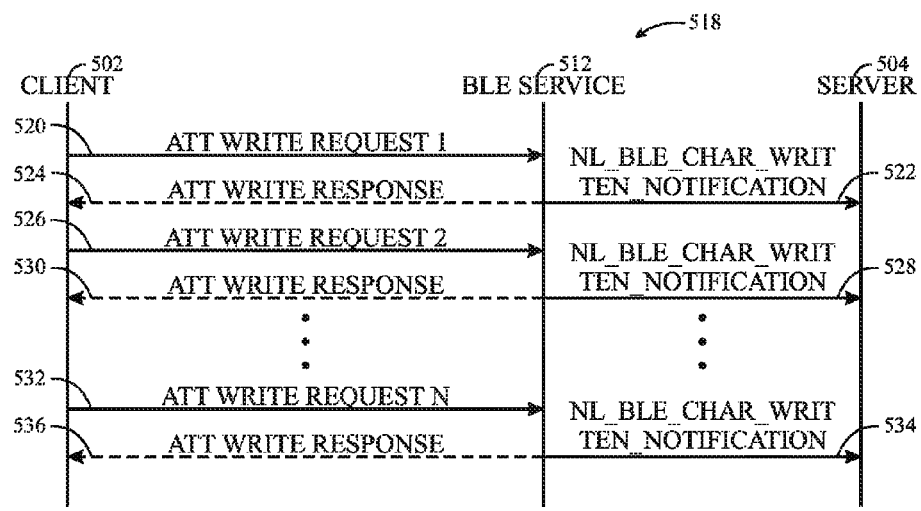
FIG. 11 illustrates a schematic view of an exchange of information between devices using Bluetooth low energy (BLE), according to an embodiment.

FIG. 11 illustrates a communication 518 between the client 502 and the server 504 through the BLE service 514 when the client 502 writes to the characteristic 508. The client 502 sends an attribute write request 520 to write to one of the attributes of the BLE service 514. The BLE service 514 sends a notification 522 to the server 504 that the character 508 has been written to or attempted to be written to. In some embodiments, the BLE service 514 sends a write response 524 confirmation of success, a notification of failure, and/or other information related to the write request 520. Similarly, a second attribute write request 526 invokes a notification 528 and a write response 530. This process continues until a final attribute write request 532 for the communication 518 causes the BLE service 514 to send a notification 534 and a write response 536.

Figure 12:
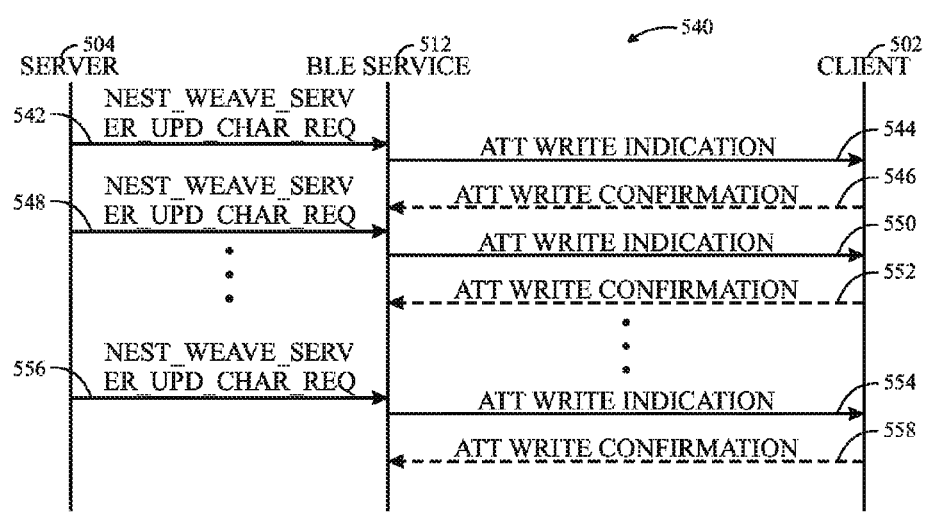
FIG. 12 illustrates a schematic view of an exchange of information between devices when a server writes to a characteristic in a BLE service, according to an embodiment.

FIG. 12 illustrates a communication 540 when the server 504 updates to the characteristic 514 via the BLE service 512. The server 504 updates an attribute in the characteristic 514 in the BLE service 512 with an update request 542, and the update is indicated to the client 502 via an update indication 544. In some embodiments, the client 502 sends an indication confirmation 546 to the BLE service 512 upon completion of a transfer of the updated data to the client 502. In such embodiments, the server 504 may wait to send a second update request 548 until receiving the confirmation 546 to reduce likelihood of data loss. Once the second update request 548 is received at the BLE service 512, an attribute update indication 550 is sent to the client 502 and invokes a confirmation 552. The process continues until a final attribute update request 556 is sent by the server 504 that invokes an update indication 554 and an indication confirmation 558.

Figure 13:
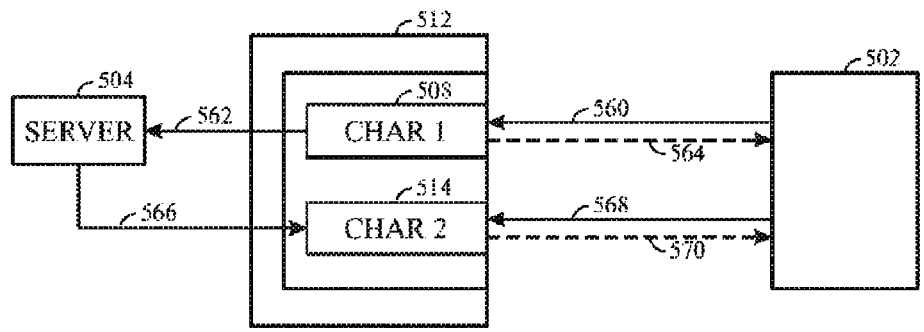
FIG. 13 illustrates a block diagram view of interactions between a client and service via the BLE service of FIG. 9, according to an embodiment.

FIG. 13 illustrates a block diagram view of interactions between the client 502 and the server 504 via the BLE service 512. In the illustrated embodiment, communications flowing from the client 502 to the server 504 flow through the first characteristic 508. In other words, the client 502 sends data to the server 504 using an attribute write sent 560 via the first characteristic 508. The updated first characteristic is sent to the server 504 via a characteristic update notification 562. In some embodiments, the BLE service 512 sends a write confirmation 564 that notifies the client 502 that another write request may be sent.

Communications from the server 504 to the client 502 may be sent using the second characteristic 514. For example, the server 504 may send a characteristic update request 566 to the BLE service 512. In response, an update indication 568 may be sent to the client 502. In certain embodiments, the client 502 sends an indication receipt confirmation 570 that informs the BLE service 512 that the second characteristic 514 may be updated with a new value without risking data loss to the client 502.

Weave (or other communication protocols) may be transmitted over BLE. However, GATT is a characteristic-based communication protocol while Weave is a message-based protocol. Furthermore, a single Weave message payload may be larger than the maximum size of a GATT characteristic. For example, a single Weave message may have a size of 1,500 bytes while the BLE implementation may limit communications to a significantly smaller number (e.g., 27 bytes or 128 bytes). Thus, to use BLE in the smart network using Weave, a higher-level layer (e.g., application layer, transport layer, etc.) may deploy a streaming socket, Bluetooth Transfer Protocol (BTP), built on top of GATT. Weave uses BTP to split Weave messages into multiple fragments which may each be transmitted via single GATT writes or indications. Furthermore, as previously discussed, the MTU may be larger than at least some characteristics. In certain embodiments, a characteristic used to send indications to the BLE client may be limited to the size of the MTU negotiated in the BLE handshake.

BTP defines its own notion of a transport layer connection on top of the underlying BLE connection. This design enables certain Weave protocols to function over BLE, such as a Certificate Authenticated Session Establishment (CASE) protocol or a Password Authenticated Session Establishment (PASE) protocol as taught in U.S. patent application Ser. No. 14/508,933, titled "Authenticated Session Establishment," which was filed on Oct. 7, 2014, and which is incorporated by reference in its entirety. It also lets devices using Weave over BLE devices check protocol version compatibility and exchange certain data as part of the BTP connect handshake.

A BTP connection may open and close with no effect on the state of the underlying BLE connection, except in the case where a BTP connection is closed by the peripheral device. In some embodiments, peripherals can only signal the end of a BTP connection by closing the underlying BLE connection to the central. Alternatively, an in-band mechanism for peripherals to close BTP connections may be used.

Before a BTP connection can be initiated, a central device establishes a BLE connection via a handshake to a peripheral device. Once a BLE connection has been formed, central devices shall assume the GATT client role for BTP connection establishment and data transfer, and peripheral devices assume the server role.

Figure 14:
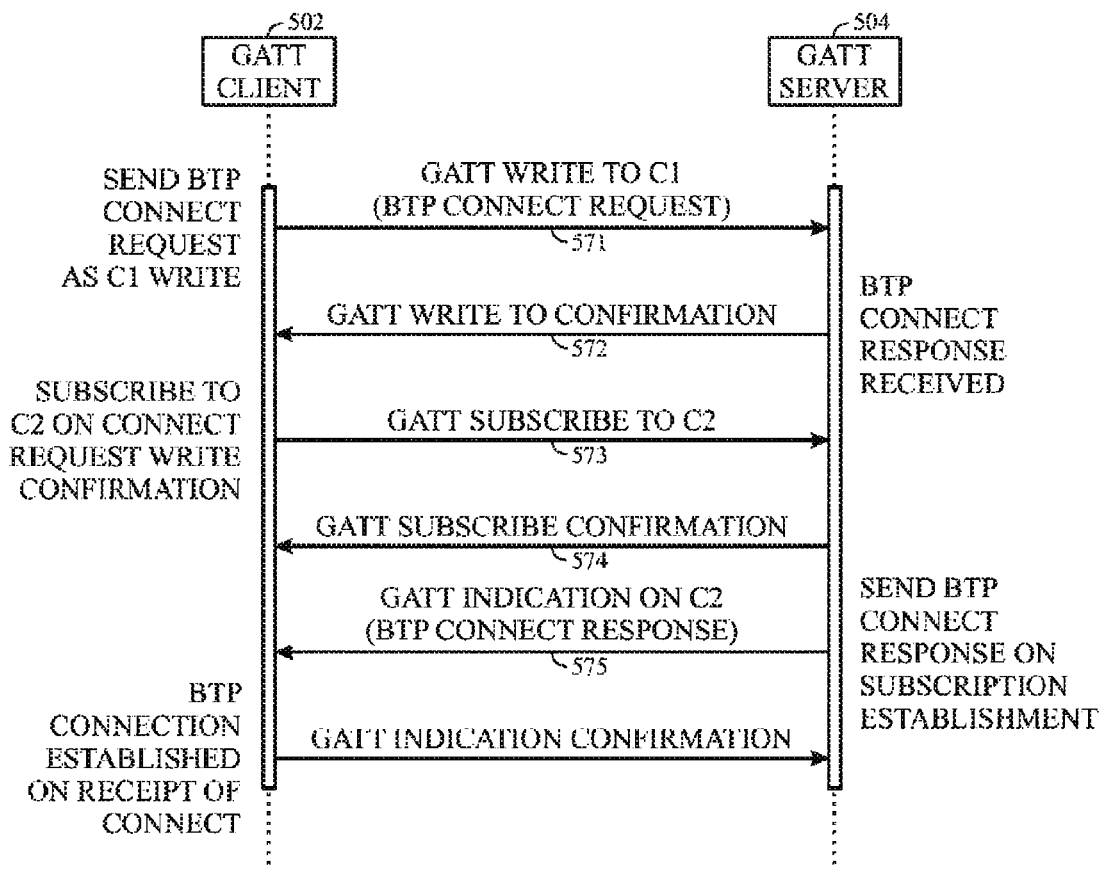
FIG. 14 illustrates a data exchange that occurs between a GATT client and a GATT server during a BLE Transfer Protocol (BTP) establishment, according to an embodiment.

FIG. 14 illustrates a sequence of operations in the BTP connect handshake. To initiate a BTP connection, a GATT client 502 sends a BTP connect request block 571 to the peripheral via a confirmed write on characteristic C1 of the Weave service. The connect request block 571 includes two check bytes, a list of BTP protocol versions supported by the client, the client's observation of the BLE connection ATT_MTU, and the client's maximum receive window size. The list of supported protocol versions may be sorted in descending numerical order. If the client cannot determine the connection's ATT_MTU, it shall specify a value of 0 for this field in the connect request. The check bytes 1 and 2 may have ASCII values of "n" and "1", respectively, with hexadecimal values of 0x6E and 0x6C. The server 504 then sends a GATT write confirmation 572 as a BTP connect response received message.

Once the BTP connect request write operation completes successfully as indicated by receipt of the GATT write confirmation 572, the client 502 subscribes to changes to the value of Weave service characteristic C2 using a GATT subscribe request 573. To do this, the client 502 sets an indication bit of C2's client characteristic configuration descriptor to 1.

Once the GATT server 504 has received a client's 502 BTP connect request and confirmed the client's 502 subscription to C2 via a subscription confirmation 574, the server 504 sends a BTP connect response 575 to the client via an indication on C2. This response contains the same two check bytes along with the window size, maximum BTP packet size, and BTP protocol version selected by the server.

The server 504 selects a window size equal to the minimum of its and the client's 504 maximum window sizes. Likewise, the server 504 shall select a maximum BTP packet size for the connection by taking the minimum of 128 bytes (the maximum characteristic value length of C1 and C2) and all nonzero ATT_MTU values observed for the server 504 and the client 502. If neither server 504 nor client 502 observes the BLE connection's ATT_MTU, a default maximum packet size (e.g., 20 bytes) may be selected.

The server 504 selects a BTP protocol version that is the newest which the server 504 and the client 502 both support, where newer protocol version numbers are higher than those of older versions. The version number returned in the connect response 575 determines the version of the BTP protocol used by client 502 and server 504 for the duration of the connection. If the server 504 determines that the server 504 and the client 502 do not share a supported BTP protocol version, the server 504 closes its BLE connection to the client 502.

When a client 502 sends a connect request 571, it starts a timer with a globally defined duration (e.g., 5 seconds). If this timer expires before the client 502 receives a connect response 572 from the server, the client 502 closes the BTP connection and reports an error to the application. Likewise, the server 504 starts a timer with the same duration when it receives a connect request 571 from the client 502. If this timer expires before the server 504 receives a subscription request 573 on C2, the server 504 closes the BTP connection and reports an error to the application.

Figure 15:
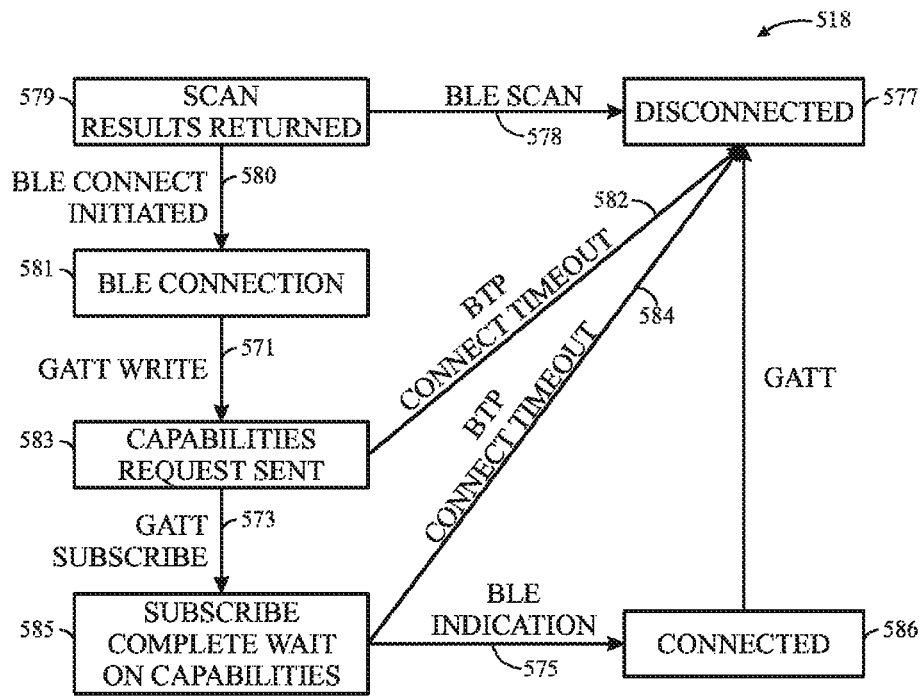
FIG. 15 illustrates a state machine showing GATT client behavior during the BTP establishment of FIG. 14, according to an embodiment.

FIG. 15 illustrates a state machine 576 for states of the GATT client 502 during the BTP establishment. Specifically, the client 502 begins in a disconnected state 577. The client 502 performs a BLE scan 578 to obtain scan results 579. A BLE connection with one of the results is to be initiated 580 placing the client 502 in a BLE connection state 581. The client 502 then sends the GATT write 571 that causes the client 502 to enter into a capabilities request sent 583 that starts a timer. If the client 502 receives the GATT subscribe 573 before the timer elapses, the client 502 enters a subscribe-complete-wait-on-capabilities state 585. If the client 502 does not receive the GATT subscribe 573 before the timer elapses, the client 502 returns to the disconnected state 577 as a timer 582. In the subscribe complete state 585, the timer continues running and/or a new timer begins, if a timer elapses before receiving the GATT indication 575, the client 502 returns to the disconnected state 577 as a timeout 584.

Otherwise, the client 502 connection has been completed and enters a connected state 586.

Figure 16:
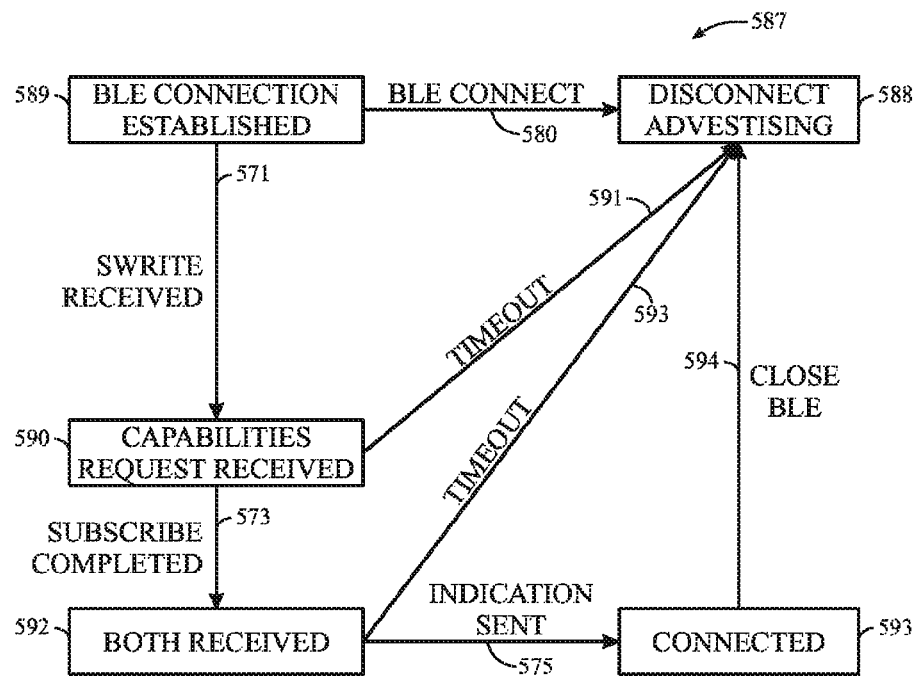
FIG. 16 illustrates a state machine showing GATT server behavior during the BTP establishment of FIG. 14, according to an embodiment.

FIG. 16 illustrates a state machine 587 for the GATT server 504 during the BTP establishment. The server 504 begins in a disconnected state 588 where the server 504 sends out BLE advertisements as discussed herein. When a client 502 begins a BLE connection 580. The server 504 enters into a BLE connection established state 589 where the server 504 waits on a capabilities of the client 502. When the write 571 is received, the server 504 enters a capabilities request received state 590. A timer begins in such state, if the subscribe request 573 is not received before the timer elapses, the server 504 returns to the disconnected state 588 as a timer 591. Otherwise, the server 504 enters into a capabilities request state with subscribe received state 592. The timer from state 590 continues running. If the subscription 573 is not received before this timer elapses, the server 504 returns to the disconnected state 588 as a timer 593 and begins advertising again. Otherwise, the server 504 enters and remains in a connected state 593 until the BLE connection is closed by a close BLE 594.

To send Weave message fragments, BTP defines 2 GATT characteristics: one for message fragments sent from the GATT client to the server, and the other for fragments sent from the server to the client. The client sends fragments to the server on the first characteristic via GATT writes. Once the client subscribes to the second characteristic, the server uses it to send fragments to the client via GATT indications.

In some embodiments, as previously discussed, BTP includes waiting to transmit all but the first message fragment until a GATT write or indication confirmation is received in response to transmission of the previous fragment. If BTP didn't wait for GATT operation acknowledgements before it sent additional fragments, the remote GATT server or client might aggregate all values received for a given characteristic before it acknowledged any of the corresponding GATT operations. Furthermore, in some cases, the server or the client may have substantially larger messages and/or processing power and may quickly overwhelm the other device if no acknowledgments were used before causing at least some of the fragments to be lost. In other words, only the most recently received value would be passed from the GATT stack to the application layer. This behavior would be correct according to the GATT profile, since characteristic values are last-write-wins, but such behavior would be bad for BTP due to the data loss.

A. BLE Controller Architecture

GATT may provide flow control, error detection, and payload retransmission for individual writes and indications. However, in many implementations, this flow control and much of the core GATT functionality is managed by a separate BLE controller chip independent of a platform's host processor.

In many implementations, it is this BLE controller which transmits GATT acknowledgements in response to received write and indication requests. The controller may transmit these acknowledgements before the received data has actually made it to the host processor's application program. In other words, the received data may not be transmitted back up the OSI model stack through the various layers to the application layer. For this reason, GATT acknowledgements may not be adequate to confirm that a given message fragment has been received by a remote BTP application.

Furthermore, on embedded platforms, there may be very small queues between the BLE controller, BLE driver on the host processor, and host processor's BLE application. If the remote device sends GATT writes or indications faster than these queues can be emptied, message fragments which were acknowledged at the GATT layer by the BLE controller will be dropped before they make it to the BTP stack on the host processor. To solve this problem, BTP provides an application-layer mechanism to exert back-pressure on the sender. Using this mechanism, a sender knows when to pause further GATT transmissions even if all previous outgoing writes or indications have been acknowledge by the remote BLE controller.

Moreover, certain BLE controllers may experience random resets or drop acknowledged GATT characteristic updates before they are transmitted to the host processor. BTP adds functionality to be able to detect and recover from these failures.

B. Error Detection

The integrity of data transmitted via GATT may be maintained by L2CAP's payload error detection and retransmission facilities for incomplete message transmissions. Thus, the type of errors missed by L2CAP's payload error detection to be detected by BTP include those where whole message fragments have been dropped or re-ordered by a malfunctioning BLE controller. If the BLE controller resets during a BTP conversation, it may permanently drop BTP message fragments, even after these fragments have been acknowledge at the GATT layer. BTP may detect this failure scenario and reset the connection when it occurs to reduce the likelihood of message data corruption. If the BLE controller re-orders GATT characteristic writes or indications, BTP may also detect this failure and reset the connection to reduce the likelihood risk message data corruption.

C. Message Formatting

Figure 17:
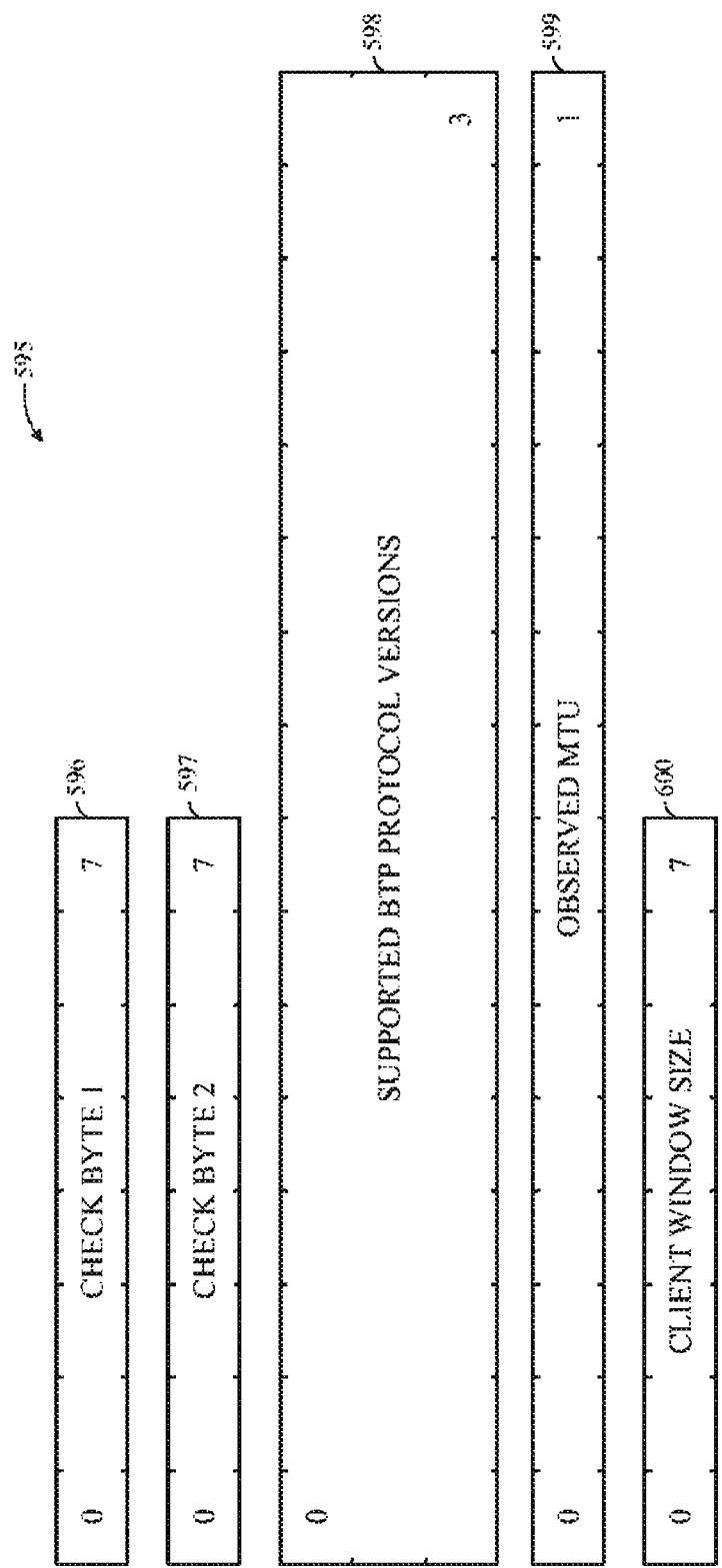
FIG. 17 illustrates a BTP connection request used in the BTP establishment of FIG. 14, according to an embodiment.

FIG. 17 illustrates an embodiment of a block 595 of a BTP connect request. The block 595 includes a first check byte 596, a second check byte 597, a supported BTP protocol versions field 598, an observed MTU 599, and a client window size 600. The check bytes include a byte or another length of data that are used to confirm received messages have been received properly. In some embodiments, more or less fields may be included having shorter, same length, or longer sizes. The supported BTP protocol versions field 598 includes a list of predetermined length (e.g., 4-bit) unsigned integer supported BTP protocol versions, sorted in descending numerical order for a total of 8 list elements. A value of 0 indicates an unused list element. The observed MTU 599 includes a length (e.g., 2 bytes) of data that is a value of the MTU observed by the client 502 for the corresponding BLE connection. If the value is 0, the MTU could not be observed. In some embodiments, the value may be represented as an unsigned integer in a big-endian format. The client window size 600 includes a value of maximum receive window size supported by the server 504. The client window size 600 may be specified in units of BTP packets where each packet may be up to 128 bytes in length. In some embodiments, the client window size 600 may be represented as an unsigned integer.

Figure 18:
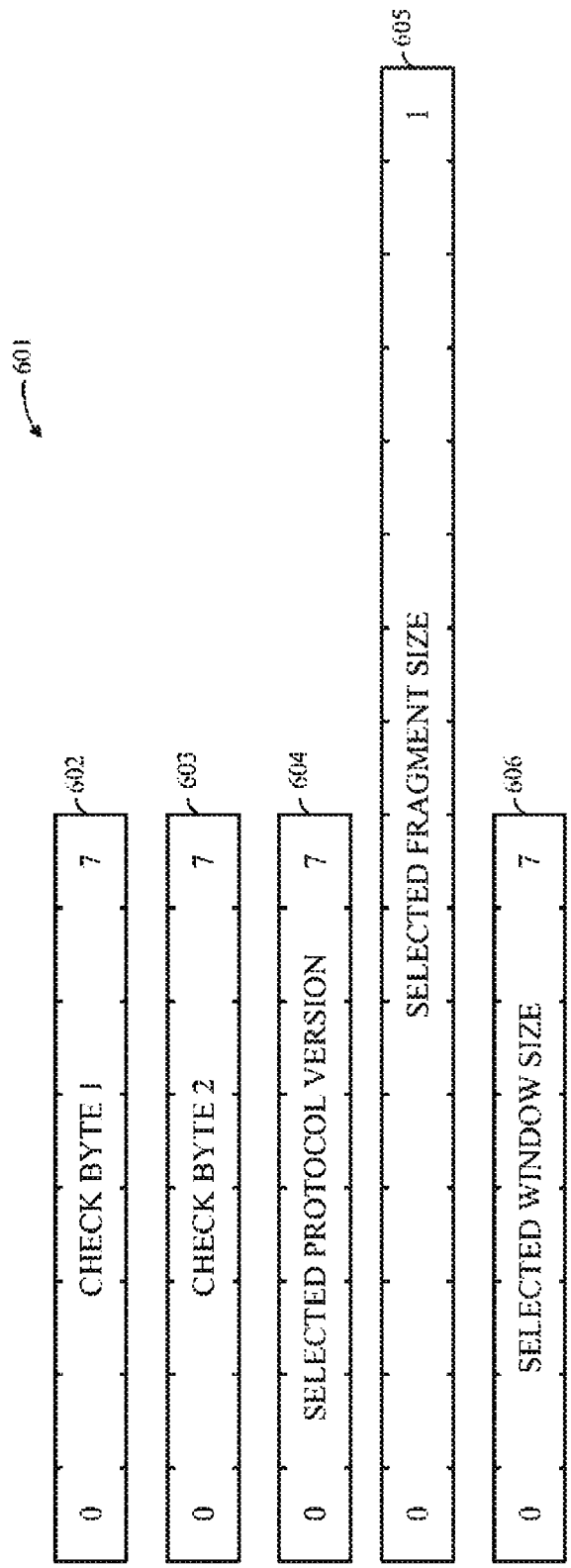
FIG. 18 illustrates a BTP connection response used in the BTP establishment of FIG. 14, according to an embodiment.

FIG. 18 illustrates an embodiment of a block 601 of a BTP connect response. The block 601 includes a first check byte 602, a second check byte 603, a selected protocol version 604, a selected fragment size 605, and a selected window size 606. The first and second check bytes should match the first and second check bytes of the block 595. The selected protocol version 604 includes a BTP protocol version supported by the client 502 and the server 504 and selected by the server 504. The selected fragment size 605 indicates a value of maximum BTP fragment size selected by the server

504. The selected window size 606 indicates a maximum receive window size for the server 504 in units of BTP packets.

BTP message fragments are sent with sequence numbers that enable acknowledgments and/or message resorting when chronological order is lost. The BTP stack sends periodic acknowledgements of its most recently received message fragments. The BTP stack also closes the connection if it does not receive acknowledgements for its own sent fragments within a set time period. Each side (e.g., server and client) of a connection defines a receive window to exert application-layer (relative to GATT) backpressure on a sender when the receiver's queues are full. Each side sends periodic keep-alive messages when a BTP connection is open but there is no application data to send.

Figure 19:
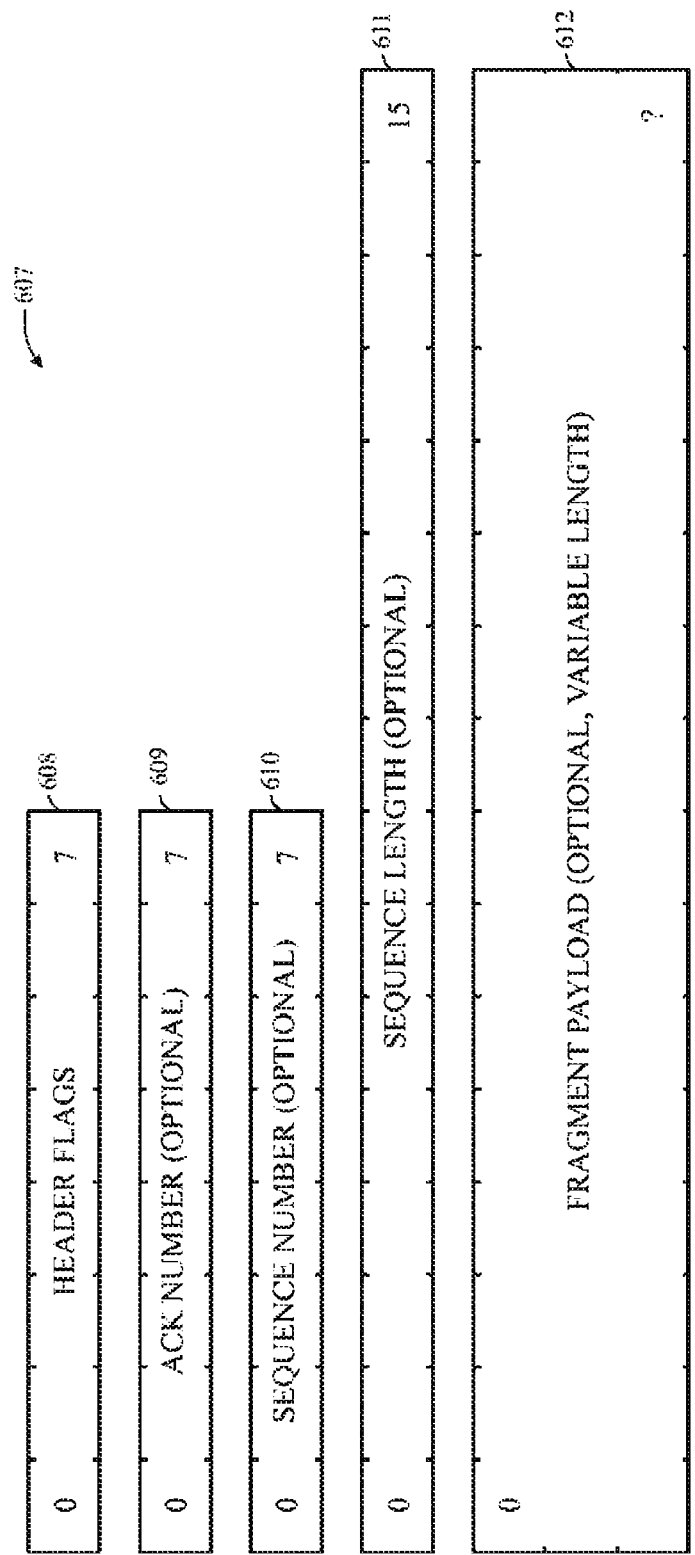
FIG. 19 illustrates a block of data that may be exchanged between the devices of FIG. 7, according to an embodiment.

FIG. 19 illustrates an embodiment of a block 607 of data that is sent using the BTP. The block 607 includes header flags 608 that identifies a type of message being sent, an acknowledgement number 609 that identifies the message as an acknowledgment of a previous message, a sequence number 612 that identifies order of messages in a string of messages, a message length 608 that indicates a length for the message and/or for each block, and a fragment payload 612 that includes the data being shared between the client 502 and the server 504. In some embodiments, the one or more header flags 608 may be included in a single message. For example, a message may include a message fragment and an acknowledgment. Moreover, in certain embodiments, flag values may be selected from those presented in Table 1 below:

TABLE 1

| Header flags | |
| --- | --- |
| Flag Name | Flag Value |
| Start message | 0x01 |
| Message data (i.e. middle message" | 0x02 |
| End message | 0x04 |
| Fragment acknowledgment | 0x08 |
| Keep alive message | 0x10 |

A start message header indicates that the message includes the message length 611 in the block 607. In some embodiments, this message length indicates a length of the entire message and not just the data in the currently described block 607. The start message header also indicates that the sequence number 610 and a fragment payload 612 are included in the block 607. The message data header indicates the presence of a non-terminating message fragment (i.e., not the end of the message) with a data length equal to a negotiated fragment size (MTU) minus the header overhead. The message header also indicates that the sequence number 610 and the fragment payload 612 are included in the block 607. The end message header indicates that the fragment payload 612 includes the end of the message. The length of this message is determined by the remaining amount of data of the message that has not been sent as indicated by the message length 611. The end message header also indicates that the block 607 includes the sequence number 610 and the fragment payload 612. The fragment acknowledgment header indicates that an acknowledgment 609 is included in the block 607 regardless of whether the sequence number 610 or the fragment payload 612 are included. The keep alive header indicates that the message includes the sequence number 610 along with the header data but has no other fields.

D. Sequence Numbers

Sequence numbers enable detecting whether a local or remote BLE controller has reset or re-ordered its received GATT requests. Sequence numbers also facilitate the determination of BTP receive windows and transmission of keep-alive messages.

All BTP message fragments are sent with a sequence number These sequence numbers are unsigned 8-bit integers which increase monotonically by 1 for each message fragment sent with one. Sequences numbers are defined and incremented separately for each BTP connection maintained by a system. For each connection, the BTP stack on a single device will maintain separate sequence number counters for sent and received message fragments. When a new BTP connection is formed, its sequence numbers are initialized to a starting number (e.g., 0). Sequence numbers wrap back to the starting number once they exceed a size available to be represented in a predefined number (e.g., 8) of bits allocated for the sequence numbers. For example, in embodiments where 8 bits are allocated to sequence numbers, available sequence numbers are 0 to 255 (e.g., $255=2^8-1$). Thus, in such embodiments, a message fragment having a sequence number of 255 is followed by a message fragment having a sequence number of 0.

If a device receives a message fragment with an unexpected sequence number, it resets the corresponding BTP connection. Such a failure indicates a failure of L2CAP's reliability mechanisms or an error on the BLE controller.

1. Sequence Number Acknowledgment

Sequence number acknowledgements support the BTP receive window. Sequence number acknowledgments also provide a signal that the BTP stack on the other side of a connection remains up and healthy.

When it sends a message fragment, the BTP stack starts a timer (the "acknowledgement received" timer) if this timer is not already running. The duration of this timer is defined as the "acknowledgement timeout interval." The stack restarts this timer when a valid fragment acknowledgement is received for any but the most recently sent unacknowledged message fragment. Fragment acknowledgements are received as unsigned 8-bit integers piggybacked onto BTP message fragments, or as standalone acknowledgements with no sequence numbers or message payloads. This timer stops if an acknowledgement is received for the most recently sent and unacknowledged message fragment. If this timer expires or an invalid fragment acknowledgement is received, the stack resets the connection.

An acknowledgement is invalid if the acknowledged sequence number does not correspond to an outstanding, unacknowledged BTP packet sequence number.

When the BTP stack receives a message fragment with a sequence number, the BTP stack records this sequence number as the connection's "pending acknowledgement" value and starts a timer (the "send acknowledgement" timer) if this timer is not already running. The duration of this timer is defined as one-half of the acknowledgement timeout interval to ensure acknowledgements will be received before a sender closes the connection for lack of them.

The stack stops this timer when the pending acknowledgement is sent. If this timer expires and the stack has a pending acknowledgement, the acknowledgement is immediately sent as a fragment with no message payload. If the stack sends any message fragment before this timer expires, it piggybacks the pending acknowledgement on the sent message fragment and stops the timer.

In some embodiments, if the BTP stack detects that its number of pending acknowledgments to send has shrunk to an immediate-send threshold (e.g., 2 or fewer message fragments left in a receive window), it immediately sends any pending acknowledgement.

E. Receive Window

A receive window ensures proper sequencing by enabling application-layer flow control on top of GATT between both devices in a BTP connection. The receive window blocks fragment sequence numbers from wrapping unexpectedly. Both devices (e.g., client and server) of a BTP connection define a receive window, where the window size is the number of sequential message fragments each side determines that it can reliably receive without acknowledgment. In some embodiments, an initial window size is established for both devices in a BLE connection as part of the BTP connect handshake. In certain embodiments, the receive window may have a maximum size that is decremented for pending interactions. In some embodiments, the receive window is capped at half the number of possible sequence numbers. For example, if the possible sequence numbers are 0-255, the maximum window size may be defined as 127. Setting such limit on the receive window blocks unacknowledged sequence number wrap-around. For example, such limits block receiving a newer initial sequence number 0 for a message fragment that is sent when an older expected number below the median sequence number 127 could also be received.

In certain embodiments, both sides maintain a counter to reflect each other's current receive window size. For example, the client 502 may maintain a counter to reflect a window size of the server 504. This counter is decremented whenever a new message fragment is sent. When a message acknowledgement is received, the counter is incremented by ((acknowledged sequence number—oldest unacknowledged sequence number)+1). If the counter is 0, the sender refrains from sending further message fragments until the counter is incremented. If the counter is incremented from 0 on receipt of a message fragment, the sender immediately resumes message fragment transmission.

For an example, the GATT client 502 may send a data block with a connect response acknowledgement. During the handshake, the maximum window for the server 504 and the client 502 is set to four messages. When a second message is sent from the client 502 to the server 504, the receive window size for the server 504 shrinks to two causing the server 504 to send an acknowledgment prior to send acknowledgment. Increasing the receive window for the server 504 back to three and decrementing the receive window for the GATT client to three from four.

In some embodiments, both devices using BTP in a BLE connection maintain a counter of their own receive window sizes. These counters are based on the sequence numbers of the last message fragment received by the respective device and the last acknowledgement sent by the respective device. This counter is used to send early acknowledgements to prevent unnecessary latency in cases where a receiver's window size is 0. In other words, a device may send any pending message acknowledgments without waiting further for a message fragments on which the device might piggyback the acknowledgement. The device sends the pending message acknowledgments immediately regardless of whether the send acknowledgement timer is still ticking.

F. Keep Alive Messages

As previously discussed, in some embodiments, some blocks 600 may be indicated as a keep alive message. Keep alive messages may be used to determine whether the remote BTP stack in a given connection has crashed or stopped. Alternatively, such determinations may use underlying technology of the relatively low power networks. Thus, keep alive messages ensure connectivity even when no application data is being sent or acknowledged, such as when the connection is idle at the message layer.

When the BTP stack stops its send acknowledgement timer and plays the BLE central (e.g., client 502) role in the corresponding connection, it starts a keep alive timer with a duration of one-half of the acknowledgement timeout interval. It restarts this timer when it sends any message fragment (including keep alive messages or other timer-driven acknowledgements) and the timer is already running. It stops this timer if it receives any message fragment with a sequence number. As the pending acknowledgement, this fragment generates temporarily removes the usefulness of explicit keep alive messages. If the send keep-alive timer expires, the stack sends a keep alive message, and the timer is restarted. As with regular payload-bearing message fragments, a lost keep-alive acknowledgement will cause the connection to be reset.

Keep-alive messages are BTP message fragments with a valid sequence number, but a null payload. Though they are acknowledged by the receiver, keep-alive messages are not passed up the stack from the BTP message reassembler to the next-higher layer, i.e. the higher-level protocol message layer. BTP keep alive messages thus do not interfere with the automatic closing of idle smart network connections based on the absence of message traffic.

As with regular payload-bearing message fragments, the BTP stack on the BLE central device will not send keep alive messages if the peripheral's receive window is full.

When the BTP stack stops its acknowledgement received timer and plays the BLE peripheral role (e.g., server 504) in the corresponding connection, it starts a keep alive received timer with a duration of the acknowledgement timeout interval. It restarts this timer whenever it receives any BTP message fragment. It stops this timer if it starts the acknowledgement received timer. If the keep alive received timer expires, the peripheral device resets the BTP connection.

IV. Advertisements

BLE Generic Access Profile (GAP) advertisements are used to signal the presence and status of BTP-enabled peripheral devices. To signal their presence, BTP-enabled BLE peripherals shall include in their advertising data a list of service UUIDs, in either its 16-bit or 128-bit representation. Centrals may filter BLE scan results by this UUID to return only BTP-enabled peripherals.

Figure 20:
FIG. 20 illustrates a transmission of an advertisement used to establish a BLE connection, according to an embodiment.

As illustrated in FIG. 20, when establishing a BLE connection between a first device 614 and a second device 615, one of the devices (e.g., device 614) sends out an advertisement 616 that indicates various details about the advertising device, any connected networks, and/or the potential BLE connection. Smart network devices advertise in a consistent format to use the limited advertisement data space. For example, the format may be restricted to 59 bytes with 28 designated to advertisements and 31 bytes designated for scan responses. The BLE advertisement may be used to indicate various details about the device, alarms, communication types, and/or networks to which the advertising device connects. For example, the BLE advertisement may distinguish the advertising device from other devices, include a human-readable name for the advertising device, indicate an alarming or non-alarming state for the advertising device, indicate an alarming state for a device connected to the advertising device, identify class of the advertising device, identify whether the advertising device is paired to an account, and/or identify various information about services (i.e., groups of characteristics) to be used in a BLE communication resulting from coupling to the advertising device.

Moreover, the advertisement may include indications of supported BLE services using UUIDs. For example, a general service UUID may be used to indicate that the device supports communication over a specific communication protocol (e.g., Weave). Additionally or alternatively, a critical event service UUID may be used to indicate that at a critical event (e.g., smoke detected) has occurred and should receive attention urgently. In some embodiments, these service indicators (e.g., UUID) may be the same size (e.g., 16 bits) or some other size.

A. General Format of BLE Communications

Figure 21:
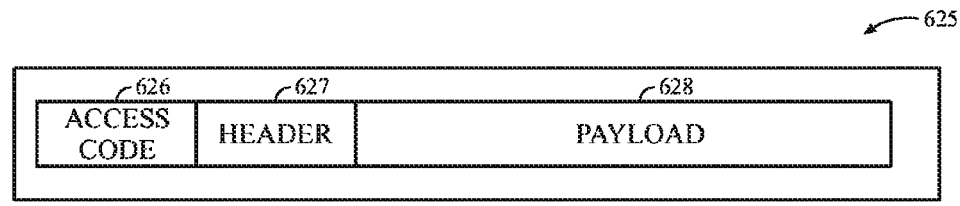
FIG. 21 illustrates a schematic allocation of a BLE data block including an access code, header, and payload, in accordance with an embodiment.

FIG. 21 illustrates a block format 625 that may be used to transmit BLE communications (e.g., advertisements). The block format may include an access code 626, a block header 627, and a payload 628. One or more of these fields may be omitted in some embodiments. The access code 626 may be used to synchronize communications, to identify direct current (DC) offset, to compensate DC current offset, to identify all data blocks exchanged on a physical channel, and/or to perform other suitable message tracking operations. The access code 626 may vary in length depending on whether the block header 627 or the payload 628 is present in a message. For example, the access code 626 may have a first length (e.g., 72 bits) when the block header 627 and the payload 628 are present and a second length (e.g., 68 bits) when the block header 627 and/or the payload 628 is missing. In some embodiments, the shorter access code 626 may be used in paging, inquiry, and/or park.

a. Access Code

Figure 22:
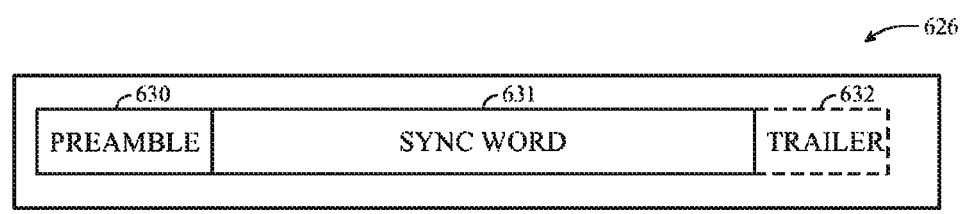
FIG. 22 illustrates a schematic allocation of the access code of FIG. 21, in accordance with an embodiment.

The access code 626 may have a format such as that illustrated in FIG. 22. In the illustrated embodiment, the access code 626 may include a preamble 630, a sync word 631, and a trailer 632. The preamble 630 is a fixed zero-one sequence of a number (e.g., 4) of symbols used to facilitate DC compensation. For example, in some embodiments, the sequence may be either '1010' or '0101' (in transmission order), depending on whether the least significant bit of the following sync word 631, if present, is 1 or 0, respectively. In some embodiments, a specific value for the preamble may be used for broadcasted advertisement messages.

The sync word 631 may be a code word of one size (e.g., 64 bits) derived from an address having a different size (e.g., 24 bit) that is constructed from address parts (e.g., upper or lower address parts) of the client or server or may be an at least partially fixed number. In some embodiments, the sync word 631 may be omitted.

The trailer 632, when present, is appended to the sync word 631 when the block header 627 follows the access code 626. The trailer 632 is a fixed zero-one sequence of four symbols. The trailer 632 together with the three most significant bits of the sync word 631 form a 7-bit pattern of alternating ones and zeroes which can be used for extended DC compensation. In other words, the trailer 632 has a sequence of either '1010' or '0101'(in transmission order) depending on whether the most significant bit of the sync word is 0 or 1, respectively.

b. Header

Figure 23:
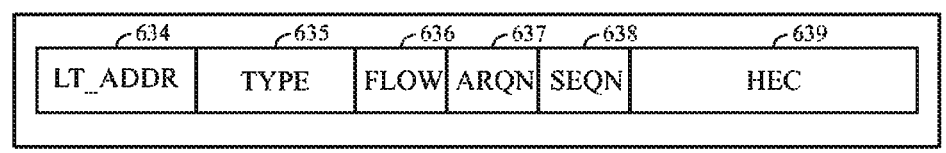
FIG. 23 illustrates a schematic allocation of the header of FIG. 21, in accordance with an embodiment.

FIG. 23 illustrates an embodiment of the header 627. As illustrated, the header 627 may include a logical transport address (LT_ADDR) 634, a type code 635, a flow control 636, an acknowledgment indication 637, a sequence number 638, and a header error check (HEC) 639. The LT_ADDR 634 is a field contains the logical transport address for the block. This field indicates a destination client (or clients in the case of an advertisement broadcast) for a block in a server-to-client transmission slot. In some embodiments, this logical transport address may be fixed for connection-less broadcasts (e.g., (0x8E89BED6).

The type code 635 indicates what type of block is being used and may be interpreted based on the LT_ADDR 634 (e.g., connectionless broadcast or advertisement). The type code 635 may also indicate a number of slots that the block will occupy to enable receivers to refrain from listening during the remaining duration of the indicated slots.

The flow control 636 is used for flow control of packets and is used only for certain transport types. When a receiver buffer of one of the transport types in the recipient is full, a STOP indication (FLOW=0) is returned to stop the other device from transmitting data temporarily. When the receiver buffer can accept data, a GO indication (FLOW=1) is returned. When no packet is received or the received header is in error, a GO is assumed implicitly. In this case, the client can receive a new packet with Cyclic Redundancy Checking (CRC) even though its receiver buffer is still not empty. The client then returns a Not Acknowledged message in response to this packet even if the packet passed the CRC check. The flow control 636 when unused may be set to a specific number (e.g., 1 or 0) and ignored upon receipt.

The acknowledgment indication 637 is used to indicate a source of a successful transfer of payload data with CRC. The acknowledgment indication 637 may be positively acknowledged with a first value (e.g., 1) or indicated as not acknowledged with a second value (e.g., 0). This bit may be ignored for some transport types and set to specific value (e.g., 0 or 1) on transmission and ignored upon receipt.

The sequence number 638 provides a sequential numbering scheme to order the data packet stream. For some broadcast blocks, a modified sequencing method may be omitted or ignored, instead relying on the sequence numbers 610 discussed previously. The HEC 639 may include address parts from the client and/or server to verify that the proper packed has been delivered using the access code 626.

c. Payload

Figure 24:
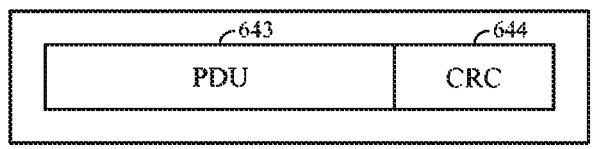
FIG. 24 illustrates a schematic allocation of the payload of FIG. 21, in accordance with an embodiment.

FIG. 24 illustrates an embodiment of the payload 628 that includes a protocol data unit (PDU) 643 and CRC 644. The PDU 643 may include payload data to be transmitted/received in a specific format. For example, the PDU 643 may be formatted similar to the blocks 595, 601, or 607. Additionally or alternatively, the PDU 643 may be formatted similar to the advertisement payloads as discussed below depending on the type code 635. Furthermore, the length of the payload may be set by the payload type, by a payload length included in payload headers located in the payload 628, and/or by a maximum transfer unit (MTU) of the sending or receiving device.

The CRC 644 is a data integrity check that may be optionally included in the payload 628 or added to the end of payload 628 to ensure that the data sent in the payload 628 is valid. In some embodiments, the CRC 644 may be derived from each octet of the header 627 and the payload 628.

B. General Service

A general service may be included that indicates that data communication may occur over a specific protocol (e.g., Weave). By including an indication that the advertising device supports this service, the advertising device and another remote device may communicate over BLE using the GATT structure, as previously discussed.

As previously discussed, the advertisement data may include the general service UUID. In addition to the general service UUID, metadata may be associated with this service. In certain embodiments, the advertisement may contain identification information for the device. Additionally or alternatively, some embodiments may hide at least some of the identification information using an authentication token. For example, the advertisement may be hidden/encrypted for a mobile authentication device that may physically move within Bluetooth range of devices that should not connect to the mobile authentication device nor share information about the mobile authentication device. The advertisement can indicate which types of information are included. Accordingly, the advertisement including the general service may include a service data field that identifies types of weave data used. For example, in this field, a first value (e.g., 0x01) indicates that device information is included in the advertisement, and a second value (e.g., 0x02) indicates that an authentication token is included without explicit recitations of device information. In some embodiments, a hybrid communication type may be included that shares some information, but hides other information. Moreover, in some embodiments, other suitable data block types may be encoded into this field.

When the BLE advertisement includes device information, the advertisement may include fields similar to those represented in Table 2 below.

TABLE 2

Device information

| Field | Description | Size (Octets) |
|---|---|---|
| Data Version (e.g., version 0.1) | Indicates major (e.g., 0) and minor version (e.g., 1) of this metadata. | 2 |
| Device Class | Classifies the device by vendor/manufacturer, product, etc. | 4 |
| Device ID | Populated with an identifier that identifies the device within the smart network. | 8 |
| Account Pairing Status | Indicates whether or not device is paired to an account. | 1 |

Although Table 2 includes indications of octet size for each field in the device information, some embodiments may increase or decrease these sizes based on implementation requirements. The device class may include a vendor identifier (ID) that identifies a manufacturer or vendor of the device. The device class may also include a product identifier that identifies a specific device type provided by the vendor. The device ID may be an identifier used to identify the device in the smart network. For example, the device ID may be a node ID for the device in the smart network. The account pairing status indicates whether the device is paired to an account on a remote service. In some embodiments, some actions (e.g., hushes of alarms) are restricted to devices that are paired to an account on the remote service. In other words, in such embodiments, hazard detectors that are not paired to the remote service cannot be hushed. Furthermore, in some embodiments, only hushing devices that have access to the account to which the hazard detector is paired. For example, when the hazard detector is paired to the remote service, a hush key is generated by the service that is passed to the hushing device (e.g., cellular phone) when the hushing device accesses the paired account on the remote service. The hazard detector will not accept hush commands without this hush key. Moreover, this hush key may be common to any devices that are paired to or have access to a common account on the remote service.

In advertisements that include an authentication token, the payload may be at least partially encrypted. In some embodiments, version numbering may be unencrypted to provide an indication how to decrypt the advertisement to an authorized device receiving the encrypted advertisement. In other embodiments, the version numbering may be encrypted either with the remainder of the advertisement or in its own encryption envelope that is decrypted consistently between authentication token versions.

C. Critical Event Service

In the event that there is an alarm/event indicating urgency on the device, the advertisement may include details for the accompanying critical event service in addition to or in place of the general service. In this case, the advertisement would include an indication that the critical event service in the list of UUIDs supported and event-specific information categorizing the critical event.

In a state where the nest device conveys a critical event, it does so by utilizing this field of the advertisement. In some scenarios, there may be multiple critical events at the same time.

Multiple critical events can be conveyed in a single advertisement using a format similar to that shown in Table 3 below.

TABLE 3

Multiple Critical Events in a Single Advertisement

| Field | Size (Octets) |
|---|---|
| 16 bit service UUID for the critical event service | 2 |
| Data length for $1^{st}$ critical event | 1 |
| Critical event type for $1^{st}$ critical event | 1 |
| Data for $1^{st}$ critical event | Variable (but fixed by type) |
| Data length for $2^{nd}$ critical event | 1 |
| Critical event type for $2^{nd}$ critical event | 1 |
| Data for $2^{nd}$ critical event | Variable (but fixed by type) |

Although Table 3 includes example data lengths, some embodiments may vary length of the various fields. Furthermore, the critical event type may indicate a type of alarm being sent. In some embodiments, this critical event type may indicate what type of device originated the critical event. For example, an alarm (e.g., smoke alarm, CO alarm, heat alarm, etc.) from a hazard detector may be classified as a single critical event type. Each event type may have a defined length of octets that corresponds and will follow the event type field in the advertisement.

Table 4 below represents a possible example of the event type-specific that may follow the event type field. Again, the below table includes a possible length for each field, but some embodiments may have different field sizes and/or vary the field size between implementations.

TABLE 4

Critical event service data

| Field | Size(Octets) | Remarks |
| --- | --- | --- |
| Class event version | 1 | Version number |
| Alarm challenge | 4 | Alarm challenge data |
| Number of alarm events | 1 | Number of alarms in this type |
| 1<sup>st</sup> alarm information | 1 | Higher nibble has alarm type Lower nibble has alarm state |
| 2<sup>nd</sup> alarm information | 1 | Higher nibble has alarm type Lower nibble has alarm state |

The class event version indicates to which general class the critical event belongs. For example, the class event may be a hazard detected (e.g., smoke, fire, CO, etc.), a security alarm, an irrigation problem, and/or other suitable event types that may be alerted in the smart network. The alarm challenge is used to ensure that any hush requests are timely.

The alarm information includes a higher nibble that indicates an alarm type specific to the class event. For example, in alarms that arise from a hazard detected, the higher nibble of the alarm information indicating alarm type may be chosen from the values in Table 5 below:

TABLE 5

Alarm types

| Value | Name | Comments |
| --- | --- | --- |
| 0x10 | ALARM_SMOKE | Alarm triggered by a smoke sensor |
| 0x20 | ALARM_TEMP | Alarm triggered by a temperature sensor |
| 0x30 | ALARM_CO | Alarm triggered by a CO sensor |
| 0x40 | ALARM_CH4 | Alarm triggered by a natural gas sensor |
| 0x50 | ALARM_HUMIDITY | Alarm triggered by a humidity sensor |
| 0x60 | ALARM_SECURITY | Security Alarm |
| 0x70 . . . 0xe0 | | Reserved for future use |
| 0xf0 | ALARM_OTHER | Other alarm condition not called out here. Check metadata for the specific alarm source. |

The lower nibble indicates a state for the alarm that may be chosen from the values in Table 6 below:

TABLE 6

Alarm states

| Value | Name | Comments |
| --- | --- | --- |
| 0x00 | STATE_STANDBY | Everything is OK. Originating node will send this to indicate an "all clear" for the specific alarm source |
| 0x01 | STATE_HEAD_UP_1 | Pre-alarm state - lower magnitude of alert |
| 0x02 | STATE_HEAD_UP_2 | Pre-alarm state - higher magnitude of alert |
| 0x03 | STATE_HU_HUSH | Pre-alarm state |
| 0x04 | STATE_ALARM_HUSHABLE | Alarm state, the originating or remote node may locally hush the alarm |
| 0x05 | STATE_ALARM_NON-HUSHABLE | Originating alarms may not be hushed, but remote alarms may hush |
| 0x06 | STATE_ALARM_GLOBAL_HUSH | Alarm hush: the originating and the remote nodes are in the hush state |
| 0x07 | STATE_ALARM_REMOTE_HUSH | Global hush: the originating node is alarming and the remote nodes are hushed |
| 0x08 | STATE_SELFTEST | Self-test of the senor alarm |

D. Additional Information in the Advertisement

Additionally or alternatively to the service UUIDs and related information, some embodiments may include a human-readable name for the device. For example, in some embodiments, the human-readable name may be optional with a length up to a limit (e.g., 4 bytes) indicating the name of the device. For example, the human-readable name may include a binary value for the text "d2." The advertisement may also include additional manufacturer specific data in a manufacturer specific header (MSH). The MSH may include an AD type that that indicates advertisement data specific to the manufacturer. In some embodiments, this data may be allocated 1 byte (e.g., 0xFF). The MSH may also include a manufacturer identifier code. In some embodiments, this identifier may have a predetermined length (e.g., 2 bytes). In some embodiments, this information may be taken from the vendor ID previously discussed.

E. Splitting Data

In some embodiments, the data to be included in the advertisement cannot be included in a single advertisement packet due to size constraints or other constraints. In such scenarios, the data to be advertised may be split between an advertisement packet and a scan response packet, both of which are relayed to the scanning device. Based on the operating system of the central device, these packets might be reported as separate events but then correlated in the scanning device. Based on splitting of data, critical information may be prioritized and included in the advertisement packet, which is sent before the scan response packet. The scan response packet may be provided later (e.g., in response to a scan request from the scanning device).

When the application (i.e. Weave message layer) sends a message over a BTP connection, that message shall be split into ordered, non-overlapping fragments such that the set of all fragments may be reassembled into the original message. Each fragment is prepended with a BTP packet header and sent as the payload of a single GATT operation. If a message is split into more than one fragment, fragments are sent in order of their position in the original message packet, starting with the fragment at the message's head.

At any point in time, only one message may be transmitted in each direction over a BTP connection. The transmission of fragments of any two messages may not overlap. If the application attempts to send one message while transmission of another message is in progress, the new message shall be appended to a first-in, first-out queue. The next message will be popped off this queue and transmitted once transmission of the current message is completed.

As discussed below, the BTP packet which contains the first fragment of a message sent over a BTP connection has a Start Message header flag set to indicate the beginning of a new message. The presence of this flag indicates the further presence of a 16-bit unsigned integer field which provides the receiver with the total length of the fragmented message. Any BTP packet which does not have its Start Message flag set and contains a message fragment includes a Continue Message flag. The last BTP packet for a given message has an End Message flag set to indicate the end of the transmitted message. A BTP packet which bears an unfragmented message, i.e. a message small enough to fit into a single fragment, has both its Start Message and End Message flags set.

The size of a single message sent via BTP is limited to some length (e.g., 64 KB or. The maximum size of the 16-bit unsigned integer length field in the BTP packet header). The number of fragments used to send a message is unlimited, and delimited by the Start Message and End Message bits in the BTP packet header.

The length of the fragment data payload in each BTP packet whose End Message bit is not set is equal to the connection's maximum BTP packet size minus the size of that packet's header. If a packet's End Message bit is set, the length of its fragment data payload may be equal the size of the original message minus the total size of all previously transmitted fragments of that message. In this way, the length of a message's last fragment is implied by its size.

Once a peer receives a complete set of fragments, the peer reassembles the fragments in the order received and verifies that the reassembled message's total length matches that specified by the Start Message fragment's length value. If the length matches, the receiver passes the reassembled message up to the next-higher-layer application. If the reassembled message's length does not match that specified by the sender, or an End Message packet's fragment payload size would exceed the maximum BTP packet size, the receiver closes the BTP connection and reports an error to the application.

If a peer receives an End Message fragment without the presence of a previous Start Message fragment, or a Start Message fragment when another message's transmission is already in progress, the receiver closes the BTP connection and report an error to the application.

Figure 25:
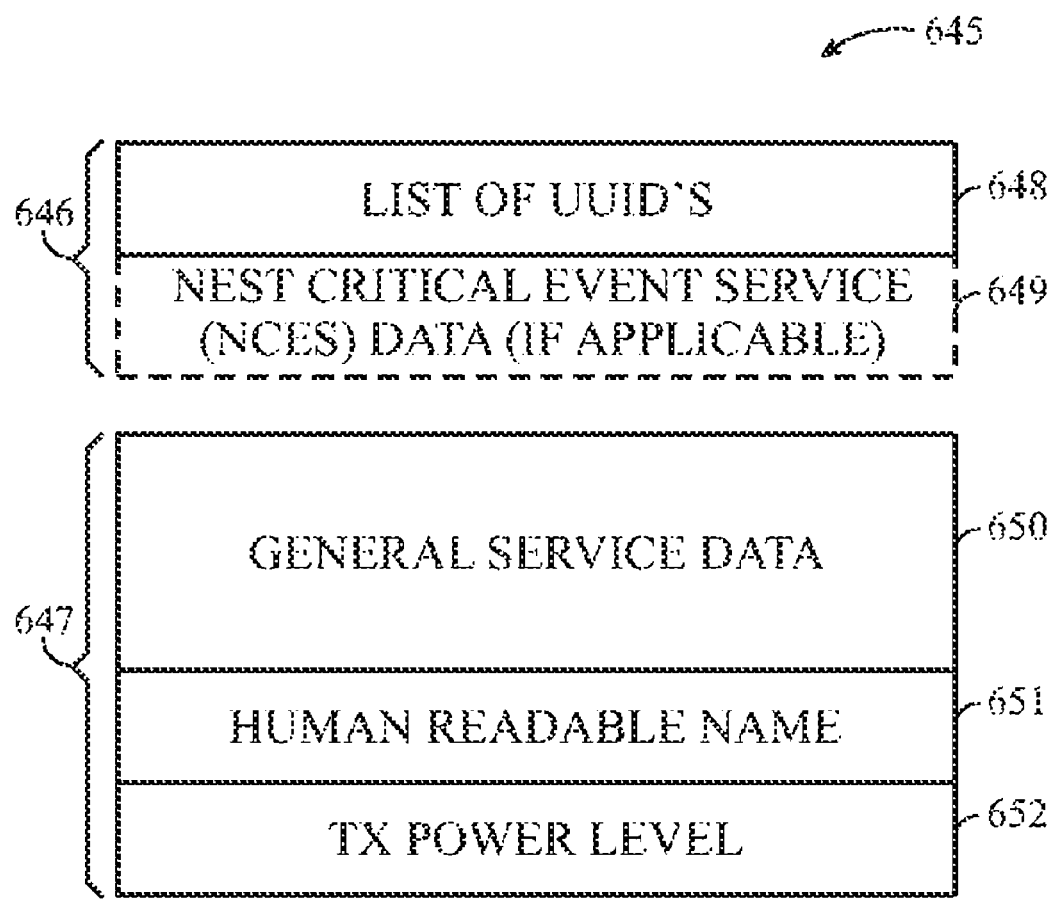
FIG. 25 illustrates a schematic allocation of the advertisement of FIG. 20 into a main advertisement packet and a scan response packet, according to an embodiment.

FIG. 25 illustrates an embodiment of an advertisement 645 divided into an advertisement packet 646 and the scan response packet 647. As illustrated, the advertisement packet 646 includes a list of UUIDs for the available services 648, such as the general service and the critical event service. Also, if a critical event has occurred and/or is occurring, the advertisement packet 646 includes critical service data 649.

Data that is less time-critical may be included in the scan response packet 647 that may be sent along with the advertisement packet 646 and/or later (e.g., in response to a scan request). For instance, the scan response packet 647 may include general service data 650, a human-readable name 651, and/or a transmission power level 652. The general service data 650 and human-readable name 651 may conform to the example structures previously discussed. The transmission power level 652 may indicate at what level (e.g., in dBs) the communications are to occur. In some embodiments, this transmission power level may be used to determine how far the advertisement is received from the broadcasting device.

F. Advertisement Examples

1. Non-Alarming Device Example

Figure 26:
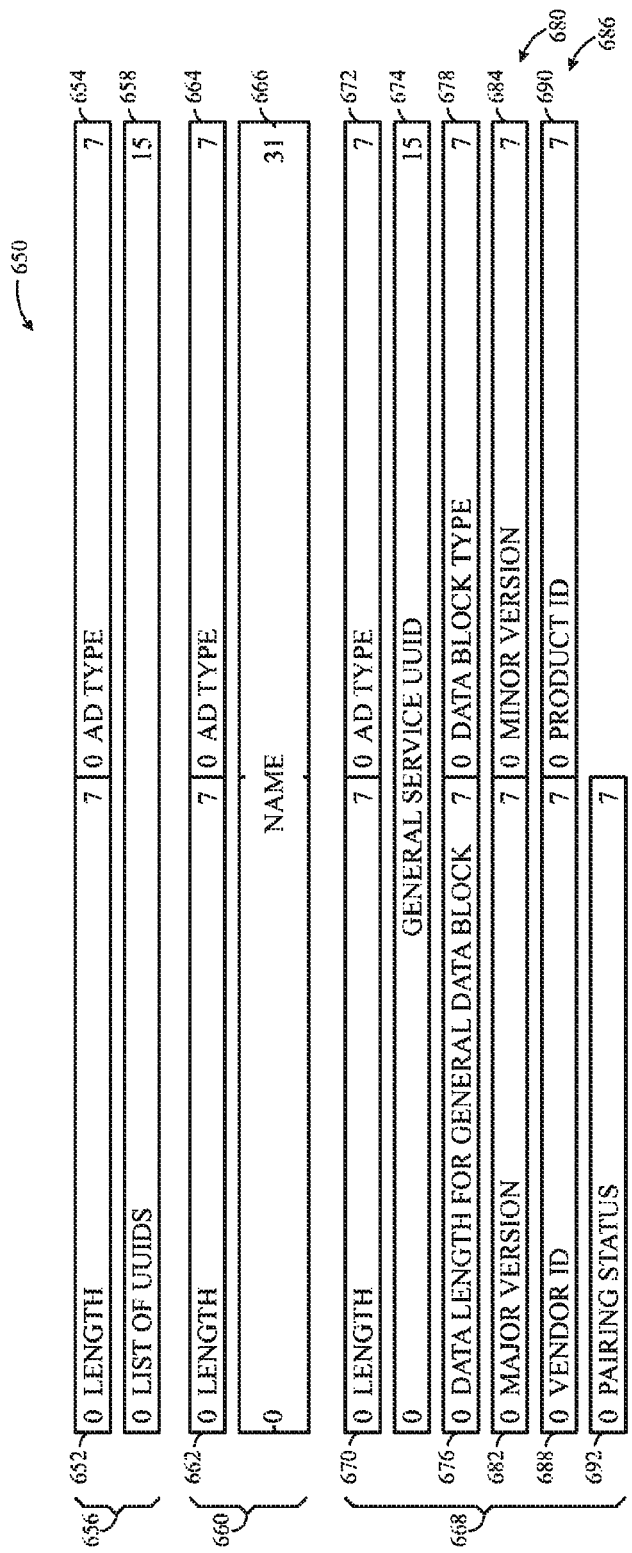
FIG. 26 illustrates the advertisement of FIG. 20 when the electronic device is not alarming, according to an embodiment.

FIG. 26 illustrates an embodiment of an advertisement 650 that may be sent by a device over BLE. In some embodiments, sizes and order of the various fields may vary. Moreover, in some embodiments, some of the fields may be omitted from at least some transmissions of the advertisement. In certain embodiments, the advertisement 650 includes a length field 652 that indicates a length of the overall advertisement. The advertisement 650 also includes an AD type field 654 that indicates what type of data is included in one or more following fields and/or what type of data is referred to by the length field 652. In some embodiments, when the AD type field 654 has a value (e.g., 0x02) that indicates that the length field 652 pertains to a metadata header 656 that includes the length field 652, the AD type field 654, and a List of UUIDs 658. In some embodiments, the length field indicates the length of the data chunk (e.g., metadata header 656) to which the length field 652 and the AD type field 654 pertain. Moreover, in some embodiments, the length may indicate a length of the remaining fields of the data chunk. For example, in such embodiments and where the fields have lengths corresponding to those illustrated in FIG. 13, the length field may have a value of 3 that indicates that the list of UUIDs 658 and the AD type field B4 have a total length of 3 bytes.

In some embodiments, the advertisement 650 may include a human-readable name data chunk 660. In some embodiments, this human-readable name data chunk 660 provides a short human-readable name for the device transmitting the advertisement 650 that may be used for providing a short identification for the device for use in testing, diagnostics, and/or other suitable situations. In certain situations, some advertisements from a single device and/or in a single network may include the human-readable name data chunk 660 while other messages and/or devices in the network may be sent without the human-readable name data chunk 660. In advertisements (e.g., the advertisement 650) that include the human-readable name data chunk 660, the human-readable name data chunk 660 includes a length field 662, an AD type field 664, and a name field 666. The length field 662 indicates a length of the human-readable name data chunk 660. The AD type field 664 includes a value (e.g., 0x16) that indicates that the data chink is the human-readable name data chunk 660 that informs a receiving device how to interpret the human-readable name data chunk 660. The name field 666 includes a string of characters that may be used to identify the sending device in a human-readable format (e.g., "t2"). In some embodiments, the string may be represented in UTF-8 or some other suitable character encoding. Moreover, in some embodiments, the length of the name field 666 may be capped at a specific value. For example, in some embodiments, the length of the name field 666 may be limited to 1, 2, 3, 4, 5, 6, or more bytes in addition to or alternative to the length field 662.

The advertisement 650 also includes a general service data chunk 668. The general service data chunk 668 includes a length field 670 that identifies a length of the general service data chunk 668 and an Ad type field 672 that includes a value (e.g., 0x16) that indicates that the general service data chunk 668 is of the general service type. The general service data chunk 668 also includes a general service UUID 674 for the general service. In some embodiments, the general service data chunk 668 also includes a data block length field 676 for network/device data included in the advertisement. In other words, the data block length field 676 indicates a length of the general service data chunk 668 other than the general service UUID 674 and related whole chunk metadata fields (e.g., length field 670 and AD type field 672). In some embodiments, the data block length field 676 may be omitted because the fields of the general service data chunk 668 whose length are not included in the data block length field 676 may be consistent in size between advertisements.

The general service data chunk 668 may also include a data block type field 678 that identifies the data block length field 676 (when present) and the following data as data related to the device and/or its connected network(s).

The general service data chunk 668 also includes version information 680 that indicates a version of encoding that informs a device receiving the advertisement 650 how to interpret the advertisement 650. In some embodiments, the version information 680 includes a major version field 682 and a minor version field 684. The major version field 682 may include a value (e.g., 1) that is incremented when substantial updates are made to the advertisement 650 format, and the minor version field 684 may include a value (e.g., 2) that is incremented when less substantial updates are made to the advertisement 650 format. The values for the major version field 682 and the minor version field 684 may be combined to form a complete indication (e.g., v. 1.2) of the version. In some embodiments, these values may be any value that may be expressed using the available bytes. For example, if each version field is a byte, each version field may contain values from 0 to 255 before cycling.

The general service data chunk 668 also includes a device identifier (ID) field 686 that may be used to identify the device within the smart network. The general service data chunk 668 also includes a device class identification 686. The device class information may include two subfields: a vendor ID field 688 and a product ID 690. The vendor ID field 688 indicates a vendor for the device, and the product ID 690 indicates the device type of the device specific to the vendor. The general service data chunk 668 also includes a service pairing status 692, as previously discussed.

As previously discussed, in some embodiments, the advertisement 650 may be split into two or more packets: an advertisement packet and a scan response packet. In embodiments the advertisement 650 is split into two packets, the length field 652, the AD type field 654, the list of UUIDs B4 form the advertisement packet with the human-readable name data chunk 660. In embodiments that employ the field lengths of the illustrated embodiment of the advertisement 650, this advertisement packet would have a size of 10 bytes. The scan response packet would consist of the general service data chunk and have a size of 21 bytes.

2. Alarming Device Example

Figure 27:
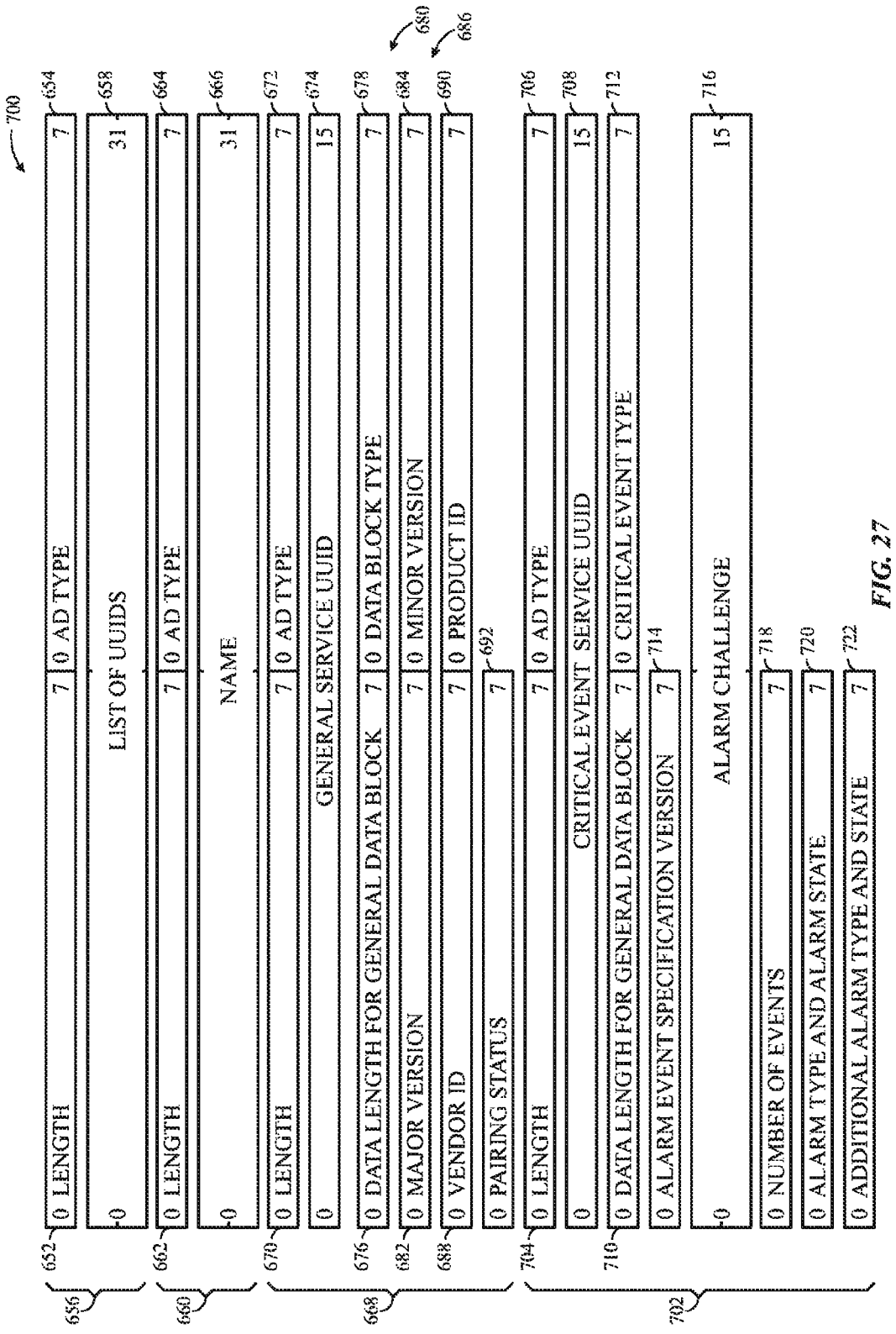
FIG. 27 illustrates the advertisement of FIG. 20 when the electronic device is alarming, according to an embodiment.

FIG. 27 illustrates an embodiment of an advertisement 700. The advertisement 700 includes all the fields of the advertisement 650, but the advertisement 700 includes a critical event data chunk 702 that indicates that the advertising device is in an alarming state. Furthermore, when the advertisement 700 includes the general service data chunk 668 and the critical event data chunk 702, the List of UUIDs 658 may be longer in the advertisement 700 than the advertisement 650. The critical event data chunk 702 includes a length field 704 that indicates a length for the critical event data chunk 702. The critical event data chunk 702 also includes an AD type field 706 with a value (e.g., 0x16) that identifies the critical event data chunk 702 as a critical event data chunk. The critical event data chunk 702 also includes a critical service UUID 708 that contains the UUID for the critical service.

Also, in some embodiments, the critical event data chunk 702 also includes a critical event (CE) data block length field 710 for critical event data included in the advertisement. In other words, the CE block length field 710 indicates a length of the critical event data chunk 710 other than the chunk metadata fields (e.g., length field 704 and AD type field 706). In some embodiments, the CE data block length field 710 may be omitted because the fields of the critical event data chunk 702 whose length are not included in the CE data block length field 710 may be consistent in size between advertisements. The critical event data chunk 702 also includes a critical event type 712 that indicates a type of critical event (e.g., an alarm event from a hazard detector, a security event, etc.)

The critical event data chunk 702 also includes an alarm event specification version 714 that indicates how the critical event data chunk 702 data should be interpreted. The critical event data chunk 702 also includes an alarm challenge 716 that includes a challenge code for the alarm related to the critical event. The challenge code is used to verify that any received hushes are timely by verifying that the received hush is substantially contemporaneous to the critical event. The challenge code may be a small random value generated at the time of the alarm. The receiving device then pulls this code from the advertisement 700 and includes the challenge code in a related hush message. For example, the hush message may be signed using the hush key over the challenge value (i.e., the challenge value is signed using the hush key). When the alarming device determines that the challenge code and the hush key are proper. Then the alarming device sends a response message indicating that the alarm is alarm, an error occurred, or the alarm is unhushable, or some other suitable status.

The critical event data chunk 702 also includes a number of events field 718 that indicates how many critical events are included in the critical event data chunk 702. The critical event data chunk 702 also includes an alarm type and alarm state field 720 that indicates a sub-type of alarm specific to the type of alarm indicated in the critical event type 712. When the number of events field 718 indicates that more than a single event is included in the critical event data chunk 702, the critical event data chunk 702 includes an additional alarm type and state field 722 for each additional critical event included.

The alarm type and alarm state field 720 and the additional alarm type and state 722 (when included) may include values similar to those provided in Tables 5 and 6 above.

In embodiments where the advertisement 700 is split, the length field 652, the AD type field 654, the list of UUIDs B4, the human-readable name data chunk 660, and the critical event data chunk 702. In embodiments that employ the field lengths of the illustrated embodiment of the advertisement 700, this advertisement packet would have a size of 26 bytes, and the scan response packet would consist of the general service data chunk and have a size of 21 bytes.

V. Pairing using BLE

In some embodiments, a joining device may join a fabric and/or the smart network (or at least one of its underlying logical networks such as 802.11) using a commissioning device. A BLE connection may be established between the joining device and the commissioning device using the previously discussed techniques. Using the BLE connection the joining device may be provisioned for a network, joined to a fabric, provisioned for a service (given instructions and/or credentials how to connect to a remote service), and/or paired to an account. In some embodiments, these interactions are restricted to a specific order, such as network provisioning before fabric joining and fabric joining before service provisioning and account pairing. In some embodiments, some joining devices may only perform some of the interactions. For example, in some embodiments, a radiator box is provisioned for network and fabric access but is not provisioned for service access or explicitly paired to a user's account.

In some embodiments, the joining device may be paired to a fabric using assistance from a mobile device as the commissioner. The mobile device may employ a mobile application that is primarily responsible for acting as a commissioner and provisioning joining devices. In certain embodiments, any device on the network may act as the commissioner. In some embodiments, some devices (e.g., thermostats) support commissioning only to pair with subordinate devices (e.g., radiator boxes). In certain embodiments, some devices (e.g., hazard detectors devices) may provide a commissioner with network and fabric provisioning information, but they do not themselves commission new devices.

In some scenarios, a process for pairing additional devices to a fabric may include user input to cause a commissioner to connect to the joining device's self-hosted WiFi access point using a mobile app. In such embodiments, the user manually disconnects from their current WiFi network to connect to the self-hosted AP, and the user manually rejoins their previous network once the new device has been provisioned. Therefore, such joining processes use substantial user interaction.

To free users from manually switching networks during the additional device pairing process, a new mechanism is used to connect to the joining device to fabric devices via a BLE connection so that network provisioning may occur via this connection. In some embodiments, all provisioning data (e.g., data regarding the networks, services, and/or fabrics to which the device is joining) is transferred to the joining device. In other embodiments, a first portion of the provisioning data is transferred over BLE (e.g., network name and authentication credentials for an 802.15.4 or an 802.11 network), and a remainder of the provisioning data over another connection (e.g., an 802.15.4 or an 802.11 network) that the joining device can enable using the first portion of the data.

Figure 28:
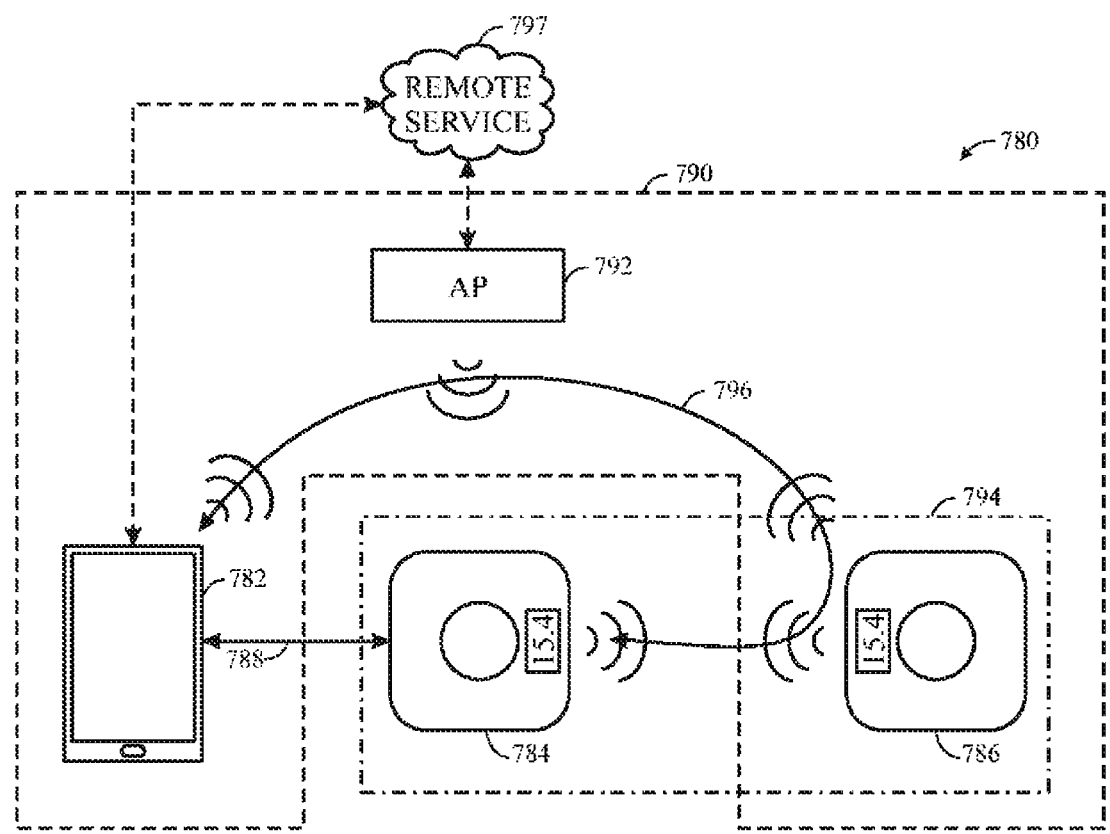
FIG. 28 illustrates a schematic view of a device connection scheme that includes a relatively low power connection between devices, according to an embodiment.

FIG. 28 illustrates a device connection scheme 780 including a commissioner 782. Although the commissioner is illustrated as a smart phone, the commissioner 782 may be any device (e.g., fabric device) suitable for controlling communications with a joining device 784 to be added to a fabric on which an assisting device 786 resides. The commissioner 782 connects to the joining device 784 via a BLE connection 788. In some embodiments, the commissioner 782 also connects to the assisting device 786 via a network 790. In certain embodiments, the commissioner 782 connects to the assisting device 786 directly or via an access point 792. As will be discussed below, in some embodiments, the assisting device 786 then establishes a connection with the joining device 784 through another network 794 (e.g., 802.15.4). Through the assisting device 786, the commissioner 782 establishes a secure connection 796 with the joining device 784. The commissioner 782 also may securely retrieve at least some network and fabric credentials that does not reside on a remote service 797 from the assisting device 786. In other words, the commissioner 782 may communicate with the joining device 784 even when the joining device 782 cannot readily join the network 790. Thus, by using the BLE connection 788, the commissioner 782 may provide a more streamlined interaction than a scenario in which the commissioner 782 joins the joining device 784 on a WiFi network created by the joining device 784 or on which the joining device 784 resides.

Figure 29A:
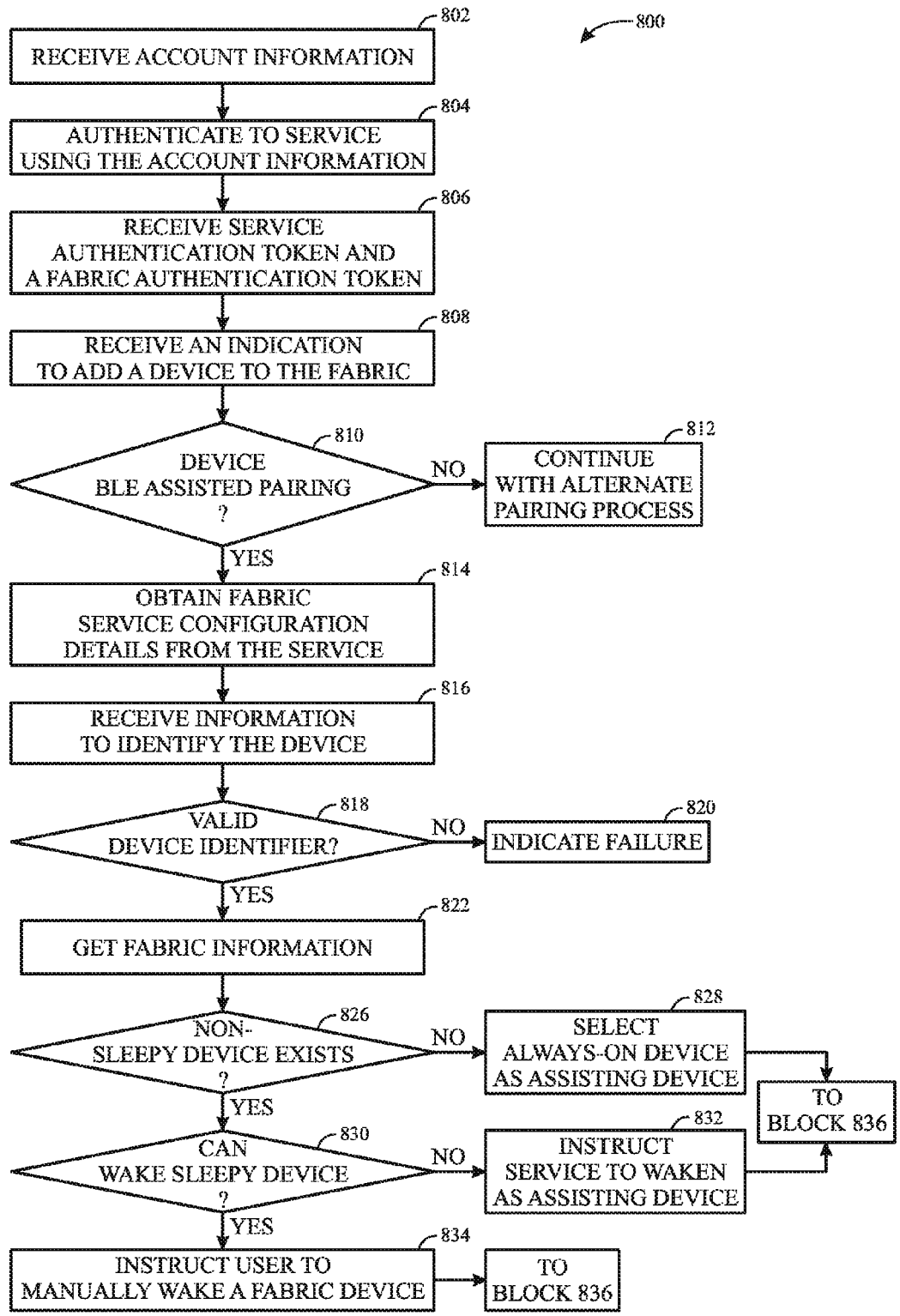
FIG. 29A illustrates a flow diagram of a first part of a pairing process, according to an embodiment.
Figure 29B:
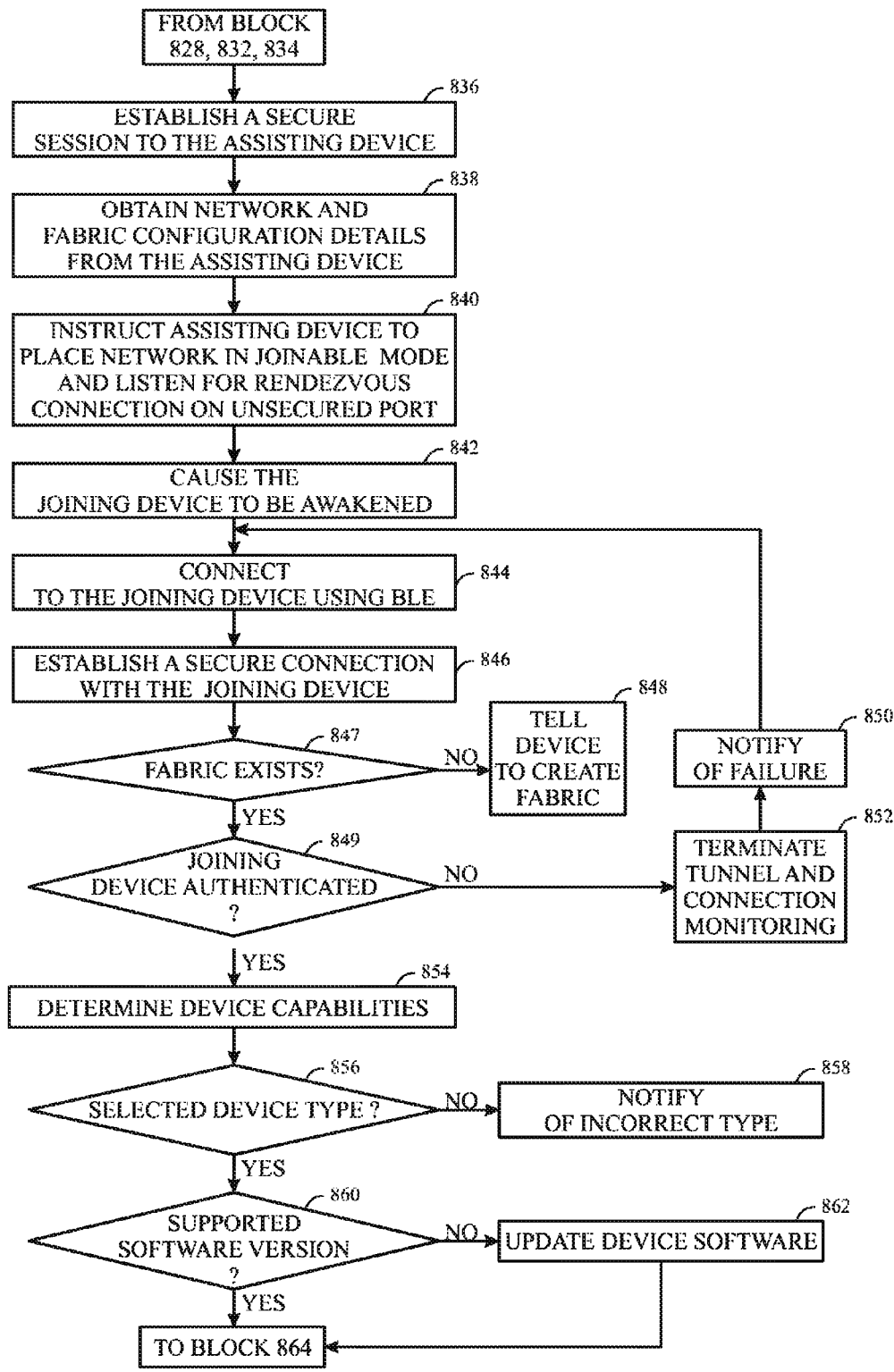
FIG. 29B illustrates a flow diagram of a second part of the pairing process of FIG. 29B, according to an embodiment.
Figure 29C:
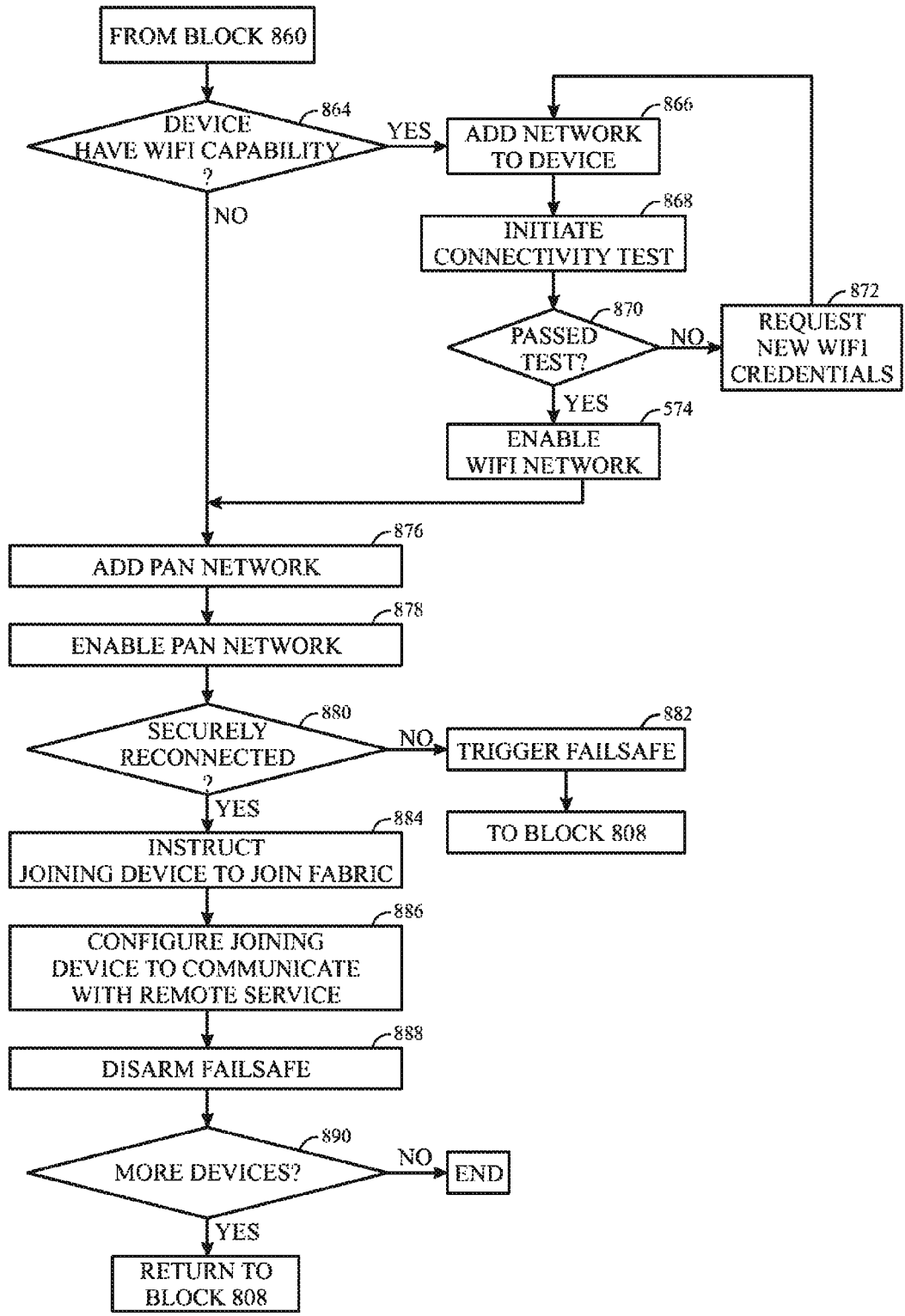
FIG. 29C illustrates a flow diagram of a third part of the pairing process of FIGS. 29A and 29B, according to an embodiment.

FIGS. 29A-29C illustrate a flow diagram of an embodiment of a pairing process 800 by the commissioner 782. The process 800 begins by the commissioner 782 receiving account information (block 802). For example, the commissioner 782 may obtain the account information from a user via a mobile device application program or a web browser. Additionally or alternatively, the commissioner 782 may retrieve the account information from storage on the commissioner 782 or remote from the commissioner 782 (e.g., stored in a remote service). Using the account information, the commissioner 782 authenticates to the remote service 797 (block 804). In some embodiments, the account information may be stored in and retrieved from the remote service 797. In such embodiments, the commissioner 782 may authenticate to the service 797 with authentication keys different than the account information and may retrieve the account information after authenticating to the remote service 797. After authentication in any method, the commissioner 782 receives a service authentication token and a fabric authorization token that are stored and may be used later (block 806). The commissioner 782 also receives an indication to add the joining device 784 to the fabric (block 808). For example, a user may select an add device button on the mobile device application or another suitable indication.

In some embodiments, the indication to add the joining device 784 includes an indication of a device type of the joining device 784. Using the device type, the commissioner 782 determines whether the joining device supports BLE assisted pairing (block 810). If the device type cannot support BLE assisted pairing, the commissioner 782 continues with an alternate pairing process that uses a non-BLE connection pairing scheme (block 812). For example, the alternate pairing process may include a pairing process such as the pairing process taught in U.S. patent application Ser. No. 14/582,062, entitled "Network-Assisted Fabric Pairing" filed on Dec. 23, 2014, which is incorporated herein in its entirety. If the device type supports the pairing process 800, the commissioner 782 obtains fabric service configuration information from the service to be used in pairing the joining device 784 to the service and/or the fabric (block 814). The fabric service configuration information includes any information which may be helpful in pairing the joining device 784 to the fabric and the remote service. For example, the fabric service configuration information may include a service node ID for the joining device 784 (e.g., extended unique identifier EUI-64 format), a set of certificates for the service, a globally unique account id associated with the user's account, a DNS host name identifying an entry point for the remote service, and an opaque account pairing token that may be used to pair the joining device 784 to the remote service.

The commissioner 782 may also receive information to identify the joining device 784 (block 816). For example, the commissioner 484 may prompt the user to input a code associated with and/or found on the device and/or scan a code (e.g., QR code) found on the device to verify that the correct joining device is being paired to the fabric and/or the service. The commissioner 782 determines whether a device identifier is valid (block 818). For example, the commissioner 782 may determine whether a valid check digit exists or whether the identifier is an expected value. If the device identifier is not valid or an expected value, the commissioner 782 indicates failure in the pairing process (block 820). For example, the commissioner 782 may display a notification to the user that the identifier is not valid and re-requests entry of the identifier.

The commissioner 782 receives a fabric information from the service (block 822). The information about the fabric may include device types, software versions, and node identifiers for the devices in the fabric, as well as a fabric identifier. In some embodiments, the fabric identifier may be inaccessible to the remote service and/or some other information about the fabric. In such embodiments, the commissioner 782 may instead retrieve such information from one or more network assisting devices. In certain embodiments, the fabric information may indicate that a fabric does not exist for the account.

If a pre-existing fabric exists and the commissioner 782 is to fetch some information from network devices and/or use the assisting devices to transfer at least some of the fabric and/or network(s) information, the commissioner 782 determines whether the devices in the fabric include non-sleepy devices (i.e., always-on devices that do not toggle into a relatively low power mode) (block 826). If there is at least one non-sleepy device, the commissioner 782 selects an always-on device as the assisting device 786 (block 828). If all devices in the fabric are sleepy devices, the commissioner 782 determines whether a sleepy device can be awoken by the service (block 830). If so, the commissioner 782 instructs the service to awaken the device as the assisting device 786 (block 832). If no devices may be awoken by the service, the commissioner 782 instructs the user to manually waken a device on the fabric (block 834). For example, the commissioner 782 may instruct the user to press a button on the assisting device 786.

Once an assisting device 786 has been selected and/or awoken, the commissioner 782 establishes a secure connection to the assisting device 786 using the fabric authentication previously received by the commissioner 782 in block 806 (block 836). In some embodiments, the secure session may be established using Certificate Authenticated Session Establishment (CASE) protocol as taught in U.S. patent application Ser. No. 14/508,933, titled "Authenticated Session Establishment," which was filed on Oct. 7, 2014, and which is incorporated by reference in its entirety. The commissioner 782 then stores the resulting session key and assisting device node identifier. In some embodiments, the commissioner 782 uses a device control profile, as discussed in U.S. application Ser. No. 14/592,469, entitled "Device Control Profile for a Fabric Network," filed Jan. 8, 2015, which is incorporated herein in its entirety and for all purposes. In certain embodiments, the commissioner 782 uses the device control profile to employ connection monitoring on the connection between the commissioner 782 and the assisting device 786. Via the secure connection, the commissioner 782 extracts network and fabric configuration from the assisting device 786 (block 838). For example, the commissioner 782 may use network provisioning and fabric provisioning profiles to obtain this information. For example, the commissioner 782 may use Network and Fabric Provisioning Profiles as described in U.S. Provisional Patent Application No. 62/061,593, titled "Fabric Network," which was filed on Oct. 8, 2014, and which is incorporated by reference in its entirety. In certain embodiments, the commissioner 782 may receive a pre-shared key (PSK) for the service or may rely on provisioning support to change the network handling to allow one to query a provisioning PSK. In certain embodiments, the commissioner 782 may not acquire such information. Instead, in certain embodiments, the commissioner 782 may instruct the assisting device 786 to share such information to be shared with the joining device 784 directly.

The commissioner 782 also instructs the assisting device 786 to place the network (e.g., 802.15.4) in a joinable mode and listen for rendezvous connections on an unsecured port (block 840). In some embodiments, the commissioner 782 then disables the device control profile connection monitor.

In some embodiments, the commissioner 782 causes the joining device 784 to be awoken and/or placed in a communicative state (block 842). For example, in some embodiments, the commissioner 782 may instruct a user to manually awaken the joining device 784 and/or send a signal over a predefined port to awaken the device from a relatively low-power state.

While the joining device 784 is awake, the commissioner 782 connects to the joining device 784 using BLE while utilizing the BTP previously discussed (block 844). In some embodiments, the commissioner 782 and the joining device 784 may establish the BLE connection and using PSK to establish a secure connection (block 846). In some embodiments, the PSK is retrieved from the remote service during communication with the remote service. If the identifier is valid, the commissioner 782 determines whether a fabric exists for a structure in which the joining device 784 is to be added (block 847). Such determination may include requesting the user to input a structure for the joining device 784, and the commissioner 782 determines whether a fabric exists for the structure. Additionally or alternatively, the remote service may track whether a fabric has previously been established for the structure regardless of whether the service stores any other details about the fabric. If no fabric exists, then the commissioner 782 instructs the joining device 784 to create its own fabric and bypasses additional fabric and/or network joining (block 848). The commissioning device 782 determines whether PSK data matches data that is expected to authenticate the joining device 784 (block 849). In some embodiments, this PSK is authenticated prior to telling the joining device 784 to create a new fabric.

If the joining device 784 is not authenticated, the commissioner 782 causes the termination of connection (block 852). In other words, the BLE connection is terminated, and the commissioner 782 will attempt to restart the BLE connection. In some embodiments, the commissioner 782 may notify of such failures (block 850). For example, the commissioner 782 may display a failure to a user to indicate the failure.

If the device authenticates, the commissioner 782 determines device capabilities and software versions before instructing the device to join a network (block 854). For example, the commissioner 782 may perform a fabric identify request to determine a device type and software version for the joining device 784. The commissioner 782 then verifies that the device type of the joining device 784 matches the selected device type used for the pairing (block 856). If the device types do no match, the commissioner 782 may notify the user of the failure and terminate the process 800 (block 858). In some embodiments, the commissioner 782 may restart the process 500 at block 808. If the selected device types match, the commissioner 782 may also determine whether the software version of the joining device 784 supports network-assisted fabric pairing (block 860). If the version of software on the joining device 784 does not support network-assisted fabric pairing and/or needs to be updated, the commissioner 782 causes the software version to be updated (block 862). For example, the commissioner 782 may cause the joining device 784 to initiate an update and/or indicate to a user that the joining device 784 should be updated.

Once the software version is appropriate for the fabric pairing, the commissioner 782 may determine whether the joining device 784 has WiFi capability (block 864). If the device has WiFi capability, the commissioner 782 causes the joining device 784 to add a WiFi network associated with the fabric (block 866). In other words, the joining device 784 stores network credentials (e.g., SSID and password) for the WiFi network. The commissioner 782 also causes the joining device 784 to initiate a connectivity test (block 868). For example, the commissioner 782 may instruct the joining device 784 to connect to the WiFi network, perform a DNS lookup, and establish a test TCP connection to an Internet-based test server. The commissioner 782 determines whether the connectivity test has passed (block 870). If the test failed, the commissioner 782 and/or the joining device may request new WiFi credentials (block 872) then reattempt the WiFi connection. In some embodiments, the joining device 784 may reattempt to connect before requesting new WiFi credentials. If the test is passed, the commissioner 782 may request that the joining device 784 enable the WiFi network (block 874). In some embodiments, when the WiFi network is enabled on the joining device 784, the commissioner 782 may close the BLE connection and connect to the joining device 784 using the WiFi network to continue the communication. In some embodiments, the commissioner 782 and the joining device 784 may share a token or key prior to closing the BLE communication that may be used to authenticate and initiate a secure session using the WiFi network. Additionally or alternatively, the commissioner 782 and the joining device 784 may use the PSK used to secure the BLE connection to authenticate and initiate the secure session using the WiFi network.

Regardless of WiFi capabilities, the commissioner 484 causes the joining device to add a personal area network (PAN) (block 876). The PAN credentials and name to be joined have been previously retrieved from the assisting device 786 and are shared with the joining device 784 by the commissioner 782. After the joining device 784 has the PAN credentials, the commissioner 782 causes the joining device 784 to enable the PAN network (block 878). In other words, the PAN is the secure connection version of the unsecured connection (e.g., via 802.15.4) over which the communication between the commissioner 782 and the joining device 784. If the secure re-connection between the joining device 784 and the commissioner 782 fails (block 880), the failsafe is triggered either through the unsecure port connection or automatically after a period of time elapses after the joining device 784 attempts to join the PAN (block 882).

Once the joining device 784 has joined the PAN, using the previously retrieved fabric ID and keys, the commissioner 782 instructs the joining device 784 to join the fabric (block 884). The commissioner 782 also configures the joining device 784 to communicate with the remote service by sending a register service request including the fabric service configuration information previously retrieved from the service (block 886). Since the pairing for the joining device 784 is complete, the commissioner 782 may disable a failsafe in the joining device to allow the fabric and network information to be stored persistently (block 888). The commissioner 782 then determines whether additional devices are to be added to the network and/or fabric (block 890). If there are no additional devices, the process 800 has ended. If there are additional devices, the commissioner 782 returns to block 808 of FIG. 29A.

a. Remote Passive Rendezvous

Figure 30A:
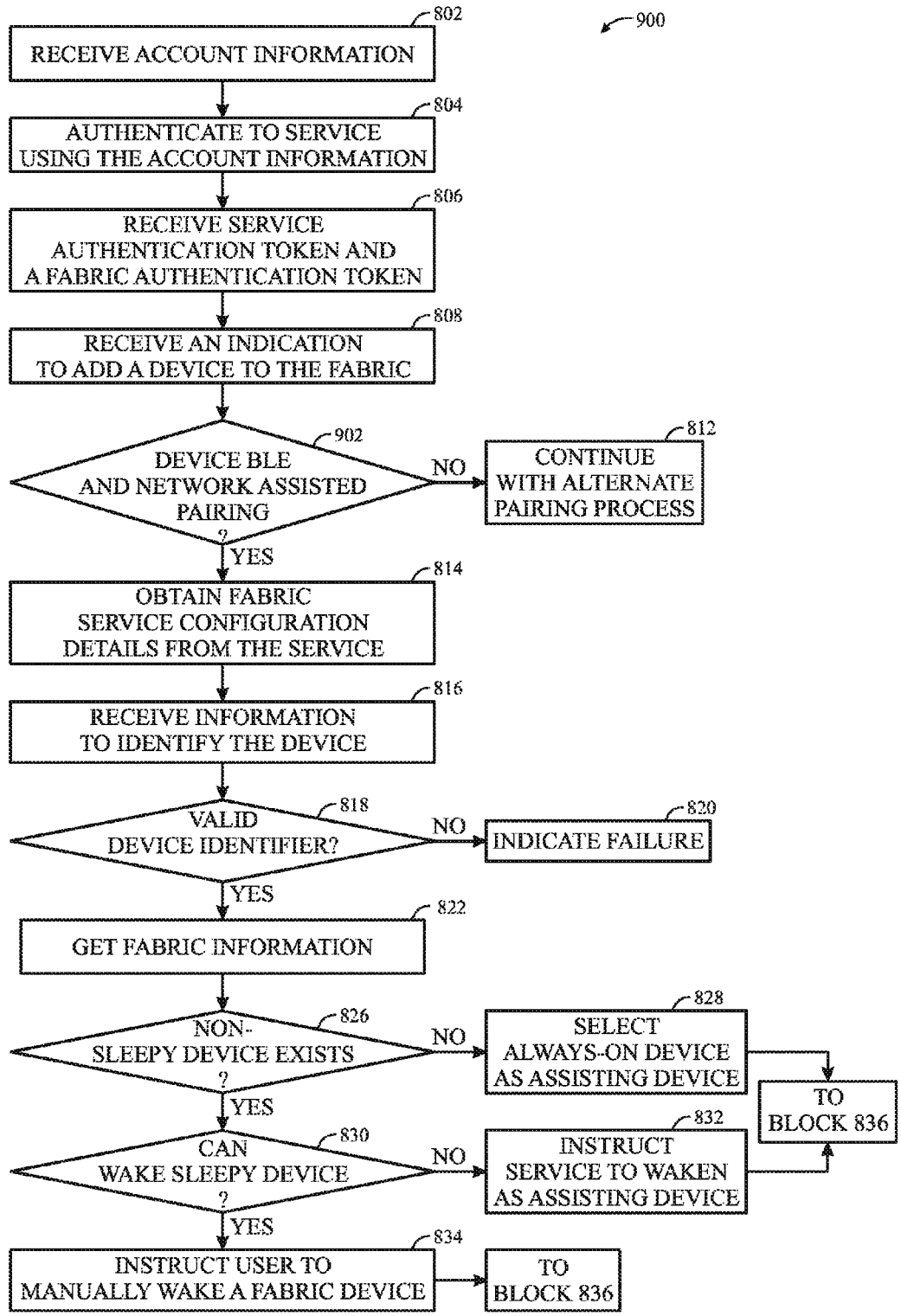
FIG. 30A illustrates a flow diagram of a first part of a pairing process using an assisting device tunnel, according to an embodiment.
Figure 30B:
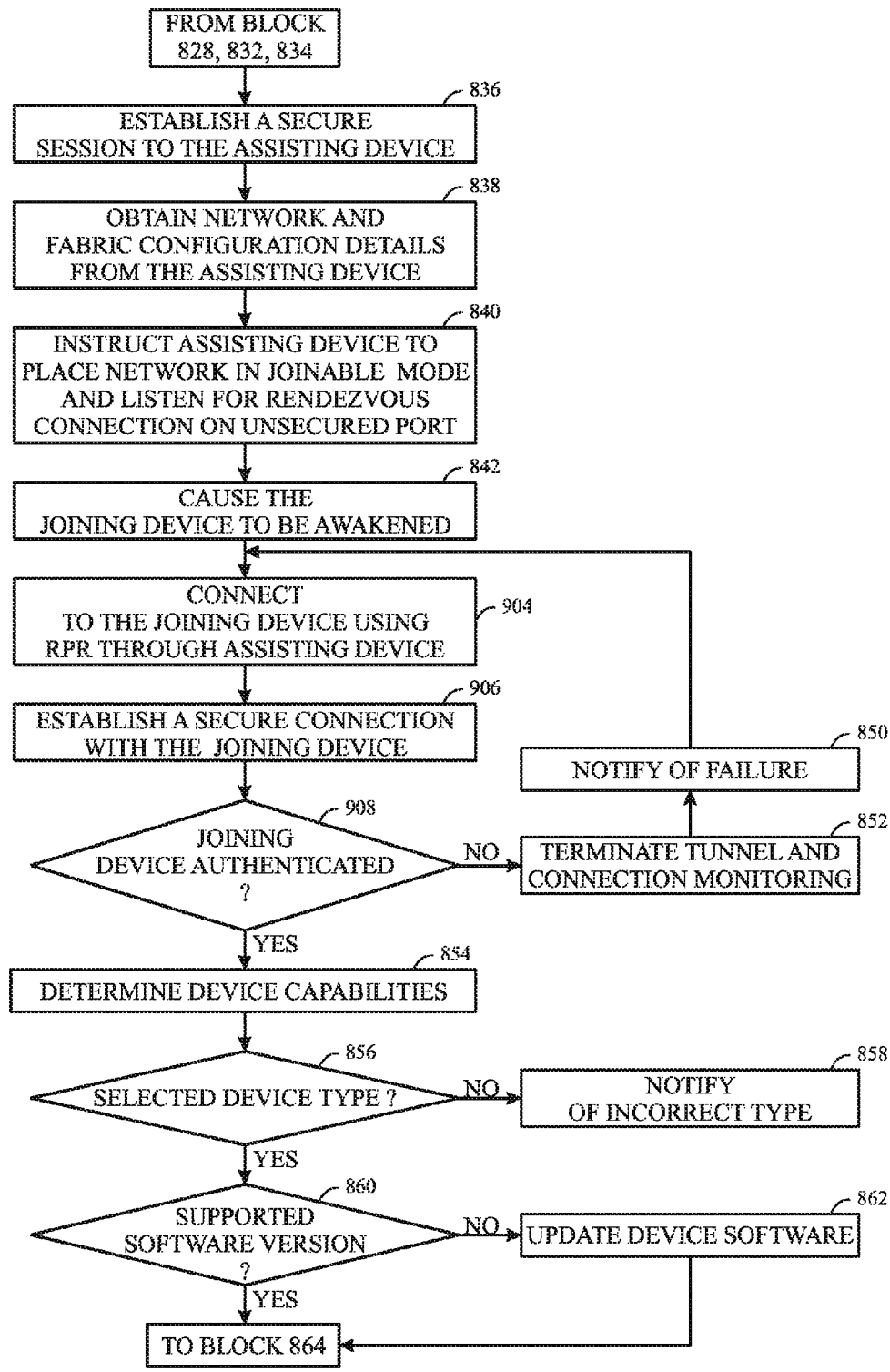
FIG. 30B illustrates a flow diagram of a second part of the pairing process of FIG. 30B, according to an embodiment.
Figure 30C:
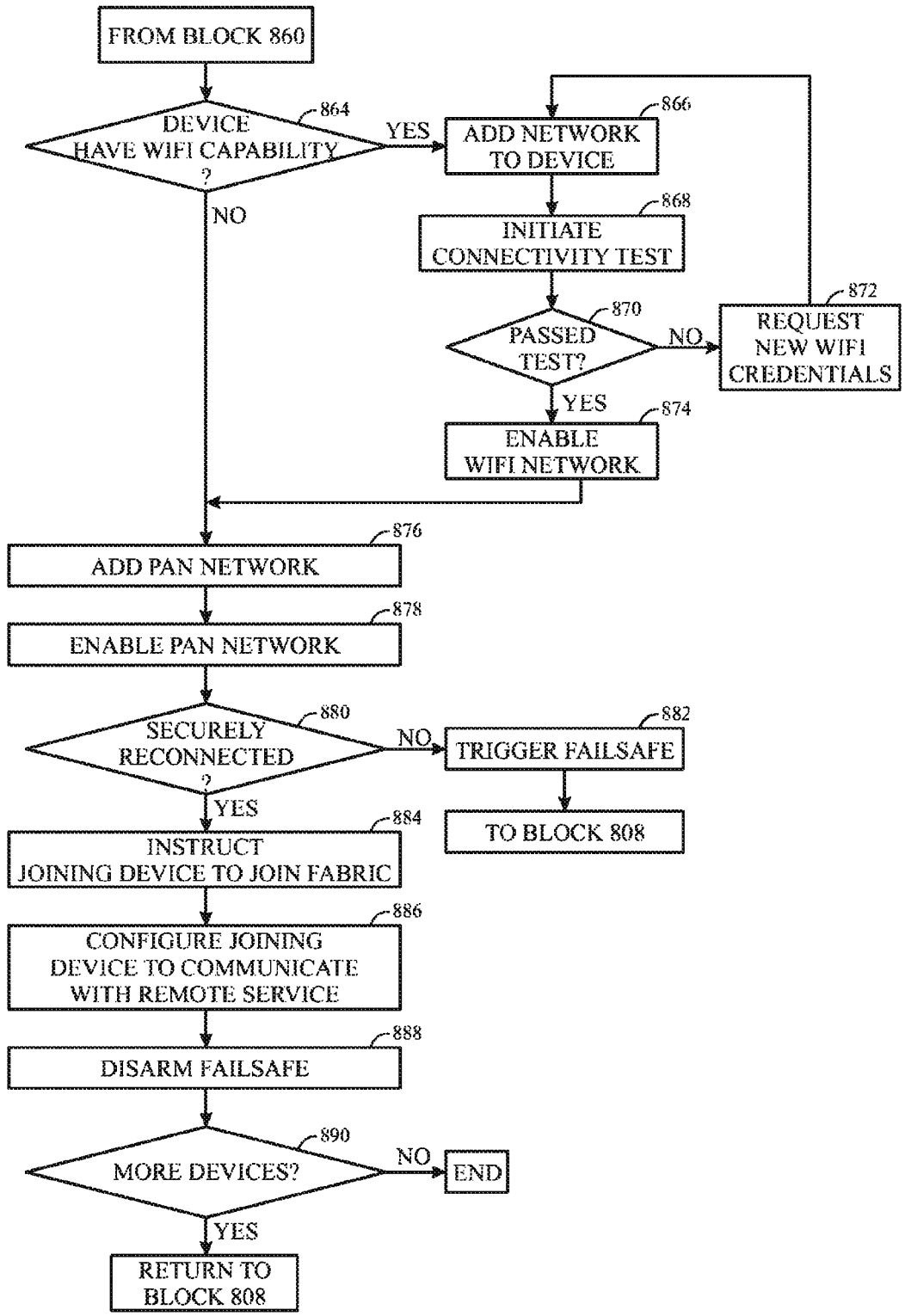
FIG. 30C illustrates a flow diagram of a third part of the pairing process of FIGS. 30A and 30B, according to an embodiment.

FIGS. 30A-30C illustrate a flow diagram of an embodiment of a pairing process 900. The process 900 is similar to the process 800 except the commissioner causes the assisting device 786 to create a tunnel between the commissioner 782 and the joining device 784 over a network connection (e.g., 802.15.4 and/or 802.11) to securely transfer data from the commissioner 782 to the joining device 784 through the assisting device 786 and the changes related to such actions. Thus, in the process 900 when verifying that the joining device supports BLE connections, the commissioner 782 also verifies that the joining device supports network assisted pairing (block 902).

In the process 900, the commissioner 782 connects to the joining device 784 as remote passive rendezvous (RPR) client and initiates a RPR using the device control profile (block 904). For example, the commissioner 782 may use the RPR scheme as taught in U.S. patent application Ser. No. 14/582,062, entitled "Network-Assisted Fabric Pairing" filed on Dec. 23, 2014, which is incorporated herein in its entirety. In certain embodiments, once the RPR connection is completed, the commissioner 782 or the joining device 784 closes the BLE connection. In some embodiments, connecting to the joining device 784 includes receiving a notification from the assisting device 786 that the assisting device 786 has rendezvoused with the joining device 784 and opened an RPR tunnel from the joining device 784 to the commissioner 782. The communications between the joining device 784 and the commissioner 782 will occur through the tunnel as forwarded by the assisting device 786 and its separate connections to the joining device 784 and the commissioner 782. Furthermore, the connection may include the commissioner 782 enabling device control profile connection monitoring between the joining device 784 and the commissioner 782.

After the rendezvous tunnel has been established, the commissioner attempts to establish a secure fabric session with the joining device 784 using a pairing code that is the device identifier, is derived from the device identifier, or corresponds to the device identifier (block 906). In some embodiments, the secure fabric session may be established using Password Authenticated Session Establishment (PASE) protocol as taught in U.S. patent application Ser. No. 14/508,933, titled "Authenticated Session Establishment," which was filed on Oct. 7, 2014, and which is incorporated by reference in its entirety. The commissioner determines whether the joining device 784 is authentic such that the PASE connection has been established successfully (block 908). The process 900 then continues similar to the process 800 except the remaining portions of the process 900 take place over WiFi and/or through the RPR connection rather than over BLE and WiFi.

Figure 31:
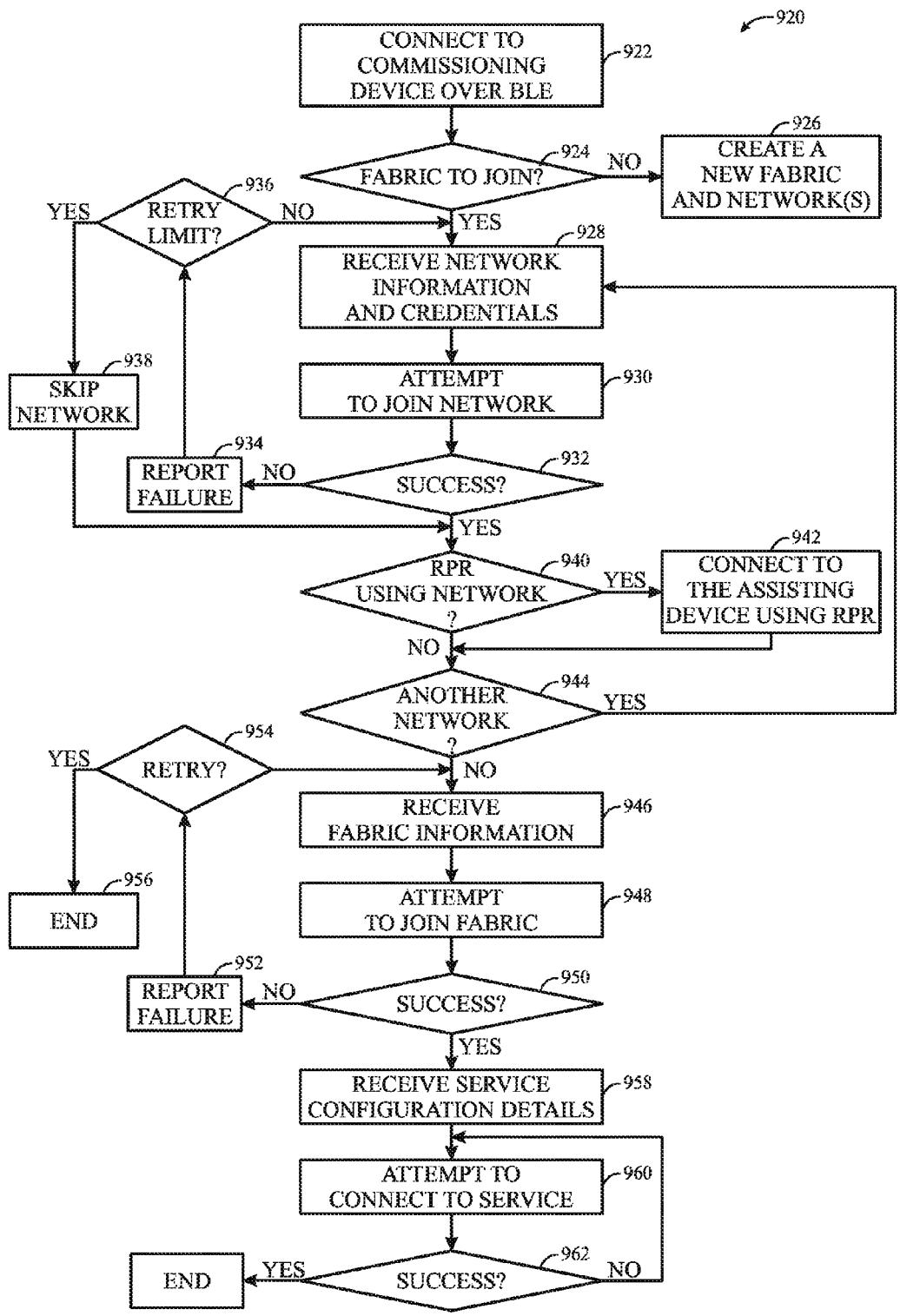
FIG. 31 illustrates a flow diagram of a process for a device to use when pairing to a fabric and network, according to an embodiment.

FIG. 31 illustrates a flow chart diagram of a process 920 for pairing to a fabric and network. The joining device 784 connects to the commissioner 782 over BLE (block 922). Additionally or alternatively, in some embodiments, the joining device 784 may connect to the commissioner 782 using another relatively-low power wireless connection protocol. The commissioner 782 determines whether there is a fabric to join (block 924). In some embodiments, this determination is made by determining whether fabric information is sent and/or whether the commissioner 782 has sent a create fabric command to the joining device 784. If there is no fabric to join, the joining device 784 creates a new fabric and/or any related networks such as an 802.15.4 networks (block 926). In certain embodiments, in addition to fabric creation and/or network creation, the joining device 784 may join a network (e.g., 802.11 network) that does not currently include any smart devices but may be at least partially incorporated into the fabric. In such embodiments, the commissioner 782 may share network information (e.g., SSID) and credentials (e.g., password) with the joining device 784 to enable the joining device 784 to join the network.

If there is a fabric and network to join, the joining device 784 receives network information (e.g., SSID, PAN ID) and credentials (e.g., certificate and/or password) from the commissioner 782 and/or the assisting device 786 (block 928). The joining device 784 then attempts to join the network (block 930). The joining device 784 then determines whether the network connection has been completed successfully (block 932). For example, the joining device 784 may test the network connection by sending a test message and determining whether an expected response is received from another device, such as another device in the network and/or a remote service. If the joining device 784 determines that the connection is a failure, the joining device 784 may notify the commissioner 782 and/or the assisting device that the joining attempt has failed (block 934). In some embodiments, each network connection may a have a retry limit that reduces likelihood of malicious connections by limiting the number of retries by a device within a time period. The joining device 784, the commissioner 782, and/or the assisting device 786 may track whether this retry limit has been reached (block 936). In embodiments, where the commissioner 782 and/or the assisting device 786 tracks such limitations, these devices may send a notification to the joining device 784 that the limit has been reached or surpassed (e.g., when the joining device attempts to join the network in block 930). If the retry limit has not been reached, the joining device 784 may re-receive the credentials and/or re-attempt to join the network. If the retry limit has been reached, the joining device 784 may skip joining the network (block 938). In some embodiments, when the joining device 784 skips joining the network, the joining device 784 may terminate the joining process 920 and return to an initial state (e.g., factory default state).

If the network joining is completed successfully, in some embodiments, the joining device 784 may connect to the commissioner 782 and/or the assisting device 786 using the new network connection. In some embodiments, such connection may be made using a remote passive rendezvous (RPR), as previously discussed. The joining device 784 determines whether RPR is to be conducted using the new network connection (block 940). If so, the joining device 784 conducts the RPR using the techniques previously discussed to connect to the assisting device (block 942). Furthermore, after the network connection is made, in some embodiments, the further steps may be conducted over the new network while the BLE connection is terminated. In certain embodiments, the BLE connection may remain open until the pairing process is completed as a backup connection in case the network connection fails.

If the joining device 784 is to join another network (block 944), the network joining process may be repeated. If all networks to be joined have been joined (or skipped), the joining device 784 may receive fabric information for the fabric to be joined (block 946). In some embodiments, the fabric information may be received previously. After the fabric information has been received, the joining device attempts to join the fabric (block 948) before all networks have been joined. Instead, in such embodiments, the fabric may be joined after a related network (e.g., 802.15.4) has been joined but before another network has been joined. In some embodiments, the joining device 784 determines whether the fabric has been successfully joined (block 950). For example, in some embodiments, the joining device 784 may attempt to send a message using a protocol associated with the fabric. If the joining device 784 receives an appropriate response, the joining device 784 has determined that the fabric has been successfully joined. Additionally or alternatively, the joining device 784 may wait for a periodic communication that occurs in the fabric to verify fabric connection. If the fabric is not successfully joined, the joining device 784 may send a report of failure to the commissioner 782 and/or the assisting device 786 (block 952). In some embodiments, this report of failure is presented to a user and/or sent to the remote service. In some embodiments, an attempt to join a fabric may be retried a limited number of times (e.g., 0, 1, 2, or 3 times) per sessions. If a retry is permitted (block 954), the joining device 784 may re-receive the fabric information and/or attempt to join the fabric. If a retry is not permitted, the joining device 784 may terminate the joining process 920 and return itself to an initial state (e.g., factory default state) (block 956).

Once the fabric is joined, the joining device 784 receives configuration details for the remote service 797 (block 962). The joining device 784 then attempts to connect to the service using the service configuration details (block 964). In some embodiments, the joining device 784 confirms whether the connection was a success (block 966). For example, if Internet connectivity problems exist for that location at which the joining device is being installed, the connection to the service may not be feasible. In certain embodiments, the joining device 784 may continue to retry connection to the service until successfully completed. In some embodiments, the joining device 784 may verify the service configuration details with the commissioner 782 and/or other devices in the fabric.

The invention claimed is:

1. A non-transitory, tangible, and computer-readable storage medium having stored thereon an advertisement, the advertisement comprising:
   an access code for identifying communications on a particular physical channel;
   an advertising channel protocol data unit (PDU), including:
      a PDU header that indicates a type of an advertisement payload, the advertisement payload including:
         a length field indicating a length of the advertisement payload;
         a critical event identifier field indicating that an advertising device is in an alarming state, the alarming state being related to one or more of a smoke alarm, a carbon monoxide (CO) alarm, a heat alarm, or a security alarm;
         an advertisement data (AD) type field arranged between the length field and the critical event identifier field, the AD type field indicating a type of data included in the critical event identifier field; and
      general device information comprising device specifics about the electronic device sending the advertisement, the device specifics including:
         an account pairing status associated with the electronic device.

2. The non-transitory, tangible, and computer-readable medium of claim 1, wherein the advertisement payload comprises:
   a critical event data block length field indicating a length of a critical event data block;
   a critical event type field indicating a type of critical event identified by the critical event identifier field; and
   an alarm event specification version field indicating a specification version of the critical event data block that indicates how to interpret the critical event data block.

3. The non-transitory, tangible, and computer-readable medium of claim 1, wherein the advertisement payload follows the PDU header field and a cyclic redundancy check (CRC) field follows the payload.

4. The non-transitory, tangible, and computer-readable medium of claim 1, wherein the access code comprises a preamble that includes a sequence of values for facilitating direct current compensation.

5. The non-transitory, tangible, and computer-readable medium of claim 1, wherein the advertisement comprises a cyclic redundancy check (CRC) field following the application payload as a data integrity check for verifying validity of the advertisement.

6. The non-transitory, tangible, and computer-readable medium of claim 1, wherein the PDU header includes an advertisement type that identifies a type of advertisement, a device address type for any addresses included in the advertisement, and a PDU payload length.

7. The non-transitory, tangible, and computer-readable medium of claim 1, wherein the advertisement payload comprises an alarm challenge configured to enable a remote device receiving the advertisement to authenticate that any communications are within a timeliness threshold associated with the alarm.

8. The non-transitory, tangible, and computer-readable medium of claim 1, wherein the advertisement payload comprises one or more of:
a number of events field indicating a number of events being indicated in the advertisement;
an alarm state field indicating a state of an alarm; and
an additional alarm type and state field that indicates that an additional event has occurred and indicates the state of the additional event.

9. The non-transitory, tangible, and computer-readable medium of claim 1, wherein the advertisement includes a general service data block comprising:
device specifics about an electronic device sending the advertisement; and
advertisement encoding information indicating how to decode the advertisement.

10. The non-transitory, tangible, and computer-readable medium of claim 9, wherein the general service data block comprises a version field indicating a version of encoding used for the advertisement that indicates to the one or more receiving devices how to interpret the advertisement.

11. The non-transitory, tangible, and computer-readable medium of claim 9, wherein the general service data block comprises a general service data block length field that indicates a length of the general service data block that includes all of the general device information included in the wireless advertisement.

12. An electronic device comprising:
one or more processors;
memory storing instructions, wherein the instructions are configured to cause the one or more processors to transmit an advertisement that includes:
an access code for identifying communications on a particular physical channel;
an advertising channel protocol data unit (PDU), including:
a PDU header that indicates the type of an advertisement payload, the advertisement payload including:
a length field indicating a length of the advertisement payload;
a critical event identifier field indicating that an advertising device is in an alarming state, the alarming state being related to a security alarm;
an advertisement data (AD) type field arranged between the length field and the critical event identifier, the AD type field indicating a type of data included in the critical event identifier field; and
general device information comprising device specifics about the electronic device, the device specifics including:
an account pairing status associated with the electronic device.

13. The electronic device of claim 12, wherein the advertisement includes general device information comprising advertisement encoding information indicating how to decode the advertisement, wherein the advertisement encoding information comprises:
a length field that indicates a length of a chunk of data corresponding to the general device information; and
a type field that indicates a type of data for the chunk of data corresponding to the general device information.

14. The electronic device of claim 12, wherein the device specifics include:
a vendor identification field that identifies a vendor for the electronic device; and
a product identification field that identifies a specific device type for the electronic device.

15. The electronic device of claim 12, wherein the advertisement includes general device information comprising device specifics about the electronic device sending the advertisement, wherein the device specifics comprise a unique universal identifier (UUID) for a general device service used to communicate with the electronic device via a low power wireless connection protocol.

16. The electronic device of claim 12, wherein the advertisement includes an account pairing status flag that indicates whether the electronic device is paired to an account at a remote service.

17. The electronic device of claim 16, wherein the instructions are configured to cause the processor to:
determine whether the electronic device is paired to the account using the account pairing status flag;
if the electronic device is not paired to the account, mark the advertisement as not paired to the account using the account pairing status flag; and
if the electronic device is paired to the account, mark the advertisement as paired to the account using the account pairing status flag.

18. A method comprising:
receiving an indication from a sensor of an alarm condition;
in response to the receiving the indication, generating, at an electronic device, an advertisement for a low power point-to-point wireless connection; and
broadcasting the advertisement, the advertisement including:
an access code for identifying communications on a particular physical channel;
an advertising channel protocol data unit (PDU), including:
a PDU header that indicates the type of an advertisement payload, the advertisement payload including:
a length field indicating a length of the advertisement payload;
a critical event identifier field indicating that an advertising device is in an alarming state;
an advertisement data (AD) type field arranged between the length field and the critical event identifier, the AD type field indicating the type of data included in the critical event identifier field; and general device information comprising device specifics about the electronic device sending the advertisement, the device specifics including:
an account pairing status associated with the electronic device.

19. The method of claim 18, wherein the advertisement comprises a first alarm notification field that indicates an alarm exists at the electronic device, wherein the first alarm notification field comprises:
an alarm type field that indicates a type of alarm detected at the electronic device and that corresponds to the alarm; and
an alarm state field that indicates a state of the alarm, wherein the state of the alarm comprises alarming, heads up, hushed, or standby.

20. The method of claim 19, the method comprising:
receiving, from an additional sensor of the electronic device, an additional indication that an additional measured parameter has surpassed an additional alarm threshold, wherein the advertisement comprises a second alarm notification field that indicates the additional alarm exists at the electronic device, wherein the second alarm notification field comprises:
an additional alarm type field that indicates a type of alarm detected at the device and that corresponds to the additional alarm; and
an alarm state field that indicates a state of the additional alarm, wherein the state of the additional alarm comprises alarming, heads up, hushed, or standby.

21. The method of claim 18, the method comprising:
generating a random number substantially at the time that the indication is received from the sensor; and
including the random number in an alarm challenge field in the advertisement, wherein the alarm challenge field is configured to enable a remote device receiving the advertisement to authenticate that any communications are within a timeliness threshold associated with the alarm.

22. The method of claim 18, wherein the alarming state is related to one or more of a smoke alarm, a carbon monoxide (CO) alarm, a heat alarm, or a security alarm.

* * * * *